US008488780B2

(12) United States Patent  
Takahashi et al.

(10) Patent No.: US 8,488,780 B2  
(45) Date of Patent: Jul. 16, 2013

(54) FINITE FIELD CALCULATION APPARATUS, FINITE FIELD CALCULATION METHOD AND RECORDING MEDIUM

(75) Inventors: Gen Takahashi, Tokyo (JP); Tetsutaro Kobayashi, Tokyo (JP); Kaku Takeuchi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 115 days.

(21) Appl. No.: 13/258,840

(22) PCT Filed: Apr. 23, 2010

(86) PCT No.: PCT/JP2010/057281  
§ 371 (c)(1),  
(2), (4) Date: Oct. 19, 2011

(87) PCT Pub. No.: WO2010/123117  
PCT Pub. Date: Oct. 28, 2010

(65) Prior Publication Data  
US 2012/0033805 A1    Feb. 9, 2012

(30) Foreign Application Priority Data  
Apr. 24, 2009  (JP) ................................. 2009-106029

(51) Int. Cl.  
*H04L 29/06*    (2006.01)

(52) U.S. Cl.  
USPC .......................................................... 380/28

(58) Field of Classification Search  
USPC .......................................................... 380/28  
See application file for complete search history.

(56) References Cited

U.S. PATENT DOCUMENTS

| 5,412,729 | A * | 5/1995 | Liu ................................. 380/37 |
| 7,035,404 | B2 * | 4/2006 | Furukawa ....................... 380/28 |
| 8,111,826 | B2 * | 2/2012 | Takashima ..................... 380/28 |
| 2012/0045056 | A1 * | 2/2012 | Takashima et al. ........... 380/255 |

FOREIGN PATENT DOCUMENTS

JP    2006-301513    11/2006

OTHER PUBLICATIONS

Identity Based Encryption from the Tate Pairing to Secure Email Communications Matthew Baldwin May 2002.*

(Continued)

*Primary Examiner* — Edan Orgad  
*Assistant Examiner* — James Turchen  
(74) *Attorney, Agent, or Firm* — Oblon, Spivak, McClelland, Maier & Neustadt, L.L.P.

(57) ABSTRACT

A calculation $\Pi_{i=0}^{N-1} e(R(i, 0), \ldots, R(i, K-1))$ where a calculation of K elements $R(i, k) \in GF(p^m)$ of a finite field $GF(p^m)$ over a finite field is expressed as $e(R(i, 0), \ldots, R(i, K-1))$ is efficiently performed. Polynomials $poly(R(i, 0), \ldots, R(i, K-1))$ that express a d-th-order extension field of the finite field $GF(p^m)$, which are obtained by the calculations $e(R(i, 0), \ldots, R(i, K-1))$ for different values of i, are multiplied by each other, and a cumulative multiplication of the products is performed, for example. The polynomial $poly(R(i, 0), \ldots, R(i, K-1))$ is a mapping from the input elements of the finite field $GF(p^m)$, and the coefficients of at least some of the terms thereof are 0. The same process is performed for different sets of values of i, and the calculation $\Pi_{i=0}^{N-1} e(R(i, 0), \ldots, R(i, K-1))$ is performed using the result.

45 Claims, 20 Drawing Sheets

OTHER PUBLICATIONS

Implementing the Tate Pairing Steven D Galbraith, Keith Harrison, David Soldera Trusted E-Services Laboratory HP Laboratories Bristol Mar. 2002.*

Efficient Tate Pairing Computation for Supersingular Elliptic Curves over Binary Fields Soonhak Kwon Department of Mathematics, Sungkyunkwan University, Korea 2004.*

R. Granger, et al., "On Computing Products of Pairings", Cryptology ePrint Archive 2006, Retrieved on May 26, 2010, http://citeseerx.ist.psu.edu/viewdoc/summary?doi=10.1.1.61.7456, pp. 1-11.

Gen Takahashi, et al., "Column-wise unrolled $\eta T$ Pairing", Abstracts of the Symposium on Cryptography and Information Security, Jan. 2010 (with it's full English Translation), pp. 1-3.

Jean-Luc Beuchat, et al., "An Algorithm for the $\eta T$ Pairing Calculation in Characteristic Three and its Hardware Implementation", Proceedings of the 18th IEEE Symposium on Computer Arithmetic, Institute of Electrical and Electronics Engineers, Jun. 2007, pp. 1-8.

Jean-Luc Beuchat, et al., "Algorithms and Arithmetic Operators for Computing the $\eta T$ Pairing in Characteristic Three", IEEE Transactions on Computers, vol. 57, No. 11, Nov. 2008, pp. 1454-1468.

* cited by examiner

FIG.4

$poly(R(i_1,0),...,R(i_1,K-1))=$
$a_0[i_1]+a_1[i_1]\cdot\rho+a_2[i_1]\cdot\rho^2+a_3[i_1]\cdot\sigma+0\cdot\rho\cdot\sigma+0\cdot\rho^2\cdot\sigma$

| $a_0[i_1]$ | $a_1[i_1]$ | $a_2[i_1]$ | $a_3[i_1]$ | 0 | 0 |

×

$poly(R(i_2,0),...,R(i_2,K-1))=$
$a_0[i_2]+a_1[i_2]\cdot\rho+a_2[i_2]\cdot\rho^2+a_3[i_2]\cdot\sigma+0\cdot\rho\cdot\sigma+0\cdot\rho^2\cdot\sigma$

| $a_0[i_2]$ | $a_1[i_2]$ | $a_2[i_2]$ | $a_3[i_2]$ | 0 | 0 |

FINITE FIELD CALCULATION APPARATUS, FINITE FIELD CALCULATION METHOD AND RECORDING MEDIUM

TECHNICAL FIELD

The present invention relates to a cryptographic technique. In particular, it relates to a technique of calculation over a finite field.

BACKGROUND ART

In recent years, with the practical use of cryptographic schemes based on pairing, studies to improve the pairing efficiency have become more active. The pairing is a two-input one-output bilinear function. The present cryptography uses a pairing that accepts as inputs two points $P(x_1, y_1)$ and $Q(x_2, y_2)$ on an elliptic curve defined on a finite field $GF(p^m)$ ($x_1, y_1, x_2, y_2 \in GF(p^m)$), p represents a prime number, and m represents an integer equal to or greater than 1) and returns an element $\eta_T(P, Q)$ of an extension field $GF(p^{d \cdot m})$ of the finite field $GF(p^m)$ ($\eta_T(P, Q) \in GF(3^{d \cdot m})$):

$$e(P(x_1,y_1),Q(x_2,y_2)) \to \eta_T(P,Q) \tag{1}$$

The first proposed algorithm for pairing calculation in polynomial time is the Miller algorithm for Tate pairing. Following the Miller algorithm, the $\eta_T$ pairing algorithm, which is reduced by half in number of recursions compared with the Miller algorithm, and then the improved $\eta_T$ pairing algorithm, which is further improved in calculation speed by omitting the cube root calculation involved with the $\eta_T$ pairing algorithm, were proposed (see Non-patent literature 1, for example). In the following, the improved $\eta_T$ pairing algorithm will be summarized.

<Improved $\eta_T$ Pairing Calculation Algorithm>

[Preparation]

$E^b$: $E^b$ represents a supersingular elliptic curve that is defined on a finite field $GF(3^m)$ and expressed as $Y^2 = X^3 - X + b$ ($b \in \{-1, 1\}$).

σ: σ represents an indeterminate element that is a root of an irreducible polynomial $\sigma^2 + 1 = 0$ over the finite field $GF(3^m)$.

ρ: ρ represents an indeterminate element that is a root of a polynomial $\rho^3 - \rho - b = 0$ over the finite field $GF(3^m)$.

[Input] $P(x_1, y_1), Q(x_2, y_2)(x_1, y_1, x_2, y_2 \in GF(3^m))$

[Output] $\eta_T(P, Q) \in GF(3^{6m})$

[Calculation Process]

Step 1: $y_1 = -y_1 \in GF(3^m)$ (only if b=1)

Step 2: $u = x_1 + x_2 + b \in GF(3^m)$

Step 3: c=b

Step 4: $f = -y_1 \cdot u + y_2 \cdot \sigma + y_1 \cdot \rho \in GF(3^{6m})$

Step 5: repeat Steps 5-1 to 5-8 while increasing j from 0 to (m−1)/2 in increments of 1

Step 5-1: $u = x_1 + x_2 + c \in GF(3^m)$

Step 5-2: $g = -u^2 + y_1 \cdot y_2 \cdot \sigma - u \cdot \rho - \rho^2 \in GF(3^{6m})$ Step 5-3: $f = f \cdot g \in GF(3^{6m})$ Step 5-4: $f = f^3 \in GF(3^{6m})$ Step 5-5: $y_1 = -y_1 \in GF(3^m)$ Step 5-6: $x_2 = x_2^9 \in GF(3^m)$ Step 5-7: $y_2 = y_2^9 \in GF(3^m)$ Step 5-8: $c = (c - b) \mod 3 \in GF(3)$ Step 6: output $f^{finalpow} \in GF(3^{6m})$ [finalpow=$(3^{3m}-1)(3^m+1)(3^m-3^{(m+1)/2}+1)$]

Non-patent literature 2 discloses an algorithm that is obtained by applying the loop unrolling technique, which is a kind of loop transformation, to the $\eta_T$ pairing calculation. The loop unrolling technique is to improve the execution speed by decreasing the number of determination steps for loop termination, which occur in every repeated loop. According to the method disclosed in Non-patent literature 2, a processing that involves two loops according to the basic algorithm is performed in one loop to reduce the number of loop repetitions by half, thereby reducing the number of determination steps for loop termination by half.

PRIOR ART LITERATURE

Non-Patent Literature

Non-patent literature 1: Beuchat, J.-L.; Shirase, M.; Takagi, T.; Okamoto, "An Algorithm for the ηT Pairing Calculation in Characteristic Three and its Hardware Implementation", Proceedings of the 18th IEEE Symposium on Computer Arithmetic, Institute of Electrical and Electronics Engineers, 25-27 Jun. 2007, pp. 97-104

Non-patent literature 2: Beuchat, J.-L.; Brisebarre, N.; Detrey, J.; Okamoto, E.; Shirase, M.; Takagi, T., "Algorithms and Arithmetic Operators for Computing the ηT Pairing in Characteristic Three", IEEE transactions on computers, Institute of Electrical and Electronics Engineers, November 2008, Volume 57, Issue 11, pp. 1454-1468

SUMMARY OF THE INVENTION

Problem to be Solved by the Invention

The prior-art literatures 1 and 2 listed above disclose methods for efficient calculation of one pairing but disclose no methods for efficient calculation of the product of a plurality of pairings.

Suppose that a pairing that accepts as inputs two points $P(X_1[i], Y_1[i])$ and $Q(X_2[i], Y_2[i])$ ($X_1[i], Y_1[i], X_2[i], Y_2[i] \in GF(p^m)$) on an elliptic curve defined on a finite field $GF(p^m)$ and returns an element $\eta_T(P[i], Q[i])$ of an extension field $GF(p^{d \cdot m})$ of the finite field $GF(p^m)$ ($\eta_T(P[i], Q[i]) \in GF(3^{d \cdot m})$) is expressed as follows:

$$e(P(X_1[i],Y_1[i]),Q(X_2[i],Y_2[i])) \to \eta_T(P[i],Q[i]) \tag{2}$$

On this supposition, the above prior-art literatures 1 and 2 disclose no method for efficient calculation of $$\Pi_{i=0}^{N-1} e(P(X_1[i],Y_1[i]),Q(X_2[i],Y_2[i])) \tag{3}$$

where $N \geq 2$.

According to the conventional methods disclosed in the prior-art literatures 1 and 2, for example, the calculation of the formula (3) is performed by separately performing the calculation of the formula (2) for each value of i=0, . . . , N−1 and then multiplying the results $\eta_T(P[i], Q[i])$ of the separate calculations. For example, the loop unrolling technique is applied only to the loop process (recursion process) of the calculation of the formula (2) separately performed for each value of i∈{0, . . . , N−1}, and there has not been proposed a calculation method in which pairing calculations for different values of i are performed in cooperation with each other.

The same holds true for calculations other than pairing. For example, supposing that a calculation of K elements R (1, 0), . . . , R(1, K−1)∈$GF(p^m)$ (i∈{0, . . . , N−1}) over a finite field is expressed as $$e(R(i,0),\ldots,R(i,K-1)) \tag{4}$$

the same holds true for a calculation of N*K elements R(i, k) of the finite field $GF(p^m)$:

$$\Pi_{i=0}^{N-1} e(R(i,0),\ldots,R(i,K-1)) \tag{5}$$

where $R(i, k) \in GF(p^m)$, $N \geq 2$, $K \geq 1$, $i \in \{0, \ldots, N-1\}$, $k \in \{0, \ldots, K-1\}$, p represents a prime number, and m represents an integer equal to or greater than 1.

FIG. 1 is a conceptual diagram for illustrating a conventional method for calculating the formula (5). FIG. 1 shows an example in which N=6, and i=0, . . . , 5.

As shown in FIG. 1, in calculation of the formula (5) according to the conventional method, a plurality of calculations (a set of calculations in a dotted-line square) including calculations for the finite field $GF(p^m)$ and calculations for the extension field $GF(p^m)$ is performed for each value of i. Then, the results $e(R(i, 0), \ldots, R(i, K-1))$ of the calculations for the different values of i are multiplied on the extension field $GF(p^m)$ to obtain the result of the calculation of the formula (5).

However, the calculation of the formula (5) can be improved in efficiency by finding an ingenious way of cooperation of the calculations of the formula (4) for the different values of i.

The present invention has been devised in view of such circumstances, and an object of the present invention is to provide a technique of efficiently calculating $\Pi_{i=0}^{N-1} e(R(i, 0), \ldots, R(i, K-1))$ where $e(R(i, 0), \ldots, R(i, K-1))$ represents a calculation of K elements $R(i, 0), \ldots, R(i, K-1) \in GF(p^m)$ of the finite field $GF(p^m)$ over a finite field.

Means to Solve the Problems

According to the present invention, N*K elements $R(i, k) \in GF(p^m)$ of a finite field $GF(p^m)$ are input ($N \geq 2$, $K \geq 1$, $i \in \{0, \ldots, N-1\}$, $k \in \{0, \ldots, K-1\}$, p represents a prime number, and m represents an integer equal to or greater than 1), a finite field calculation part performs a calculation $\Pi_{i=0}^{N-1} e(R(i, 0), \ldots, R(i, K-1))$ where $e(R(i, 0), \ldots, R(i, K-1))$ represents a calculation of K elements $R(i, 0), \ldots, R(i, K-1) \in GF(p^m)$ of the finite field $GF(p^m)$ over a finite field, and the result of the calculation is output.

The calculation $e(R(i, 0), \ldots, R(i, K-1))$ over the finite field includes an extension field calculation over a d-th-order extension field $GF(p^{d \cdot m})$ ($d \geq 2$) of the finite field $GF(p^m)$. The extension field calculation is a calculation that maps images over the finite field $GF(p^m)$ that depend on one or more input elements $R(i, k) \in \{R(i, 0), \ldots, R(i, K-1)\}$ of the finite field $GF(p^m)$ and/or the elements $R(i, k) \in \{R(i, 0), \ldots, R(i, K-1)\}$ of the finite field $GF(p^m)$ to a polynomial $poly(R(i, 0), \ldots, R(i, K-1)) \in GF(p^{d \cdot m})$ that expresses an element of the d-th-order extension field $GF(p^{d \cdot m})$. The polynomial $poly(R(i, 0), \ldots, R(i, K-1)) \in GF(p^{d \cdot m})$ is a polynomial having d terms, the coefficients $a_h$ of some of the terms $h \in \{0, \ldots, d-1\}$ of which are the images over the finite field $GF(p^m)$ that depend on one or more input elements $R(i, k)$ of the finite field $GF(p^m)$ and/or the elements $R(i, k)$ of the finite field $GF(p^m)$, and the coefficients $a_r$ of predetermined some of the terms $r \in \{0, \ldots, d-1\}$ ($r \neq h$) of which are previously determined to be $0 \in GF(p^m)$. That is, at least some of the coefficients in the polynomial $poly(R(i, 0), \ldots, R(i, K-1)) \in GF(p^{d \cdot m})$ are 0 at any time.

A first calculation part of the finite field calculation part receives, for any $i_1 \in \{0, \ldots, N-1\}$, images over the finite field $GF(p^m)$ that depend on one or more elements $R(i_1, k)$ of the finite field $GF(p^m)$ and/or the elements $R(i_1, k)$ of the finite field $GF(p^m)$, performs the extension field calculation therefor, and outputs the resulting polynomial $poly(R(i_1, 0), \ldots, R(i_1, K-1)) \in GF(p^{d \cdot m})$. A second calculation part of the finite field calculation part receives, for any $i_2 \in \{0, \ldots, N-1\}$ ($i_2 \neq i_1$), images over the finite field $GF(p^m)$ that depend on one or more elements $R(i_2, k)$ of the finite field $GF(p^m)$ and/or the elements $R(i_2, k)$ of the finite field $GF(p^m)$, performs the extension field calculation therefor, and outputs the resulting polynomial $poly(R(i_2, 0), \ldots, R(i_2, K-1)) \in GF(p^{d \cdot m})$. A third calculation part of the finite field calculation part receives the polynomial $poly(R(i_1, 0), \ldots, R(i_1, K-1))$ and the polynomial $poly(R(i_2, 0), \ldots, R(i_2, K-1))$, calculates the product thereof $poly(R(i_1, 0), \ldots, R(i_1, K-1)) \cdot poly(R(i_2, 0), \ldots, R(i_2, K-1)) \in GF(p^{d \cdot m})$, and outputs the product $poly(R(i_1, 0), \ldots, R(i_1, K-1)) \cdot poly(R(i_2, 0), \ldots, R(i_2, K-1))$.

Each element of a subset including L (which represents an even number) different elements of the set $\{0, \ldots, N-1\}$ is selected one time as $i_1$ or $i_2$, and the first calculation part, the second calculation part and the third calculation part perform respective processing stages one time for each pair of selected $i_1$ and $i_2$, thereby performing a loop process including the processing stages for the L/2 pairs of $i_1$ and $i_2$. Using the products $poly(R(i_1, 0), \ldots, R(i_1, K-1)) \cdot poly(R(i_2, 0), \ldots, R(i_2, K-1))$ obtained by the processings, $\Pi_{i=0}^{N-1} poly(R(i, 0), \ldots, R(i, K-1)) \in GF(p^{d \cdot m})$ is calculated.

As described above, at least some of the coefficients in the polynomial $poly(R(i, 0), \ldots, R(i, K-1)) \in GF(p^{d \cdot m})$ and the polynomial $poly(R(i_2, 0), \ldots, R(i_2, K-1)) \in GF(p^{d \cdot m})$ are 0 at any time. Since the product of such polynomials is calculated in advance, calculations applying the coefficients that are 0 are unnecessary, and therefore, the amount of multiplication is reduced.

Effects on the Invention

According to the present invention, the calculation $\Pi_{i=0}^{N-1} e(R(i, 0), \ldots, R(i, K-1))$ where $e(R(i, 0), \ldots, R(i, K-1))$ represents a calculation of K elements $R(i, 0), \ldots, R(i, K-1) \in GF(p^m)$ of the finite field $GF(p^m)$ over a finite field can be efficiently performed.

BRIEF DESCRIPTION OF THE DRAWINGS

FIG. 4 is a diagram for illustrating characteristics of a calculation performed by a calculation part;

DETAILED DESCRIPTION OF THE EMBODIMENTS

Figure 1:
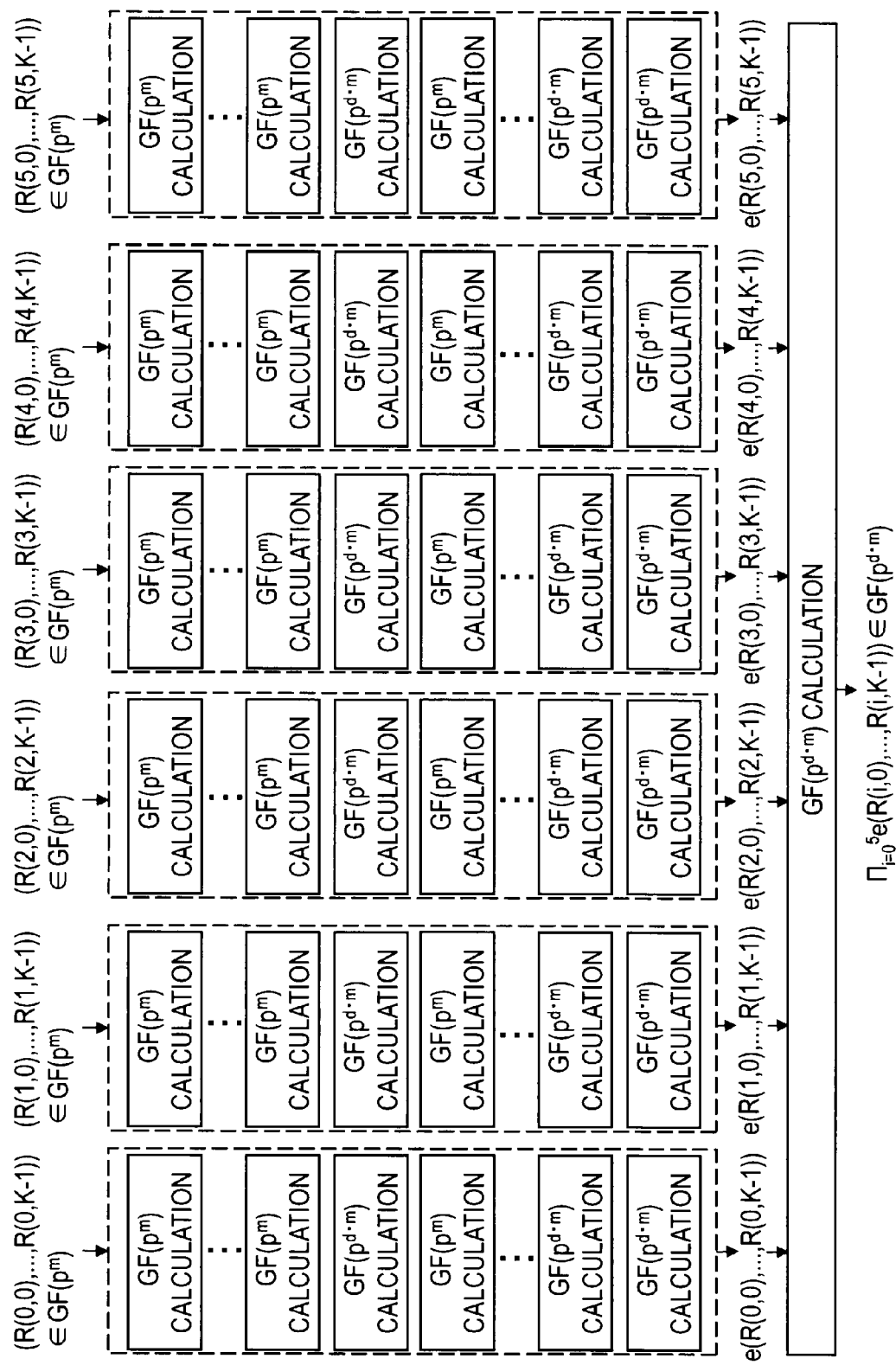
FIG. 1 is a conceptual diagram for illustrating a conventional method for calculating the formula (5)

In the following, embodiments of the present invention will be described with reference to the drawings.

DEFINITIONS

First, definitions of the terms and symbols used herein will be provided.

p: p represents a positive prime number. Specific examples of "p" include 2 and 3.

m: m represents an integer equal to or greater than 1. Specific examples of "m" include odd numbers and prime numbers equal to or greater than 3. In cryptography, values of 97, 167, 193, 239, 353 and 509 are commonly used as m, for example.

d: d represents an integer equal to or greater than 2.

L: L represents a positive even number.

N: N represents an integer equal to or greater than 2.

K: K represents an integer equal to or greater than 1.

i: i represents an element included in a set $\{0, \ldots, N-1\}$.

k: k represents an element included in a set $\{0, \ldots, K-1\}$.

$GF(p)$: $GF(p)$ represents a finite field whose order (number of elements) is p. The order p is a prime number, and therefore, the finite field $GF(p)$ is a prime field. For example, the finite field $GF(p)$ is formed by a remainder of division modulo p:

$$\beta \bmod p \qquad (6)$$

The calculation over the finite field $GF(p)$ can be implemented simply by a remainder calculation modulo p, for example. A multiplication $\beta*\gamma \in GF(p)$ over the finite field $GF(p)$ can be implemented by $(\beta*\gamma) \bmod p$, and an addition $\beta+\gamma \in GF(p)$ over the finite field $GF(p)$ can be implemented by $(\beta+\gamma) \bmod p$.

$GF(p^m)$: For $m \geq 2$, $GF(p^m)$ represents an extension field whose order is $p^m$, which is an m-th-order extension of the finite field $GF(p)$. For m=1, $GF(p^m)$ represents a prime field that satisfies a relationship of $GF(p^m)=GF(p)$.

The extension field $GF(p^m)$, which is the m-th-order extension of the finite field $GF(p)$, can be formed by a single-variable or multi-variable m-term polynomial whose indeterminate elements are roots of an irreducible polynomial over the finite field $GF(p)$ and whose coefficients are elements of the finite field $GF(p)$. For example, in the case where the extension field $GF(p^m)$ is formed by a single-variable polynomial, the extension field $GF(p^m)$ is formed by the following polynomial:

$$\kappa_0+\kappa_1 \cdot \omega+ \ldots +\kappa_{m-1} \cdot \omega^{m-1} \in GF(p^m) \qquad (7)$$

whose indeterminate elements $\omega \in GF(p^m)$ are roots of an m-th-order irreducible polynomial $ipoly(\omega)=0$ over the finite field $GF(p)$ and whose coefficients $\kappa_0, \ldots, \kappa_{m-1} \in GF(p)$ are elements of the finite field $GF(p)$. A specific example of mapping of elements of the finite field $GF(p)$ to elements of the extension field $GF(p^m)$ is distortion mapping. The term "coefficient" used herein includes a coefficient of a constant term.

An addition over the extension field $GF(p^m)$ can be implemented as an addition of polynomials expressing the extension field $GF(p^m)$. However, an addition of coefficients in the addition of the polynomials is an addition over the finite field $GF(p)$. For example, the result of an addition of $\kappa_0+\kappa_1 \cdot \omega+ \ldots +\kappa_{m-1} \cdot \omega^{m-1} \in GF(p^m)$ and $\upsilon_0+\upsilon_1 \cdot \omega+ \ldots +\upsilon_{m-1} \cdot \omega^{m-1} \in GF(p^m)$ ($\upsilon_0, \ldots, \upsilon_{m-1} \in GF(p)$) is $\{(\kappa_0+\upsilon_0)+(\kappa_1+\upsilon_1) \cdot \omega+ \ldots +(\kappa_{m-1}+\upsilon_{m-1}) \cdot \omega^{m-1}\} \in GF(p^m)$. Note that $(\kappa_0+\upsilon_0) \in GF(p)$ and $(\kappa_1+\upsilon_1) \in GF(p), \ldots$ and $(K_{m-1}+\upsilon_{m-1}) \in GF(p)$.

A multiplication over the extension field $GF(p^m)$ can be implemented by taking a remainder of the product of polynomials expressing the extension field $GF(p^m)$ modulo an irreducible polynomial whose root is an indeterminate element of the polynomials. For example, a multiplication of $\kappa_0+\kappa_1 \cdot \omega+ \ldots +\kappa_{m-1} \cdot \omega^{m-1} \in GF(p^m)$ and $\upsilon_0+\upsilon_1 \cdot \omega+ \ldots +\upsilon_{m-1} \cdot \omega^{m-1} \in GF(p^m)$ can be implemented by taking a remainder of $(\kappa_0+\kappa_1 \cdot \omega+ \ldots +\kappa_{m-1} \cdot \omega^{m-1}) \cdot (\upsilon_0+\upsilon_1 \cdot \omega+ \ldots +\upsilon_{m-1} \cdot \omega^{m-1})$ modulo an irreducible polynomial $ipoly(\omega)$. Specifically, the product over the extension field $GF(p^m)$ is an m-th or lower order polynomial obtained by substituting the irreducible polynomial $ipoly(\omega)=0$ to $(\kappa_0+\kappa_1 \cdot \omega+ \ldots +\kappa_{m-1} \cdot \omega^{m-1}) \cdot (\upsilon_0+\upsilon_1 \cdot \omega+ \ldots +\upsilon_{m-1} \cdot \omega^{m-1})$.

$GF(p^{d \cdot m})$: $GF(p^{d \cdot m})$ represents a d-th-order extension field of the finite field $GF(p^m)$. The d-th-order extension field $GF(p^{d \cdot m})$ of the finite field $GF(p^m)$ can be formed by a single-variable or multi-variable d-term polynomial whose indeterminate elements are roots of an irreducible polynomial over the finite field $GF(p^m)$ and whose coefficients are elements of the finite field $GF(p^m)$. Although an example in which an extension field is formed by a single-variable polynomial has been described above, an example in which a sixth-order extension field is formed by a two-variable polynomial will be described here.

Supposing that $\sigma \in GF(p^{6m})$ for roots c of an irreducible polynomial $ipoly1(\omega)$ over the finite field $GF(p^m)$, and $\rho \in GF(p^{6m})$ for roots of an irreducible polynomial $ipoly2(\rho)$ over the finite field $GF(p^m)$, elements of the finite field $GF(p^{6m})$ are expressed by the following polynomial, whose coefficients $a_5, \ldots, a_0 \in GF(p^m)$ are elements of the finite field $GF(p^m)$.

$$a_0+a_1 \cdot \rho+a_2 \cdot \rho^2+a_3 \cdot \sigma+a_4 \cdot \rho \cdot \sigma+a_5 \cdot \rho^2 \cdot \sigma \in GF(p^{6m}) \qquad (8)$$

For p=3, a specific example of the polynomial $ipoly1(\sigma)=0$ is $\sigma^2+1=0$, and a specific example of the polynomial $ipoly2(\sigma)=0$ is $\rho^3-\rho-b=0$ ($b \in \{-1, 1\}$). A specific example of the mapping of elements of the finite field $GF(p^m)$ to elements of the extension field $GF(p^{6m})$ is distortion mapping.

An addition over the d-th-order extension field $GF(p^{d \cdot m})$ can be implemented as an addition of polynomials expressing the d-th-order extension field $GF(p^{d \cdot m})$. However, an addition of coefficients in the addition of the polynomials is an addition over the finite field $GF(p^m)$. For example, the result of an addition of $a_0+a_1 \cdot \rho+a_2 \cdot \rho^2+a_3 \cdot \sigma+a_4 \cdot \rho \cdot \sigma+a_5 \cdot \rho^2 \cdot \sigma \in GF(p^{6m})$ and $v_0+a_1 \cdot \rho+v_2 \cdot \rho^2+v_3 \cdot \sigma+v_4 \cdot \rho \cdot \sigma+v_5 \cdot \rho^2 \cdot \sigma \in GF(p^{6m})$ ($v_5, \ldots, v_0 \in GF(p^m)$)) is expressed as follows:

$$\{(a_0+v_0)+(a_1+v_1) \cdot \rho+(a_2+v_2) \cdot \rho^2+(a_3+v_3) \cdot \sigma+ (a_4+v_4) \cdot \rho \cdot \sigma+(a_5+v_5) \cdot \rho^2 \cdot \sigma\} \in GF(p^{6m})$$

where $(a_0+v_0) \in GF(p^m)$, and $(a_1+v_1) \in GF(p^m), \ldots,$ and $(a_5+v_5) \in GF(p^m)$.

A multiplication over the d-th-order extension field $GF(p^{d \cdot m})$ can be implemented by taking a remainder of the product of polynomials expressing the d-th-order extension field $GF(p^{d \cdot m})$ modulo an irreducible polynomial whose root is an indeterminate element of the polynomials. For example, a multiplication of $a_0+a_1 \cdot \rho+a_2 \cdot \rho^2+a_3 \cdot \sigma+a_4 \cdot \rho \cdot \sigma+a_5 \cdot \rho^2 \cdot \sigma \in GF(p^{6m})$ and $v_0+a_1 \cdot \rho+v_2 \cdot \rho^2+v_3 \cdot \sigma+v_4 \cdot \rho \cdot \sigma+v_5 \cdot \rho^2 \cdot \sigma \in GF(p^m)$ can be implemented by taking a remainder of $(a_0+a_1 \cdot \rho+a_2 \cdot \rho^2+a_3 \cdot \sigma+a_4 \cdot \rho \cdot \sigma+a_5 \cdot \rho^2 \cdot \sigma) \cdot (v_0+a_1 \cdot \rho+v_2 \cdot \rho^2+v_3 \cdot \sigma+v_4 \cdot \rho \cdot \sigma+v_5 \cdot \rho^2 \cdot \sigma)$ modulo an irreducible polynomial ipoly1($\sigma$) or ipoly2($\rho$). Specifically, the product over the extension field $GF(p^{6m})$ is a sixth or lower order polynomial obtained by substituting the irreducible polynomial ipoly1($\sigma$)=0 or ipoly2($\rho$)=0 to the following formula.

$$(a_0+a_1 \cdot \rho+a_2 \cdot \rho^2+a_3 \cdot \sigma+a_4 \cdot \rho \cdot \sigma+a_5 \cdot \rho^2 \cdot \sigma) \cdot (v_0+a_1 \cdot \rho+v_2 \cdot \rho^2+v_3 \cdot \sigma+v_4 \cdot \rho \cdot \sigma+v_5 \cdot \rho^2 \cdot \sigma).$$

Note that input, calculation or output of a polynomial in any processing described below may be input, calculation or output of the polynomial itself including an indeterminate element and a coefficient or may be input, calculation or output of a vector comprising a coefficient that identifies the polynomial.

R(i, k): R(i, k) represents an element of the finite field $GF(p^m)$.

E: E represents an elliptic curve defined on the finite field $GF(p^m)$. The elliptic curve is defined as a set including a particular point O referred to as a point of infinity and a set of points (X, Y) that satisfy X and $Y \in GF(p^m)$ and the following Weierstrass equation in the affine coordinate system ($A_1, A_2, A_3, A_4, A_6 \in GF(p^m)$):

$$Y^2+A_1 \cdot X \cdot Y+A_3 \cdot Y=X^3+A_2 \cdot X^2+A_4 \cdot X+A_6 \quad (9)$$

$E^b$: $E^b$ represents a supersingular elliptic curve that is defined on a finite field $GF(3^m)$ and expressed as follows.

$$Y^2=X^3-X+b \; (b \in \{-1,1\}) \quad (10)$$

e(R(i, 0), . . . , R(i, K−1)): e(R(i, 0), . . . , R(i, K−1)) represents a calculation of K elements R(i, 0), . . . , R(i, K−1)$\in GF(p^m)$ of the finite field $GF(p^m)$ over a finite field. For K=4, a specific example of e(R(i, 0), . . . , R(i, K−1)) is a pairing calculation e(P($X_1[i], Y_1[i]$), Q($X_2[i], Y_2[i]$)) where R(i, 0), R(i, 1), R(i, 2) and R(i, 3) are affine coordinate points $X_1[i], Y_1[i], X_2[i]$ and $Y_2[i] \in GF(p^m)$, respectively, of two points P($X_1[i], Y_1[i]$) and Q($X_2[i], Y_2[i]$) on the elliptic curve E defined on the finite field $GF(p^m)$. Specific examples of the pairing calculation e(P($X_1[i], Y_1[i]$), Q($X_2[i], Y_2[i]$)) is pairing calculation in characteristic 3 (p=3), such as the Tate pairing, the $\eta_T$ pairing calculation, the improved $\eta_T$ pairing calculation or other, or pairing calculation in characteristic 2 (p=2).

[Summary]

Next, an embodiment will be summarized.

<Configuration>

Figure 2A:
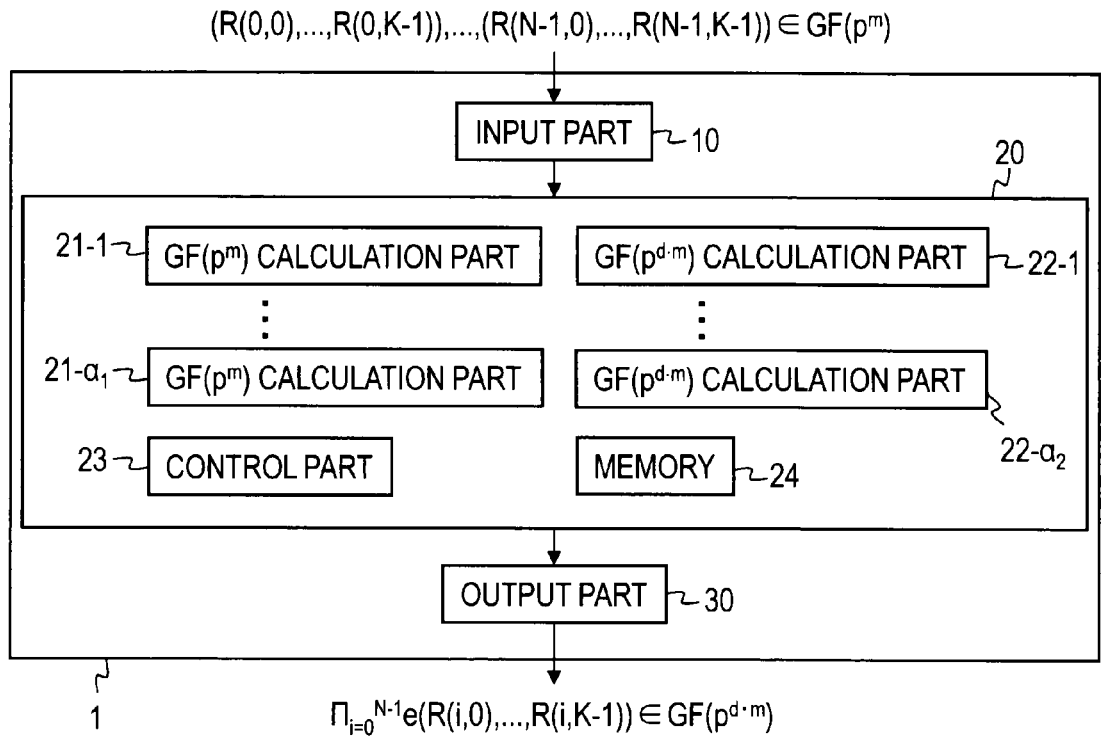
FIG. 2A is a block diagram for illustrating a basic configuration of a finite field calculation apparatus according to an embodiment.
Figure 2B:
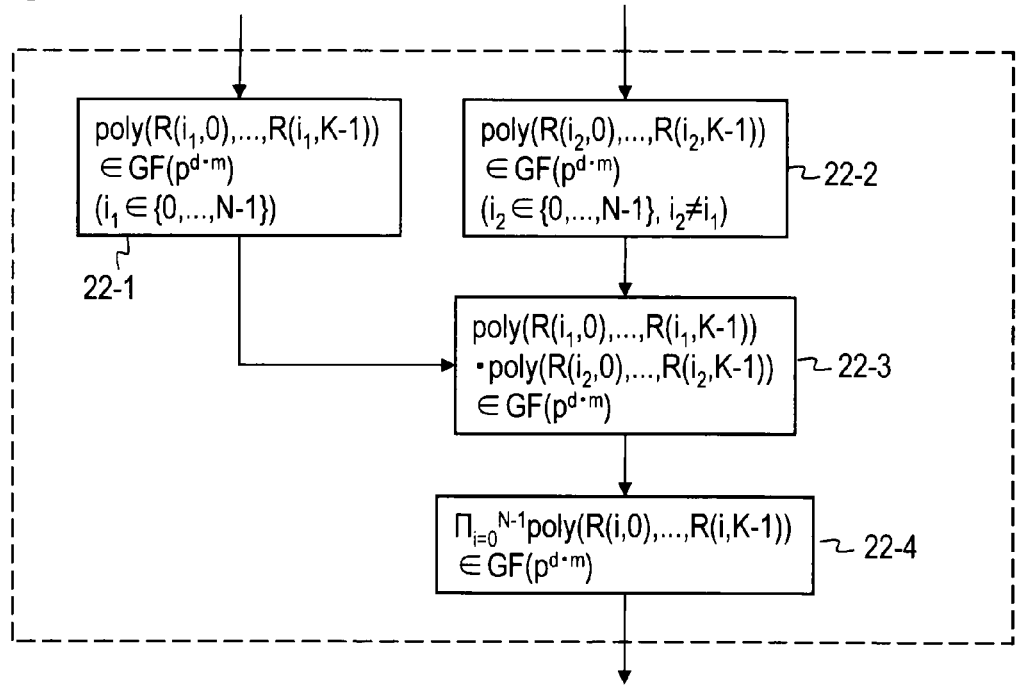
FIG. 2B is a block diagram for illustrating a configuration of four $GF(p^{d \cdot m})$ calculation parts in the finite field calculation part.

FIG. 2A is a block diagram for illustrating a basic configuration of a finite field calculation apparatus 1 according to an embodiment. FIG. 2B is a block diagram for illustrating a configuration of four $GF(p^{d \cdot m})$ calculation parts 22-1 to 22-4 in a finite field calculation part 20.

As shown in FIG. 2A, the finite field calculation apparatus 1 according to this embodiment has an input part 10, the finite field calculation part 20 and an output part 30. The finite field calculation part 20 has one or more $GF(p^m)$ calculation parts 21-1 to 21-$\alpha_1$ ($\alpha_1 \geq 1$) that perform a calculation over the finite field $GF(p^{d \cdot m})$, four or more $GF(p^m)$ calculation parts 22-1 to 22-$\alpha_2$ ($\alpha_2 \geq 4$) that perform a calculation over the finite field $GF(p^{d \cdot m})$, a control part 23 and a memory 24. The finite field calculation part 1 is formed by a well-known computer having a central processing unit (CPU), a random-access memory (RAM), a read-only memory (ROM), an input/output interface and the like with a predetermined program loaded therein. That is, the $GF(p^m)$ calculation parts 21-1 to 21-$\alpha_1$, the $GF(p^{d \cdot m})$ calculation parts 22-1 to 22-$\alpha_2$ and the control part 23 are functional parts that are implemented by a predetermined program read in by the CPU, and the memory 24 is a RAM, a cache memory, a register or a hard disk, for example. At least a part of the finite field calculation part 20 may be formed by an integrated circuit.

<Process>

Next, a process performed by the finite field calculation apparatus 1 according to this embodiment will be summarized.

Figure 3:
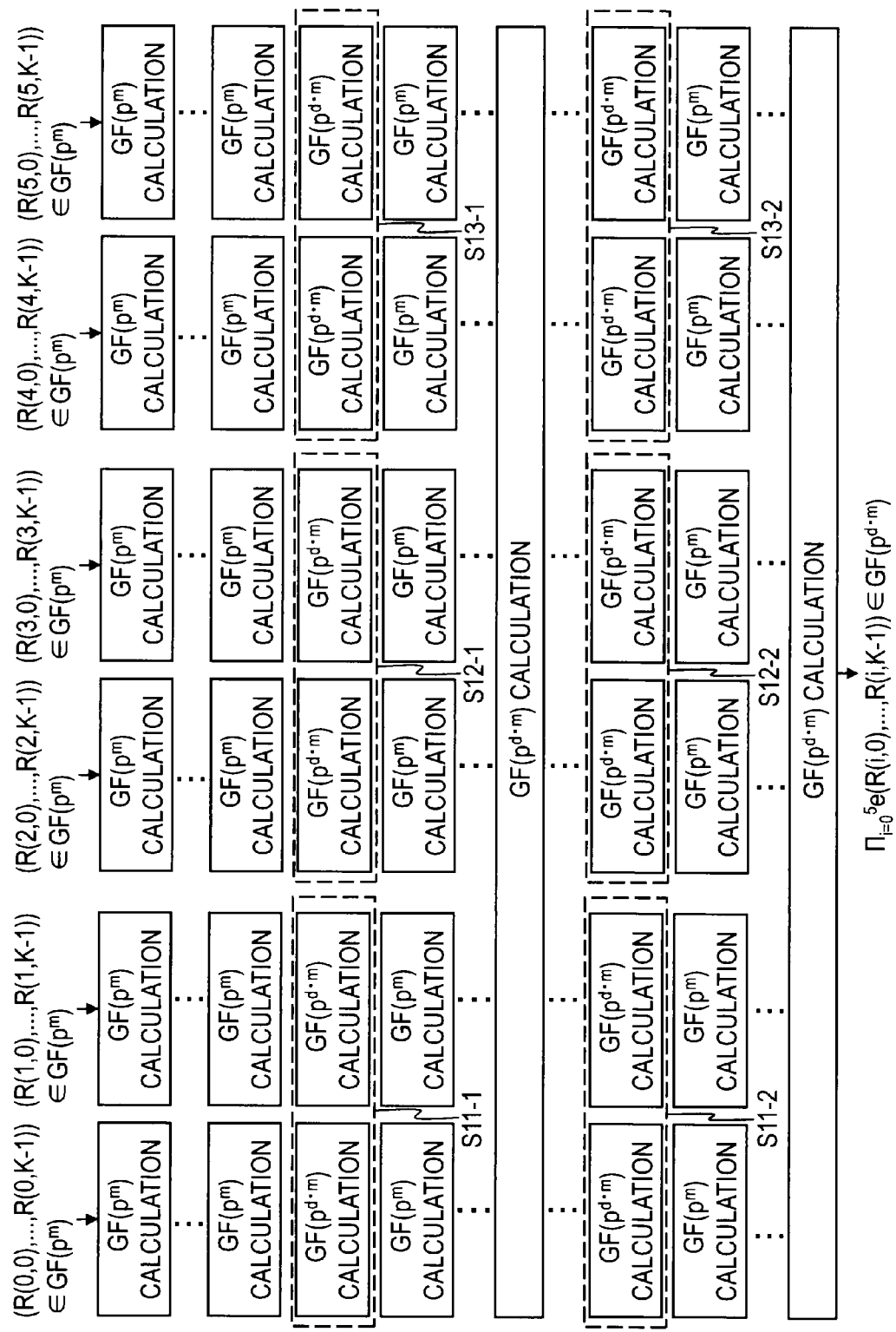
FIG. 3 is a diagram for schematically illustrating a process performed by the finite field calculation apparatus according to an embodiment.

FIG. 3 is a diagram for schematically illustrating a process performed by the finite field calculation apparatus 1 according to this embodiment. FIG. 4 is a diagram for illustrating characteristics of a calculation performed by a calculation part 22-3. Although FIG. 3 shows an example in which N=6, and FIG. 4 shows an example in which d=6, the present invention is not limited to these examples. Although not explicitly described, each processing performed in the finite field calculation apparatus 1 described below is performed under the control of the control part 23. Every data output from each calculation part is stored in the memory 24. The calculation part reads data from the memory 24 and uses the data for calculation as required.

When the finite field calculation apparatus 1 starts the process, N*K elements R(i, k)$\in GF(p^m)$ of the finite field $GF(p^m)$ are first input to the input part 10 and then passed to the finite field calculation part 20. On the assumption that a calculation of K elements R(i, 0), . . . , R(i, K−1)$\in GF(p^m)$ of the finite field $GF(p^m)$ over a finite field is expressed as e(R(i, 0), . . . , R(i, K−1)), the finite field calculation part 20 performs a calculation $\Pi_{i=0}^{N-1}$e(R(i, 0), . . . , R(i, K−1)) and passes the calculation result to the output part 30. The output part 30 outputs the received calculation result.

[Extension Field Calculation Included in Calculation e(R (i, 0), . . . , R(i, K−1))]

The calculation e(R(i, 0), . . . , R(i, K−1)) over the finite field $GF(p^m)$ includes, as a part thereof, an extension field calculation over the d-th-order extension field $GF(p^{d \cdot m})$ (d$\geq$2) of the finite field $GF(p^m)$. The extension field calculation is a calculation that maps images on the finite field $GF(p^m)$ that depend on input one or more elements R(i, k)$\in \{$R(i, 0), . . . , R(i, K−1)$\}$ of the finite field $GF(p^m)$ and/or the elements R(i, k)$\in \{$R(i, 0), . . . , R(i, K−1)$\}$ to a polynomial poly (R(i, 0), . . . , R(i, K−1))$\in GF(p^{d \cdot m})$ that expresses elements of the d-th-order extension field $GF(p^{d \cdot m})$. That is, the extension field calculation is mapping from the finite field $GF(p^m)$ to the d-th-order extension field $GF(p^{d \cdot m})$.

For the polynomial poly(R(i, 0), . . . , R(i, K−1))$\in GF(p^{d \cdot m})$ obtained by the extension field calculation, coefficients $a_h$ of some terms h$\in \{$0, . . . , d−1$\}$ are images on the finite field $GF(p^m)$ that depend on one or more elements R(i, k) of the finite field $GF(p^m)$ and/or the elements R(i, k) of the finite field $GF(p^m)$, and coefficients $a_r$ of predetermined terms r$\in \{$0, . . . , d−1$\}$ (r$\neq$h) are previously determined to be 0$\in GF(p^m)$. Since the number of terms of the polynomial poly(R(i, 0), . . . , R(i, K−1))$\in GF(p^{d \cdot m})$ that expresses elements of the d-thorder extension field $GF(p^{d \cdot m})$ is equal to or greater than 2 ($d \geq 2$), elements of the finite field $GF(p^m)$ can be mapped to a polynomial the coefficients of some of the terms of which are previously determined to be $0 \in GF(p^m)$.

A specific example of such an extension field calculation is a calculation over the sixth-order extension field $GF(3^{6m})$ according to the improved $\eta_T$ pairing calculation algorithm described above. That is, the calculations according to the following formulas (11) and (12) are specific examples of the extension field calculation described above.

$$f = -y_1 \cdot u + y_2 \cdot \sigma + y_1 \cdot \rho \in GF(3^{6m}) \tag{11}$$

$$g = -u^2 + y_1 \cdot y_2 \cdot \sigma - u \cdot \rho - \rho^2 \in GF(3^{6m}) \tag{12}$$

These are examples in the case where $p=3$, $d=6$ and $K=4$ on the assumption that $R(i, 0)$, $R(i, 1)$, $R(i, 2)$ and $R(i, 3)$ are affine coordinate points $X_1, Y_1, X_2$ and $Y_2 \in GF(3^m)$, respectively, of two points $P(X_1, Y_1)$ and $Q(X_2, Y_2)$ on the supersingular elliptic curve $E^b$ (formula (10)), the affine coordinate points $X_1, Y_1, X_2$ and $Y_2$ or the images thereof are represented by $x_1, y_1, x_2$ and $y_2 \in GF(3^m)$, $u = x_1 + x_2 + c \in GF(3^m)$, and the irreducible polynomials are $\sigma^2 + 1 = 0$ and $\rho^3 - \rho - b = 0$.

As described above, the maximum value of the number of terms of the polynomial that expresses the elements of the sixth-order extension field $GF(p^{d \cdot m})$ of the finite field $GF(p^m)$ is 6. However, the coefficients of the terms of the indeterminate elements $\rho^2$, $\rho \cdot \sigma$ and $\rho^2 \cdot \sigma \in GF(p^{6m})$ of the polynomial $f = -y_1 \cdot u + y_2 \cdot \sigma + y_1 \cdot \rho \in GF(3^{6m})$ are previously determined to be 0, and the coefficients of the terms of the indeterminate elements $\rho \cdot \sigma$ and $\rho^2 \cdot \sigma \in GF(p^{6m})$ of the polynomial $g = -u^2 + y_1 \cdot y_2 \cdot \sigma - u \cdot \rho - \rho^2 \in GF(3^{6m})$ are previously determined to be 0 (see formula (8)). That is, the formulas (11) and (12) can be expressed as the following formulas (13) and (14).

$$f = -y_1 \cdot u + y_1 \cdot \rho + 0 \cdot \rho^2 + y_2 \cdot \sigma + 0 \cdot \rho \cdot \sigma + 0 \cdot \rho^2 \cdot \sigma \in GF(3^{6m}) \tag{13}$$

$$g = -u^2 - u \cdot \rho - \rho^2 + y_1 \cdot y_2 \cdot \sigma + 0 \cdot \rho \cdot \sigma + 0 \cdot \rho^2 \cdot \sigma \in GF(3^{6m}) \tag{14}$$

The distortion mapping described below is also an example of the extension field calculation having the characteristics described above.

$$-x_2 + \rho \in GF(3^{6m}) \tag{15}$$

$$y_2 \cdot \sigma \in GF(3^{6m}) \tag{16}$$

The formulas (15) and (16) can be expressed as the following formulas (17) and (18).

$$-x_2 + \rho + 0 \cdot \rho^2 + 0 \cdot \sigma + 0 \cdot \rho \cdot \sigma + 0 \cdot \rho^2 \cdot \sigma \in GF(p^{6m}) \tag{17}$$

$$0 + 0 \cdot \rho + 0 \cdot \rho^2 + y_2 \cdot \sigma + 0 \cdot \rho \cdot \sigma + 0 \cdot \rho^2 \cdot \sigma \in GF(p^{6m}) \tag{18}$$

There are many other examples of the calculation that maps elements of a finite field $GF(p^m)$ having an order $p^m$ to a d-th-order extension field $GF(p^{d \cdot m})$ having an order $p^{d \cdot m}$ ($d \geq 2$) greater than the order $p^m$.

[Calculation Performed by Finite Field Calculation Part 20]

The extension field calculation included in the calculation $e(R(i, 0), \ldots, R(i, K-1))$ described above is performed by the $GF(p^{d \cdot m})$ calculation part 22 in the finite field calculation part 20 shown in FIG. 2B.

First, images on the finite field $GF(p^m)$ that depend on one or more elements $R(i_1, k)$ ($i_1 \in \{0, \ldots, N-1\}$) of the finite field $GF(p^m)$ and/or the elements $R(i_1, k)$ of the finite field $GF(p^m)$ are input to a calculation part 22-1 (first calculation part) in the $GF(p^{d \cdot m})$ calculation part 22. Note that the "images on the finite field $GF(p^m)$ that depend on one or more elements $R(i_1, k)$ of the finite field $GF(p^m)$" are the result of calculation performed by any of the $GF(p^m)$ calculation parts 21 in the finite field calculation part 20. A specific example of the calculation result is the result of calculation over the finite field $GF(3^m)$ according to the improved $\eta_T$ pairing calculation algorithm described above. That is, the following calculation result is a specific example of the "images on the finite field $GF(p^m)$ that depend on one or more elements $R(i_1, k)$ of the finite field $GF(p^m)$".

$$y_1 = -y_1 \in GF(3^m) \tag{19}$$

$$u = x_1 + x_2 + b \in GF(3^m) \tag{20}$$

$$u = x_1 + x_2 + c \in GF(3^m) \tag{21}$$

$$y_1 = -y_1 \in GF(3^m) \tag{22}$$

$$x_2 = x_2^9 \in GF(3^m) \tag{23}$$

$$y_2 = y_2^9 \in GF(3^m) \tag{24}$$

Note that these are examples on the assumption that elements $R(i, 0)$, $R(i, 1)$, $R(i, 2)$ and $R(i, 3)$ of the finite field $GF(p^m)$ are affine coordinate points $X_1, Y_1, X_2$ and $Y_2 \in GF(3^m)$, respectively, of two points $P(X_1, Y_1)$ and $Q(X_2, Y_2)$ on the supersingular elliptic curve $E^b$ (formula (10)), and the affine coordinate points $X_1, Y_1, X_2$ and $Y_2$ are or the images thereof are represented by $x_1, y_1, x_2$ and $y_2 \in GF(3^m)$. There are many similar calculations over the finite field $GF(p^m)$.

The calculation part 22-1 performs the extension field calculation described above on the images on the finite field $GF(p^m)$ that depend on one or more elements $R(i_1, k)$ of the finite field $GF(p^m)$ and/or the elements $R(i_1, k)$ of the finite field $GF(p^m)$ and outputs the resulting polynomial:

$$poly(R(i_1, 0), \ldots, R(i_1, K-1)) \in GF(p^{d \cdot m}) \tag{25}$$

Then, images on the finite field $GF(p^m)$ that depend on one or more elements $R(i_2, k)$ ($i_2 \in \{0, \ldots, N-1\}$ ($i_2 \neq i_1$)) of the finite field $GF(p^m)$ and/or the elements $R(i_2, k)$ of the finite field $GF(p^m)$ are input to a calculation part 22-2 (second calculation part) in the $GF(p^{d \cdot m})$ calculation part 22. Note that the "images on the finite field $GF(p^m)$ that depend on one or more elements $R(i_2, k)$ of the finite field $GF(p^m)$" are the result of calculation performed by any of the $GF(p^m)$ calculation parts 21 in the finite field calculation part 20. The calculation part 22-2 performs the extension field calculation described above on these images or elements and outputs the resulting polynomial:

$$poly(R(i_2, 0), \ldots, R(i_2, K-1)) \in GF(p^{d \cdot m}) \tag{26}$$

Then, the polynomials $poly(R(i_1, 0), \ldots, R(i_1, K-1))$ and $poly(R(i_2, 0), \ldots, R(i_2, K-1))$ described above are input to the calculation part 22-3 (third calculation part) in the $GF(p^{d \cdot m})$ calculation part 22. The calculation part 22-3 determines their product $$poly(R(i_1, 0), \ldots, R(i_1, K-1)) \cdot poly(R(i_2, 0), \ldots, R(i_2, K-1)) \in GF(p^{d \cdot m}) \tag{27}$$

and outputs the product $poly(R(i_1, 0), \ldots, R(i_1, K-1)) \cdot poly(R(i_2, 0), \ldots, R(i_2, K-1)) \in GF(p^{d \cdot m})$.

The calculation part 22-3 in this embodiment determines the product $poly(R(i_1, 0), \ldots, R(i_1, K-1)) \cdot poly(R(i_2, 0), \ldots, R(i_2, K-1))$ without performing any calculation that involves as operands the terms of the polynomial $poly(R(i_1, 0), \ldots, R(i_1, K-1))$ that are previously determined to be $0 \in GF(p^m)$ and/or the terms of the polynomial $poly(R(i_2, 0), \ldots, R(i_2, K-1))$ that are previously determined to be $0 \in GF(p^m)$. In the example shown in FIG. 4, the calculation part 22-1 outputs $poly(R(i_1, 0), \ldots, R(i_1, K-1)) = a_0[i_1] + a_1[i_1] \cdot \rho + a_2[i_1] \cdot \rho 2 + a_3[i_1] \cdot \sigma + 0 \cdot \rho \cdot \sigma + 0 \cdot \rho 2 \cdot \sigma$, the calculation part 22-2 outputs $poly(R(i_2, 0), \ldots, R(i_2, K-1)) = a_0[i_2] + a_1[i_2] \cdot \rho + a_2[i_2] \cdot \rho 2 + a_3[i_2]$ ·σ0·ρ·σ+0·ρ2·σ, and the calculation part 22-3 determines the product thereof over the sixth-order extension field GF($p^{6m}$). In this example, the coefficients of the indeterminate elements ρ*σ and ρ²*σ of each polynomial are previously determined to be 0, and thus, no calculation that involves the coefficients of the indeterminate elements ρ*σ and ρ2*σ as operands is not performed. As described above, according to this embodiment, the calculation amount is reduced by performing a multiplication of polynomials the coefficients of some of the terms of which are previously determined to be 0.

The control part 23 makes the calculation parts 22-1 to 22-3 perform a loop process (horizontal loop) in which the series of processing stages are performed L/2 times while changing the values $i_1$ and $i_2$ in such a manner that each element of a subset including L (which represents an even number) different elements of the set {0, . . . , N−1} is used one time as $i_1$ or $i_2$. In other words, the control part 23 selects each element of a subset including L (which represents an even number) different elements of the set {0, . . . , N−1} one time as $i_1$ and $i_2$, and makes the calculation parts 22-1 to 22-3 perform the series of processing stages thereof one time for each pair of selected $i_1$ and $i_2$, thereby performing a loop process including the series of processing stages for the L/2 pairs ($i_1$, $i_2$). As required, the control part 23 makes the calculation parts perform, multiple times, the loop process that involves performing the series of processing stages L/2 times (vertical loop). This embodiment is most effective when N is an even number, L=N, and the subset described above is the set {0, . . . , N−1}.

In the example shown in FIG. 3, a loop process (horizontal loop) comprising the series of processing stages for i=0 and 1 (step S11-$j$), the series of processing stages for i=4 and 5 (step S12-$j$) and the series of processing stages for i=4 and 5 (step S13-$j$) is performed multiple times (j=1, 2, . . . ).

The product poly(R($i_1$, 0), . . . , R($i_1$, K−1))·poly(R ($i_2$, 0), . . . , R($i_2$, K−1)) output from the calculation part 22-3 as a result of each series of processing stages is input to a calculation part 22-4 (fourth calculation part). Using these products, the calculation part 22-4 determines $$\Pi_{i=0}^{N-1} \text{poly}(R(i,0), \ldots, R(i,K-1)) \in GF(p^{dm}) \quad (28)$$

and outputs $\Pi_{i=0}^{N-1}$ poly(R(i, 0), . . . , R(i, K−1)). For example, if N≧4, the calculation part 22-4 determines the multiplication value $\Pi_{i=0}^{N-1}$ poly(R(i, 0), . . . , R(i, K−1))∈GF ($p^{dm}$) from the products poly(R($i_1$, 0), . . . , R($i_2$, K−1))·poly (R($i_2$, 0), . . . , R($i_2$, K−1)) output from the calculation part 22-3 as results of the series of processing stages.

Alternatively, the calculation part 22-4 may successively stores the products poly(R($i_1$, 0), . . . , R($i_1$, K−1))·poly(R($i_2$, 0), . . . , R($i_2$, K−1)) output from the calculation part 22-3 as results of the series of processing stages in the memory 24 and calculate the multiplication value thereof after the products are completely calculated. From the viewpoint of saving of the capacity of the memory 24, however, the calculation part 22-4 preferably determines the multiplication value each time one series of processing stages is performed by multiplying the previous multiplication value (the initial value is 1, the multiplicative identity element) by the product poly(R ($i_1$, 0), . . . , R($i_1$, K−1))·poly(R($i_2$, 0), . . . , R($i_2$, K−1)) output from the calculation part 22-3. In other words, each time one series of processing stages is performed, the multiplication value of the products poly(R($i_1$, 0), . . . , R($i_1$, K−1))·poly(R ($i_2$, 0), . . . , R($i_2$, K−1)) which have been obtained is preferably updated.

First Embodiment

Next, a first embodiment of the present invention will be described.

This embodiment is an example in which the present invention is applied to the part of calculation of g of the improved $\eta_T$ pairing calculation algorithm.

According to this embodiment, K=4, p=3, d=6, m is an odd number equal to or greater than 1, N is an even number equal to or greater than 4, L=N, elements R(i, 0), R(i, 1), R(i, 2) and R(i, 3) of the finite field GF($p^m$) are affine coordinate points $X_1[i]$, $Y_1[i]$, $X_2[i]$ and $Y_2[i]$∈GF($p^m$), respectively, of two points P($X_1[i]$, $Y_1[i]$) and Q($X_2[i]$, $Y_2[i]$) on the elliptic curve E defined on the finite field GF($p^m$), the calculation e(R (i, 0), . . . , R(i, K−1)) is a pairing calculation e(P($X_1[i]$, $Y_1[i]$), Q($X_2[i]$, $Y_2[i]$)), and the calculation $\Pi_{i=0}^{N-1}$e(R(i, 0), . . . , R(i, K−1)) is a multi-pairing calculation $\Pi_{i=0}^{N-1}$e(P($X_1[i]$, $Y_1[i]$), Q($X_2[i]$, $Y_2[i]$)). Furthermore, according to embodiment, the elliptic curve is the supersingular elliptic curve $E^b$ expressed by the formula (10) (b=−1 or 1). Furthermore, the extension field calculation according to this embodiment is a calculation that determines a polynomial that expresses elements of the sixth-order extension field GF($3^{6m}$) of the finite field GF($3^m$)

$$g[i] = -\{u[i]\}^2 + y_1[i] \cdot y_2[i] \cdot \sigma - u[i] \cdot \rho - \rho^2 \in GF(3^{6m}) \quad (29)$$

where the affine coordinate points $X_1[i]$, $Y_1[i]$, $X_2[i]$ and $Y_2[i]$ input to the input part or the images thereof are represented by $x_1[i]$, $y_1[i]$, $x_2[i]$ and $y_2[i]$, respectively, u[i]=$x_1[i]$+$x_2[i]$+c∈GF($3^m$), the indeterminate element σ is a root of the irreducible polynomial σ²+1=0 whose coefficients are elements of the finite field GF($3^m$), and the indeterminate element ρ is a root of the irreducible polynomial ρ³−ρ−b=0.

<Configuration>

Figure 5:
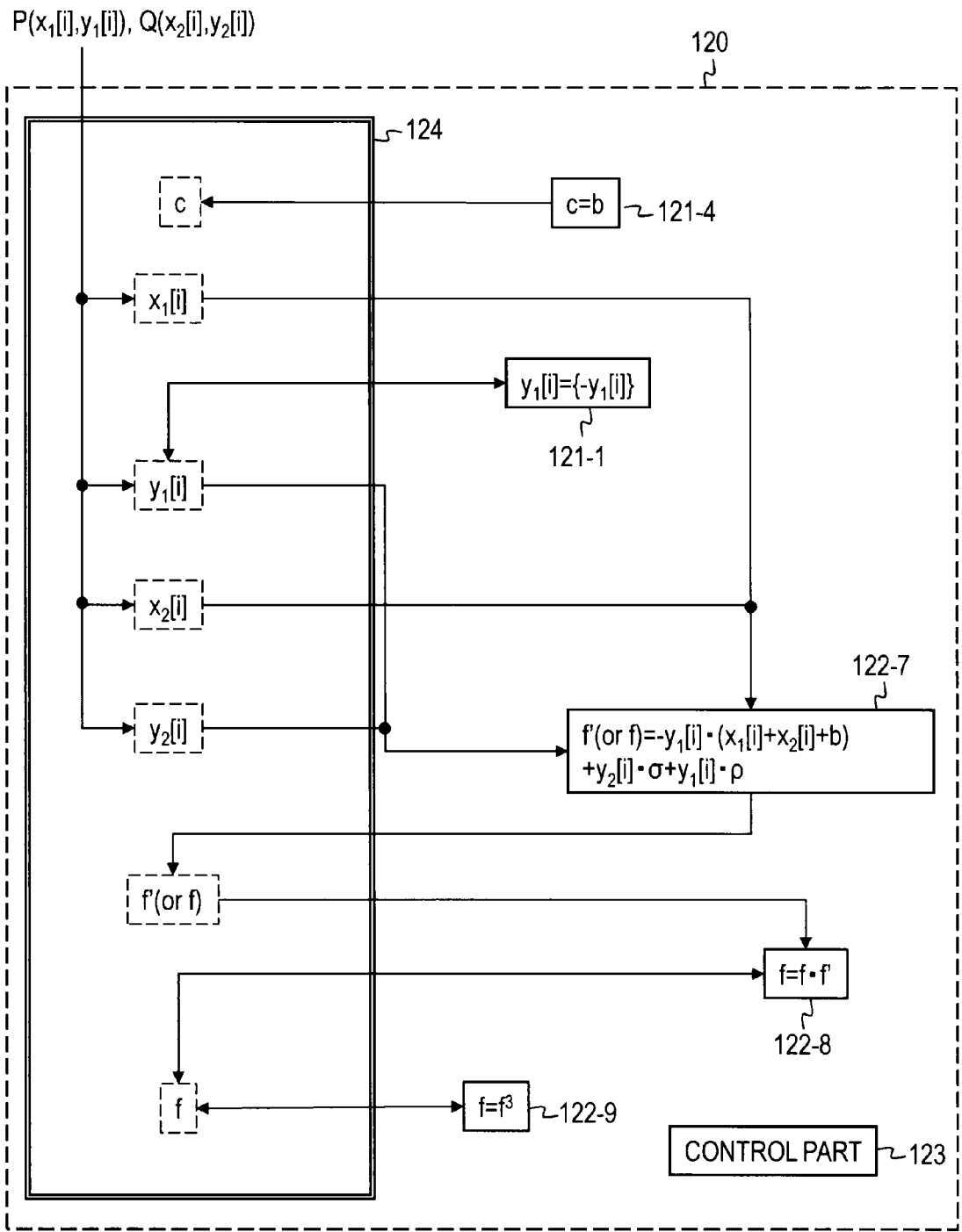
FIG. 5 is a block diagram for illustrating a basic configuration of a finite field calculation part according to a first embodiment.
Figure 6:
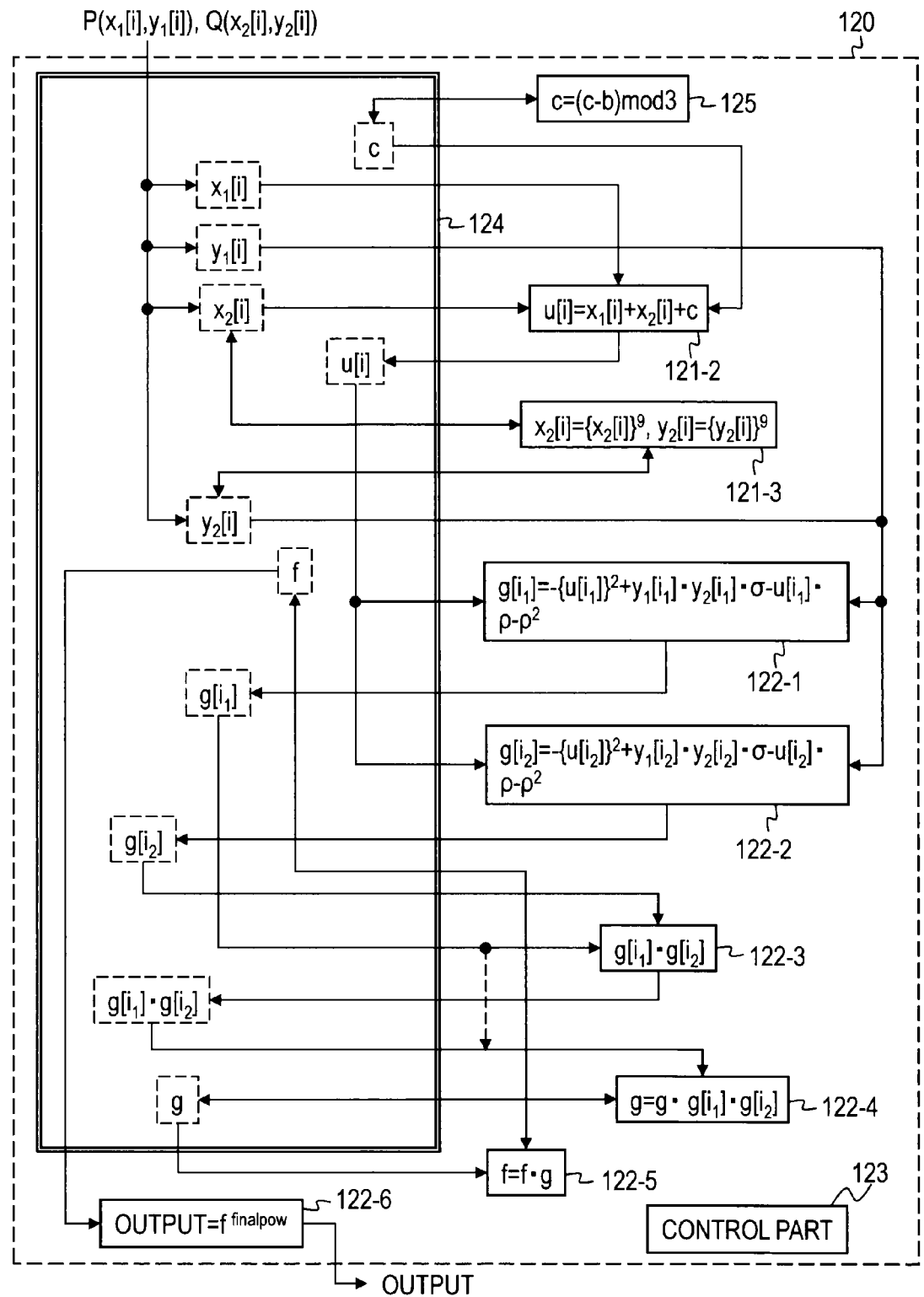
FIG. 6 is a block diagram for illustrating a basic configuration of the finite field calculation part according to the first embodiment.
Figure 7:
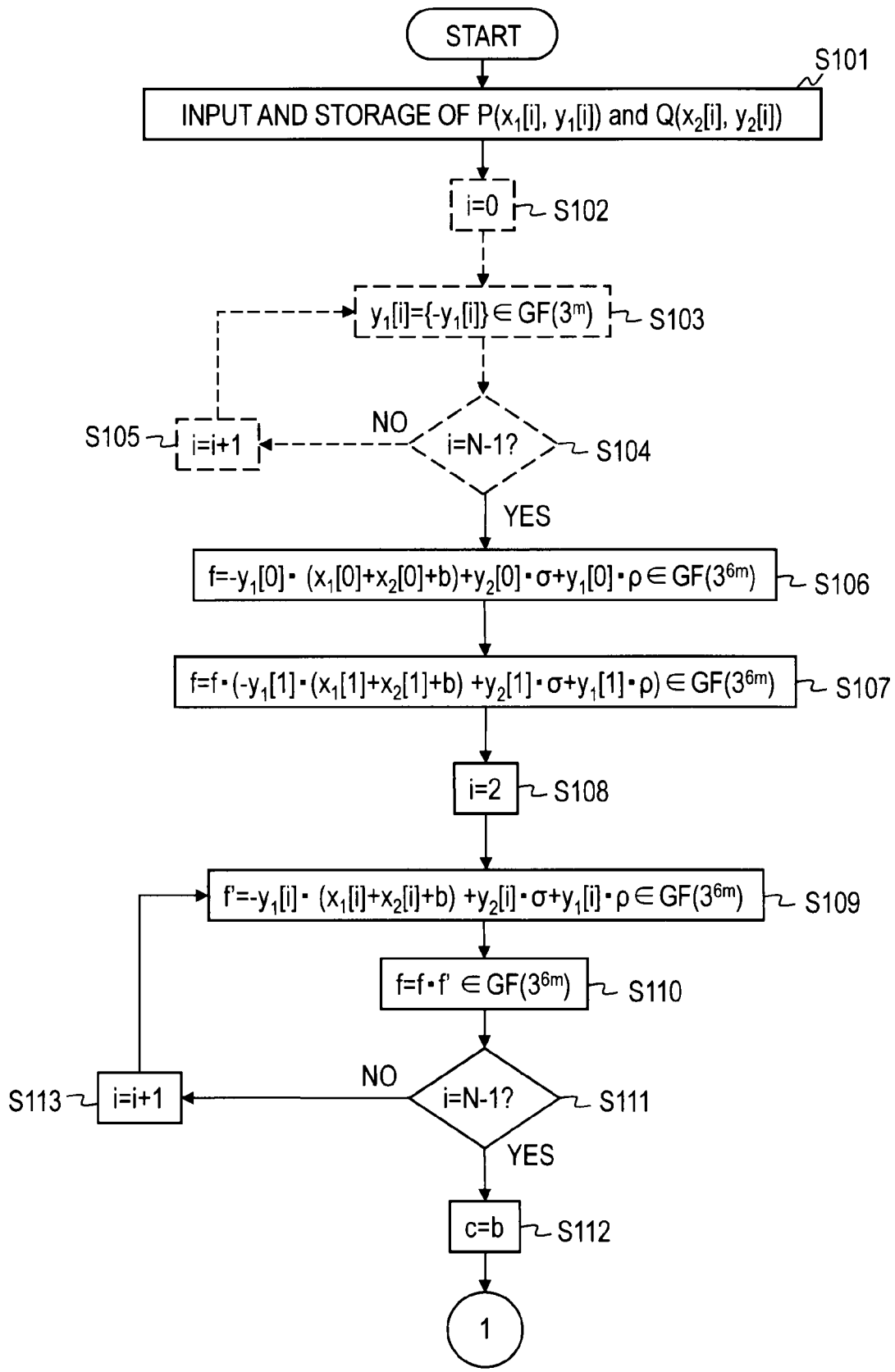
FIG. 7 is a diagram for illustrating a process according to the first embodiment.
Figure 8:
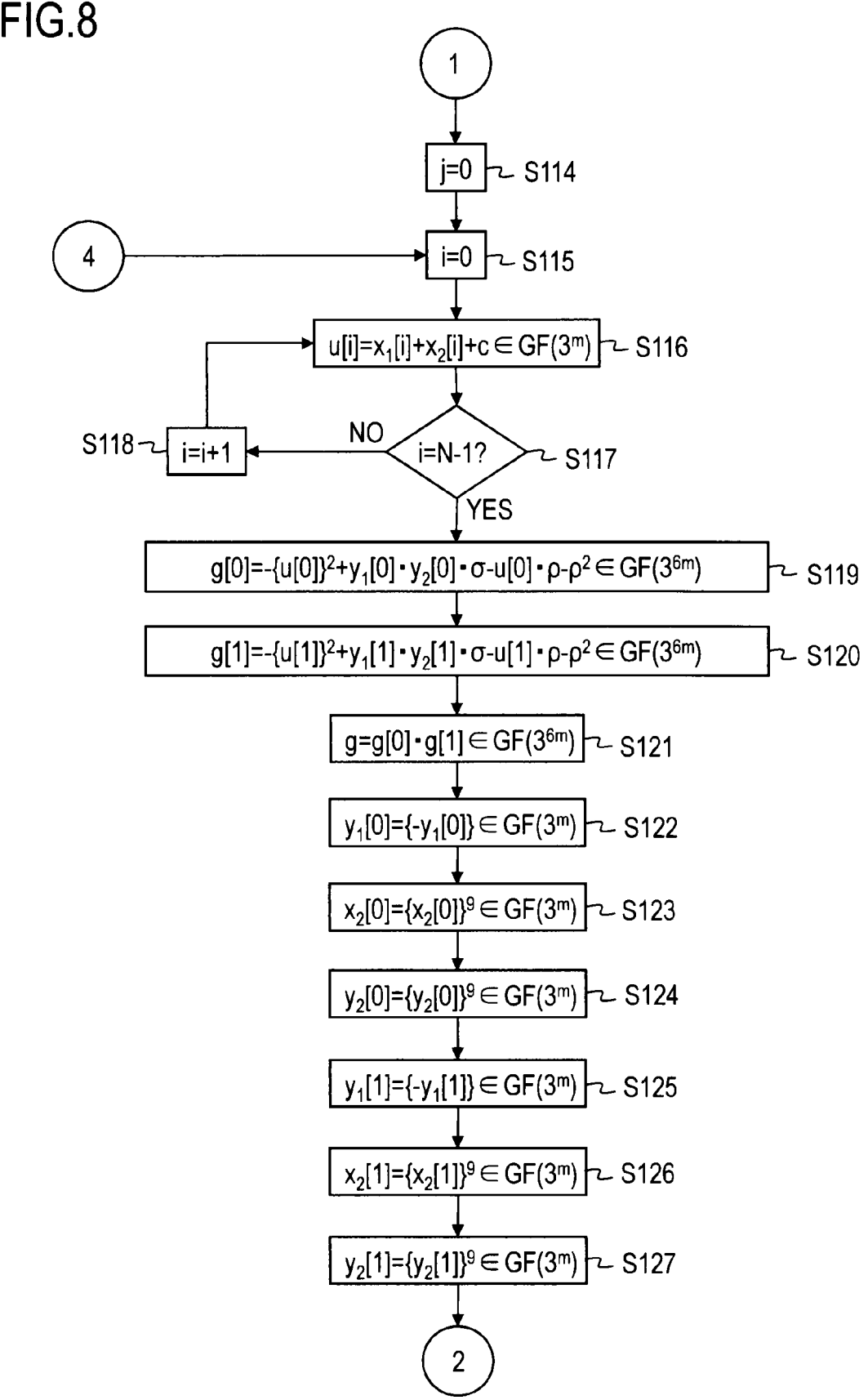
FIG. 8 is a diagram for illustrating the process according to the first embodiment.
Figure 9:
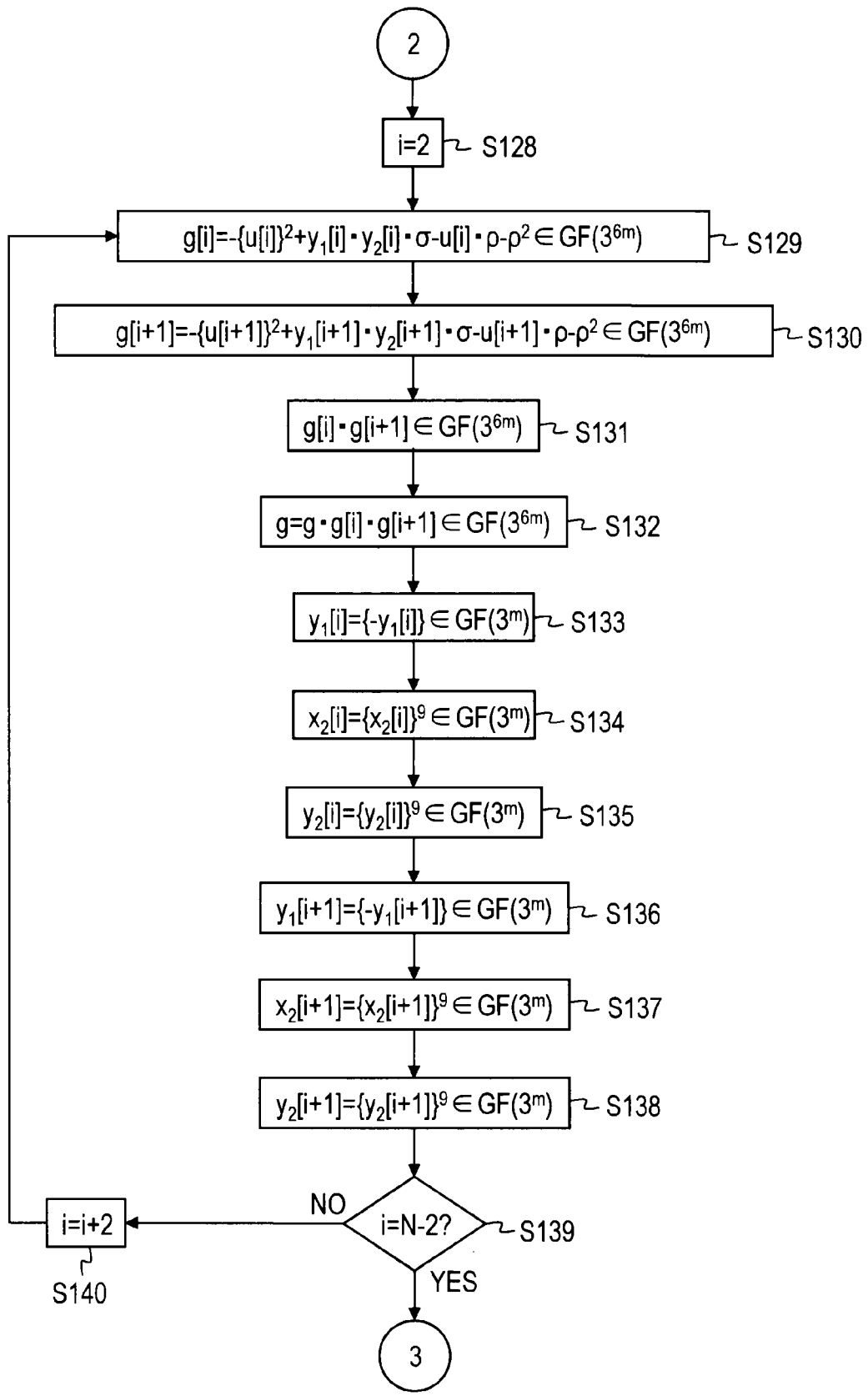
FIG. 9 is a diagram for illustrating the process according to the first embodiment.
Figure 10:
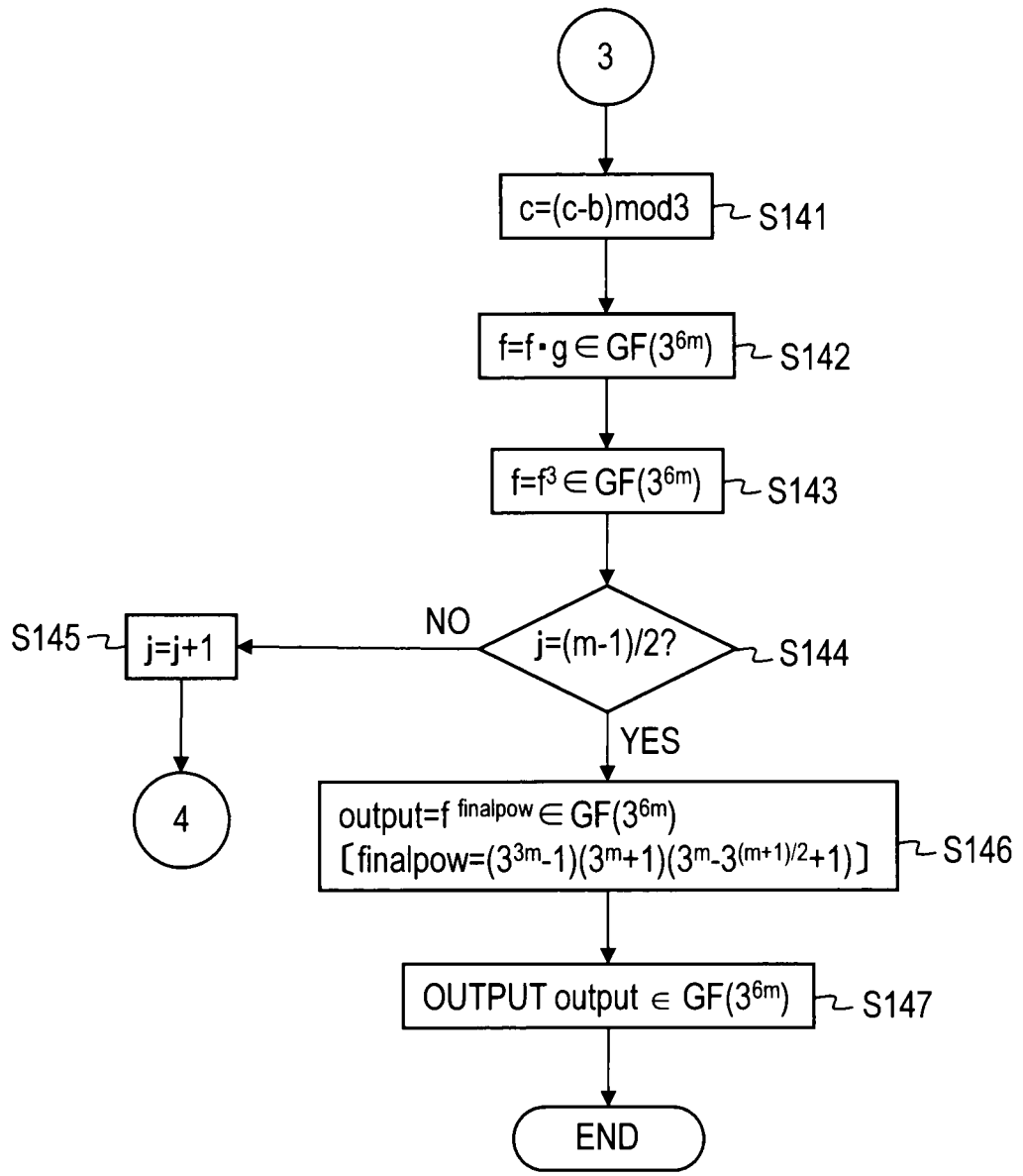
FIG. 10 is a diagram for illustrating the process according to the first embodiment.

FIGS. 5 and 6 are block diagrams for illustrating a basic configuration of a finite field calculation part 120 according to the first embodiment.

A finite field calculation apparatus according to the first embodiment is the finite field calculation apparatus shown in FIG. 2A with the finite field calculation part 20 replaced with the finite field calculation part 120 shown in FIGS. 5 and 6. The following description will be focused only on the configuration of the finite field calculation part 120.

As shown in FIGS. 5 and 6, the finite field calculation part 120 according to this embodiment has GF($3^m$) calculation parts 121-1 to 121-4 that perform a calculation over the finite field GF($3^m$), GF($3^{6m}$) calculation parts 122-1 to 122-9 that perform a calculation over the sixth-order extension field GF($3^{6m}$) of the finite field GF($3^m$), a control part 123, a memory 124 and a GF(3) calculation part 125 that performs a calculation over a finite field GF(3).

The finite field calculation part 120 is a special device that comprises a well-known or dedicated computer having a CPU, a RAM and a ROM, for example, and a special program. That is, the GF($3^m$) calculation parts 121-1 to 121-4, the GF($3^{6m}$) calculation parts 122-1 to 122-9, the GF(3) calculation part 125 and the control part 123 are functional parts that are implemented by a predetermined program read in by the CPU, and the memory 124 is a RAM, a cache memory, a register or a hard disk, for example. At least a part of the finite field calculation part 120 may be formed by an integrated circuit.

<Process>

FIGS. 7 to 10 are diagrams for illustrating a process according to the first embodiment. In the following, the process according to the first embodiment will be described with reference to these drawings.

First, affine coordinate points $X_1[i]$, $Y_1[i]$, $X_2[i]$ and $Y_2[i]$ ∈GF($p^m$) (i∈{0, . . . , N−1}) of two points P($X_1[i]$, $Y_1[i]$) and Q($X_2[i]$, $Y_2[i]$) on the supersingular elliptic curve $E^b$, which are input values for each pairing calculation e(P($X_1[i]$, $Y_1[i]$), $Q(X_2[i], Y_2[i]))$ forming the multi-pairing calculation $\Pi_{i=0}^{N-1} e(P(X_1[i], Y_1[i]), Q(X_2[i], Y_2[i]))$, are input to the input part 10 (FIG. 2A) and stored in the memory 124 in the finite field calculation part 120 (FIGS. 5 and 6). In the following, the affine coordinate points $X_1[i], Y_1[i], X_2[i]$ and $Y_2[i] \in GF(3^m)$ stored in the memory 124 are denoted as $x_1[i], y_1[i], x_2[i]$ and $y_2[i] \in GF(3^m)$, respectively (step S101).

[Processing Stages in Case where b=1 (S102 to S105)]

In the case where the supersingular elliptic curve $E^b$ for b=1 is used, the processing stages in steps S102 to S105 are performed. In the case where the supersingular elliptic curve $E^b$ for b=−1 is used, the processing stages in steps S102 to S105 are not performed.

First, the control part 123 sets i=0 and stores the setting in the memory 124 (step S102). Then, the $GF(3^m)$ calculation part 121-1 reads $y_1[i]$ from the memory 124, performs the following calculation over the finite field $GF(3^m)$ $$y_1[i] = \{-y_1[i]\} \in GF(3^m) \quad (30)$$

and stores the calculation result in the memory 124 as a new $y_1[i]$ (step S103).

Then, the control part 123 determines whether or not i=N−1 (step S104). If it is not determined that i=N−1, the control part 123 sets i+1 as a new i and stores the setting in the memory 124, and the process returns to step S103 (step S105). If it is determined that i=N−1, the processing stages in the case where b=1 (steps S102 to S105) are completed (this is the end of the description of [Processing stages in Case Where b=1 (S102 to S105)]).

Then, the $GF(3^{6m})$ calculation part 122-7 (which forms a fifth calculation part) reads $x_1[0], y_1[0], x_2[0]$ and $y_2[0] \in GF(3^m)$ from the memory 124, performs the following calculation over the sixth-order extension field $GF(3^{6m})$ $$f = -y_1[0] \cdot (x_1[0] + x_2[0] + b) + y_2[0] \cdot \sigma + y_1[0] \cdot \rho \in GF(3^{6m}) \quad (31)$$

and stores the calculation result $f \in GF(3^{6m})$ in the memory 124 (step S106).

Then, the $GF(3^{6m})$ calculation part 122-7 reads $x_1[1], y_1[1], x_2[1]$ and $y_2[1] \in GF(3^m)$ from the memory 124, performs the following calculation over the sixth-order extension field $GF(3^{6m})$ $$f' = -y_1[1] \cdot (x_1[1] + x_2[1] + b) + y_2[1] \cdot \sigma + y_1[1] \cdot \rho \in GF(3^{6m}) \quad (32)$$

and stores the calculation result $f' \in GF(3^{6m})$ in the memory 124. Furthermore, the $GF(3^{6m})$ calculation part 122-8 reads the calculation results f and f' from the memory 124, performs the following calculation over the sixth-order extension field $GF(3^{6m})$ $$f = f \cdot f' \in GF(3^{6m}) \quad (33)$$

and stores the calculation result in the memory 124 as a new $f \in GF(3^{6m})$ (step S107).

Then, the control part 123 sets i=2 and stores the setting in the memory 124 (step S108).

Then, the $GF(3^{6m})$ calculation part 122-7 reads $x_1[1], y_1[1], x_2[1]$ and $y_2[1] \in GF(3^m)$ from the memory 124, performs the following calculation over the sixth-order extension field $GF(3^{6m})$ $$f' = -y_1[i] \cdot (x_1[i] + x_2[i] + b) + y_2[i] \cdot \sigma + y_1[i] \cdot \rho \in GF(3^{6m}) \quad (34)$$

and stores the calculation result in the memory 124 as a new $f' \in GF(3^{6m})$ (step S109).

Then, the $GF(3^{6m})$ calculation part 122-8 (which forms the fifth calculation part) reads the calculations results f and f' from the memory 124, performs the following calculation over the sixth-order extension field $GF(3^{6m})$ $$f = f \cdot f' \in GF(3^{6m}) \quad (35)$$

and stores the calculation result in the memory 124 as a new $f \in GF(3^{6m})$ (step S110).

Then, the control part 123 determines whether or not i=N−1 (step S111). If it is not determined that i=N−1, the control part 123 sets i+1 as a new i and stores the setting in the memory 124, and the process returns to step S109 (step S113). If it is determined that i=N−1, the control part 123 sets b as an initial value of c(c=b) and stored the setting in the memory 124 (step S112).

The processing stages in steps S106 to S110 performed before it is determined that i=N−1 in step S111 correspond to a process of performing a calculation $f = \Pi_{i=0}^{N-1}(-y_1[i] \cdot (x_1[i] + x_2[i] + b) + y_2[i] \cdot \sigma + y_1[i] \cdot \rho) \in GF(3^{6m})$ where $x_1[i] = X_1[i], y_1[i] = Y_1[i], x_2[i] = X_2[i]$ and $y_2[i] = Y_2[i]$ and outputting the calculated f in the case where b=−1, and a process of performing the calculation $f = \Pi_{i=0}^{N-1}(-y_1[i] \cdot (x_1[i] + x_2[i] + b) + y_2[i] \cdot \sigma + y_1[i] \cdot \rho) \in GF(3^{6m})$ where $x_1[i] = X_1[i], y_1[i] = -Y_1[i], x_2[i] = X_2[i]$ and $y_2[i] = Y_2[i]$ and outputting the calculated f in the case where b=1.

Then, the control part 123 sets j=0 and stores the setting in the memory 124 (step S114). Furthermore, the control part 123 sets i=0 and stores the setting in the memory 124 (step S115).

Then, the $GF(3^m)$ calculation part 121-2 reads $x_1[i], x_2[i]$ and c from the memory 124, perform the following calculation over the finite field $GF(3^m)$ $$u[i] = x_1[i] + x_2[i] + c \in GF(3^m) \quad (36)$$

and stores the calculation result u[i] in the memory 124 (step S116).

Then, the control part 123 determines whether or not i=N−1 (step S117). If it is not determined that i=N−1, the control part 123 sets i+1 as a new i and stores the setting in the memory 124, and the process returns to step S116 (step S118).

If it is determined that i=N−1, the $GF(3^{6m})$ calculation part 122-1 (first calculation part) reads $y_1[0], y_2[0]$ and $u[0] \in GF(3^m)$ ($i_1=0$) from the memory 124, performs the following calculation $$g[0] = -\{u[0]\}^2 + y_1[0] \cdot y_2[0] \cdot \sigma - u[0] \cdot \rho - \rho^2 \in GF(3^{6m}) \quad (37)$$

and stores the calculation result $g[0] \in GF(3^{6m})$ in the memory 124 (step S119).

Furthermore, the $GF(3^{6m})$ calculation part 122-2 (second calculation part) reads $y_1[1], y_2[1]$ and $u[1] \in GF(3^m)$ ($i_2=1$) from the memory 124, performs the following calculation $$g[1] = -\{u[1]\}^2 + y_1[1] \cdot y_2[1] \cdot \sigma - u[1] \cdot \rho - \rho^2 \in GF(3^{6m}) \quad (38)$$

and stores the calculation result $g[1] \in GF(3^{6m})$ in the memory 124 (step S120).

Then, the $GF(3^{6m})$ calculation part 122-3 (third calculation part) reads the calculation results $g[0] \in GF(3^{6m})$ and $g[1] \in GF(3^{6m})$ from the memory 124, performs the following calculation $$g = g[0] \cdot g[1] \in GF(3^{6m}) \quad (39)$$

and stores the calculation result $g \in GF(3^{6m})$ in the memory 124 (step S121). Note that the $GF(3^{6m})$ calculation part 122-3 determines the product $g[0] \cdot g[1] \in GF(3^{6m})$ without performing any calculation that involves as operands the terms, being previously determined to be $0 \in GF(p^m)$, of the calculation result $g[0]$ and/or the calculation result $g[1]$.

Then, the $GF(3^m)$ calculation part 121-1 reads $y_1[0]$ from the memory 124, performs the following calculation over the finite field $GF(3^m)$ $$y_1[0] = \{-y_1[0]\} \in GF(3^m) \quad (40)$$

and stores the calculation result in the memory 124 as a new $y_1[0]$ (step S122).

Then, the GF($3^m$) calculation part 121-3 reads $x_2[0]$ from the memory 124, performs the following calculation over the finite field GF($3^m$)

$$x_2[0] = \{x_2[0]\}^9 \in GF(3^m) \tag{41}$$

and stores the calculation result in the memory 123 as a new $x_2[0]$ (step S123). Note that this calculation is performed using a Frobenius map, for example (the same holds true for the $3^\chi$ multiplication ($\chi$ represents an integer equal to or greater than 1) described later).

Then, the GF($3^m$) calculation part 121-3 reads $y_2[0]$ from the memory 124, performs the following calculation over the finite field GF($3^m$)

$$y_2[0] = \{y_2[0]\}^9 \in GF(3^m) \tag{42}$$

and stores the calculation result in the memory 123 as a new $y_2[0]$ (step S124).

Then, the GF($3^m$) calculation part 121-1 reads $y_1[1]$ from the memory 124, performs the following calculation over the finite field GF($3^m$)

$$y_1[1] = \{-y_1[1]\} \in GF(3^m) \tag{43}$$

and stores the calculation result in the memory 124 as a new $y_1[1]$ (step S125).

Then, the GF($3^m$) calculation part 121-3 reads $x_2[1]$ from the memory 124, performs the following calculation over the finite field GF($3^m$)

$$x_2[1] = \{x_2[1]\}^9 \in GF(3^m) \tag{44}$$

and stores the calculation result in the memory 123 as a new $x_2[1]$ (step S126).

Then, the GF($3^m$) calculation part 121-3 reads $y_2[1]$ from the memory 124, performs the following calculation over the finite field GF($3^m$)

$$y_2[1] = \{y_2[1]\}^9 \in GF(3^m) \tag{45}$$

and stores the calculation result in the memory 123 as a new $y_2[1]$ (step S127).

Then, the control part 123 sets i=2 and stores the setting in the memory 124 (step S128).

Then, the GF($3^{6m}$) calculation part 122-1 (first calculation part) reads $y_1[i]$, $y_2[i]$ and $u[i] \in GF(3^m)$ ($i_1 = i$) from the memory 124, performs the following calculation $$g[i] = -\{u[i]\}^2 + y_1[i] \cdot y_2[i] \cdot \sigma - u[i] \cdot \rho - \rho^2 \in GF(3^{6m}) \tag{46}$$

and stores the calculation result $g[i] \in GF(3^{6m})$ in the memory 124 (step S129).

In addition, the GF($3^{6m}$) calculation part 122-2 (second calculation part) reads $y_1[i+1]$, $y_2[i+1]$ and $u[i+1] \in GF(3^m)$ ($i_2 = i+1$) from the memory 124, performs the following calculation $$g[i+1] = -\{u[i+1]\}^2 + y_1[i+1] \cdot y_2[i+1] \cdot \sigma - u[i+1] \cdot \rho - \rho^2 \in GF(3^{6m}) \tag{47}$$

and stores the calculation result $g[i+1] \in GF(3^{6m})$ in the memory 124 (step S130).

Then, the GF($3^{6m}$) calculation part 122-3 (third calculation part) reads the calculation results $g[i] \in GF(3^{6m})$ and $g[i+1] \in GF(3^{6m})$ from the memory 124, performs the following calculation $$g[i] \cdot g[i+1] \in GF(3^{6m}) \tag{48}$$

and stores the calculation result $g[i] \cdot g[i+1] \in GF(3^{6m})$ in the memory 124 (step S131). Note that the GF($3^{6m}$) calculation part 122-3 determines the product $g[i] \cdot g[i+1] \in GF(3^{6m})$ without performing any calculation that involves as operands the terms, being previously determined to be $0 \in GF(p^m)$, of the calculation result $g[i]$ and/or the calculation result $g[i+1]$.

Then, the GF($3^{6m}$) calculation part 122-3 (fourth calculation part) reads $g$ and $g[i] \cdot g[i+1] \in GF(3^{6m})$ from the memory 124, performs the following calculation $$g = g \cdot g[i] \cdot g[i+1] \in GF(3^{6m}) \tag{49}$$

and stores the calculation result in the memory 124 as a new $g \in GF(3^{6m})$ (step S132).

As described above, each time the GF($3^{6m}$) calculation part 122-1 (first calculation part), the GF($3^{6m}$) calculation part 122-2 (second calculation part) and the GF($3^{6m}$) calculation part 122-3 (third calculation part) perform the series of processing stages thereof, the GF($3^{6m}$) calculation part 122-3 (fourth calculation part) according to this embodiment determines the multiplication value of the products $g[i] \cdot g[i+1]$ output from the GF($3^{6m}$) calculation part 122-3 (third calculation part). As described above, this allows saving of the capacity of the memory 124.

Then, the GF($3^m$) calculation part 121-1 reads $y_1[i]$ from the memory 124, performs the following calculation over the finite field GF($3^m$)

$$y_1[i] = \{-y_1[i]\} \in GF(3^m) \tag{50}$$

and stores the calculation result in the memory 124 as a new $y_1[i]$ (step S133).

Then, the GF($3^m$) calculation part 121-3 reads $x_2[i]$ from the memory 124, performs the following calculation over the finite field GF($3^m$)

$$x_2[i] = \{x_2[i]\}^9 \in GF(3^m) \tag{51}$$

and stores the calculation result in the memory 123 as a new $x_2[i]$ (step S134).

Then, the GF($3^m$) calculation part 121-3 reads $y_2[i]$ from the memory 124, performs the following calculation over the finite field GF($3^m$)

$$y_2[i] = \{y_2[i]\}^9 \in GF(3^m) \tag{52}$$

and stores the calculation result in the memory 123 as a new $y_2[i]$ (step S135).

Then, the GF($3^m$) calculation part 121-1 reads $y_1[i+1]$ from the memory 124, performs the following calculation over the finite field GF($3^m$)

$$y_1[i+1] = \{-y_1[i+1]\} \in GF(3^m) \tag{53}$$

and stores the calculation result in the memory 124 as a new $y_1[i+1]$ (step S136).

Then, the GF($3^m$) calculation part 121-3 reads $x_2[i+1]$ from the memory 124, performs the following calculation over the finite field GF($3^m$)

$$x_2[i+1] = \{x_2[i+1]\}^9 \in GF(3^m) \tag{54}$$

and stores the calculation result in the memory 123 as a new $x_2[i+1]$ (step S137).

Then, the GF($3^m$) calculation part 121-3 reads $y_2[i+1]$ from the memory 124, performs the following calculation over the finite field GF($3^m$)

$$y_2[i+1] = \{y_2[i+1]\}^9 \in GF(3^m) \tag{55}$$

and stores the calculation result in the memory 123 as a new $y_2[i+1]$ (step S138).

Then, the control part 123 determined whether or not i=N−2 (step S139). If it is not determined that i=N−2, the control part 123 sets i+2 as a new i and stores the setting in the memory 124, and the process returns to step S129 (step S140).

If it is determined that i=N−2, the GF(3) calculation part 125 reads c from the memory 124, performs the following calculation $$c=(c-b) \bmod 3 \tag{56}$$

and stores the calculation result in the memory 124 as a new c (step S141).

Then, the GF($3^{6m}$) calculation part 122-5 (tenth calculation part) reads f and g from the memory 124, performs the following calculation $$f=f \cdot g \in GF(3^{6m}) \tag{57}$$

and stores the calculation result in the memory 124 as a new f (step S142).

Then, the GF($3^{6m}$) calculation part 122-5 (eleventh calculation part) reads f from the memory 124, performs the following calculation $$f=f^3 \in GF(3^{6m}) \tag{58}$$

and stores the calculation result in the memory 124 as a new f (step S143).

The processing stages in steps S141 to S143 are performed each time the "loop process (steps S115 to S140)", in which the "series of processing stages" performed by the GF($3^{6m}$) calculation part 122-1 (first calculation part), the GF($3^{6m}$) calculation part 122-2 (second calculation part) and the GF($3^{6m}$) calculation part 122-3 (third calculation part) is performed N/2 times, is performed.

Then, the control part 123 determined whether or not j=(m−1)/2 (step S144). If it is not determined that j=(m−1)/2, the control part 123 sets j+1 as a new j and stores the setting in the memory 124, and the process returns to step S115 (step S145). If it is determined that j=(m−1)/2, the "loop process (steps S115 to S140)" is completed. That is, if m=1, the "loop process (steps S115 to S140)", in which the "series of processing stages" is performed N/2 times, is performed only one time. If m≧3, the "loop process (steps S115 to S140)", in which the "series of processings" is performed N/2 times, is performed multiple times.

When the "loop process" is completed, the GF($3^{6m}$) calculation part 122-9 reads f from the memory 124, performs the following calculation (step S146)

$$\text{output}=f^{finalpow} \in GF(3^{6m}) \tag{59}$$

$$[finalpow=(3^{3m}-1)(3^m+1)(3^m-3^{(m+1)/2}+1)]$$

and outputs the calculation result output∈GF($3^{6m}$) (steps S147). The calculation result output∈GF($3^{6m}$) is the calculation result of the multi-pairing calculation $\Pi_{i=0}^{N-1} e(P(X_1[i], Y_1[i]), Q(X_2[i], Y_2[i]))$. The calculation result output∈GF ($3^{6m}$) is output from the output part 30 (FIG. 2A).

<Characteristics of First Embodiment>

As described above, according to this embodiment, the following polynomials for calculating each pairing calculation $e(P(X_1[i], Y_1[i]), Q(X_2[i], Y_2[i]))$ forming the multi-pairing calculation $\Pi_{i=0}^{N-1} e(P(X_1[i], Y_1[i]), Q(X_2[i], Y_2[i]))$ are determined.

$$g[i]=-\{u[i]\}^2+y_1[i] \cdot y_2[i] \cdot \sigma - u[i] \cdot \rho - \rho^2 \in GF(3^{6m}) \tag{60}$$

$$g[i+1]=-\{u[i+1]\}^2+y_1[i+1] \cdot y_2[i+1] \cdot \sigma - u[i+1] \cdot \rho - \rho^2 \in GF(3^{6m}) \tag{61}$$

Then, the product thereof is determined as follows.

$$g[i] \cdot g[i+1] \in GF(3^{6m}) \tag{62}$$

Then, the following calculation is performed using the products (steps S119 to S121, steps S129 to S132).

$$g=\Pi_{i=0}^{N-1} g[i] \in GF(3^{6m}) \tag{63}$$

Note that the coefficients of the terms of the indeterminate elements $\rho \cdot \sigma \in GF(p^{6m})$ and $\rho^2 \cdot \sigma \in GF(p^{6m})$ of the polynomials (60) and (61) that express the sixth-order extension field GF($3^{6m}$) are previously determined to be 0. Since the product of such polynomials is calculated in advance, the terms whose coefficients are previously determined to be 0 do not have to be calculated, and therefore, the number of multiplications can be reduced.

[Number of Multiplications in Algorithm (b=1) According to First Embodiment]

In the following, an algorithm according to this embodiment and the number of multiplications involved with the algorithm will be provided. Note that «θM» represents θ multiplications, and «θC» represents θ cubic calculations.

```
INPUT: x₁[i], y₁[i], x₂[i], y₂[i] ∈ GF(3^m)
for i = 0 to N−1
    y₁[i] = {−y₁[i]}
end for
f = −y₁[0]·(x₁[0]+x₂[0]+b)+y₂[0]·σ+y₁[0]·ρ «1M»
f' = −y₁[1]·(x₁[1]+x₂[1]+b)+y₂[1]·σ+y₁[1]·ρ «1M»
f = f·f' «6M»
for i = 2 to N−1
    f' = −y₁[i]·(x₁[i]+x₂[i]+b)+y₂[i]·σ+y₁[i]·ρ «1M»
    f = f·f' «15M»
end for
c = b
for j = 0 to (m−1)/2
    for i = 0 to N−1
        u[i] = x₁[i]+x₂[i]+c
    end for
    g[0] = −{u[0]}²+y₁[0]·y₂[0]·σ−u[0]·ρ−ρ² «2M»              (64)
    g[1] = −{u[1]}²+y₁[1]·y₂[1]·σ−u[1]·ρ−ρ² «2M»              (65)
    g = g[0]·g[1]  «6M»                                         (66)
    y₁[0] = {−y₁[0]}
    x₂[0] = {x₂[0]}⁹ «2C»
    y₂[0] = {y₂[0]}⁹ «2C»
    y₁[1] = {−y₁[1]}
    x₂[1] = {x₂[1]}⁹ «2C»
    y₂[1] = {y₂[1]}⁹ «2C»
    for i = 2 to N−2 step 2
        g[i] = −{u[i]}²+y₁[i]·y₂[i]·σ−u[i]·ρ−ρ² «2M»          (67)
        g[i+1] = −{u[i+1]}²+y₁[i+1]·y₂[i+1]·σ−u[i+1]·ρ−ρ² «2M»
                                                                (68)
        g[i]·g[i+1] «6M»                                        (69)
        g = g·g[i]·g[i+1] «15M»                                 (70)
        y₁[i] = {−y₁[i]}
        x₂[i] = {x₂[i]}⁹ «2C»
        y₂[i] = {y₂[i]}⁹ «2C»
        y₁[i+1] = {−y₁[i+1]}
        x₂[i+1] = {x₂[i+1]}⁹ «2C»
        y₂[i+1] = {y₂[i+1]}⁹ «2C»
    end for
    c = (c−b) mod 3
    f = f·g «15M»
    f = f³ «6C»
end for
Return output = f^finalpow
```

As described above, according to this embodiment, g[0] and g[1] are determined according to the formulas (64) and (65), and then the product thereof is determined according to the formula (66). And g[i] and g[i+1] are determined according to the formulas (67) and (68), and then the product thereof is determined according to the formula (70). As a result, the calculation amount can be substantially reduced compared with the case where cumulative multiplication of g and g[i] according to the formula g=g·g[i] is performed each time g[i] is calculated. Since g[0], g[1], g[i] and g[i+1] are polynomials the coefficients of some of the terms of which are 0, the number of multiplications thereof is 6M. However, in the case where cumulative multiplication of g and g[i] according to the formula g=g·g[i] is performed each time g[i] is calculated, the cumulative multiplications involve 15M multiplications because the coefficient of every term of g can assume a value other than 0 except for those involved with the first multiplication. For example, as for the number of multiplications involved with the formulas (67) to (70), the number of calculations required in the method according to the present application is 25M (2M+2M+6M+15M), whereas the method of performing cumulative multiplication according to the formula requires 34M ((2M+15M)×2) calculations in the case where cumulative multiplication of g and g[i] according to the formula g=g·g[i] is performed each time g[i] is calculated. In this way, the number of multiplications can be substantially reduced by performing the calculations in the order according to this embodiment.

[Number of Multiplications in Algorithm (b=1) According to Extension of Prior Art]

As described above, the prior-art literatures 1 and 2 disclose no methods for efficient calculation of the product of a plurality of pairings. In the following, it will be shown that the calculation amount cannot be reduced more substantially than this embodiment even if the improved $\eta_T$ pairing calculation algorithm disclosed in the prior-art literature 1 is simply extend to the multi-pairing calculation.

The following is the improved $\eta_T$ pairing calculation algorithm disclosed in the prior-art literature 1 simply extended to the multi-pairing calculation. Note that the following description is intended to explain the characteristics of this embodiment but not to show that the algorithm described below for comparison was able to be easily invented at the time of application of the present invention.

```
INPUT: x₁[i], y₁[i], x₂[i], y₂[i] ∈ GF(3ᵐ)
for i = 0 to N−1
   y₁[i] = {−y₁[i]}
end for
f = −y₁[0]·(x₁[0]+x₂[0]+b)+y₂[0]·σ+y₁[0]·ρ «1M»
f' = −y₁[1]·(x₁[1]+x₂[1]+b)+y₂[1]·σ+y₁[1]·ρ «1M»
f = f·f' «6M»
for i = 2 to N−1
   f' = −y₁[i]·(x₁[i]+x₂[i]+b)+y₂[i]·σ+y₁[i]·ρ «1M»
   f = f·f' «15M»
end for
c = b
for j = 0 to (m−1)/2
   for i = 0 to N−1
      u[i] = x₁[i]+x₂[i]+c
   end for
   g[0] = −{u[0]}²+y₁[0]·y₂[0]·σ−u[0]·ρ−ρ² «2M»       (71)
   y₁[0] = {−y₁[0]}
   x₂[0] = {x₂[0]}⁹ «2C»
   y₂[0] = {y₂[0]}⁹ «2C»
   g[1] = −{u[1]}²+y₁[1]·y₂[1]·σ−u[1]·ρ−ρ² «2M»       (72)
   g = g[0]·g[1] «6M»                                   (73)
   y₁[1] = {−y₁[1]}
   x₂[1] = {x₂[1]}⁹ «2C»
   y₂[1] = {y₂[1]}⁹ «2C»
   for i = 2 to N−1
      g = g·(−{u[i]}²+y₁[i]·y₂[i]·σ−u[i]·ρ−ρ²) «14M»   (74)
      y₁[i] = {−y₁[i]}
      x₂[i] = {x₂[i]}⁹ «2C»
      y₂[i] = {y₂[i]}⁹ «2C»
   end for
   c = (c−b) mod 3
   f = f·g «15M»
   f = f³ «6C»
end for
Return output = f^finalpow
```

As described above, if the improved $\eta_T$ pairing calculation algorithm disclosed in the prior-art literature 1 is simply extended to the multi-pairing calculation, 14M calculations are required for each value of i according to the formula (74), and 28M calculations are required for two values of i.

[Number of Multiplications in Algorithm (b=1) Based on Loop Unrolling]

As described above, the prior-art literature 2 discloses no method for efficient calculation of the product of a plurality of pairings. However, the prior-art literature 2 discloses an algorithm based on the loop unrolling. In the following, it will be shown that the calculation amount cannot be reduced more substantially than this embodiment even if the concept of the algorithm based on the loop unrolling disclosed in the prior-art literature 2 is extend to the multi-pairing calculation.

The above polynomial $-\{u[i]\}^2+y_1[i]\cdot y_2[i]\cdot\sigma-u[i]\cdot\rho-\rho^2$ has to be calculated for each of different pairings for different values of i and has to be calculated $\{(m-1)/2\}+1$ times in the loops for j=0 to (m−1)/2 for each of the pairings. According to the method according to this embodiment, the polynomials $-\{u[i]\}^2+y_1[i]\cdot y_2[i]\cdot\sigma-u[i]\cdot\rho-\rho^2$ are separately determined for different pairings for different values of i, respectively, and the product thereof is determined. To the contrary, according to the concept based on the loop unrolling disclosed in the prior-art literature 2, the product of a plurality of polynomials $-\{u[i]\}^2+y_1[i]\cdot y_2[i]\cdot\sigma-u[i]\cdot\rho-\rho^2$ calculated in the loops for j=0 to (m−1)/2 for the one of the pairings is determined.

The following is the algorithm based on the loop unrolling disclosed in the prior-art literature 2 extended to the multi-pairing calculation (unpublished). Note that the following description is intended to explain the characteristics of this embodiment but not to show that the algorithm described below for comparison was able to be easily invented at the priority data of this application or at the time of application of the present invention.

```
INPUT: x₁[i], y₁[i], x₂[i], y₂[i] ∈ GF(3ᵐ)
for i = 0 to N−1
   y₁[i] = {−y₁[i]}
end for
f = −y₁[0]·(x₁[0]+x₂[0]+b)+y₂[0]·σ+y₁[0]·ρ «1M»
f' = −y₁[1]·(x₁[1]+x₂[1]+b)+y₂[1]·σ+y₁[1]·ρ «1M»
f = f·f' «6M»
for i = 2 to N−1
   f' = −y₁[i]·(x₁[i]+x₂[i]+b)+y₂[i]·σ+y₁[i]·ρ «1M»
   f = f·f' «15M»
end for
c = b
for j = 0 to (m−1)/4
   for i = 0 to N−1
      u[i] = x₁[i]+x₂[i]+c
   end for
   g1[0] = −{u[0]}²+y₁[0]·y₂[0]·σ−u[0]·ρ−ρ² «2M»      (75)
   g1[0] = −{g1[0]}³                                   (76)
   y₁[0] = {−y₁[0]}
   x₂[0] = {x₂[0]}⁹ «2C»
   y₂[0] = {y₂[0]}⁹ «2C»
   g2[0] = −{u[0]}²+y₁[0]·y₂[0]·σ−u[0]·ρ−ρ² «2M»      (77)
   g = g1[0]·g2[0]  «6M»                               (78)
   y₁[0] = {−y₁[0]}
   x₂[0] = {x₂[0]}⁹ «2C»
   y₂[0] = {y₂[0]}⁹ «2C»
   for i = 1 to N−1
      g1[i] = −{u[i]}²+y₁[i]·y₂[i]·σ−u[i]·ρ−ρ² «2M»   (79)
      g1[i] = {g1[i]}³                                 (80)
      y₁[i] = {−y₁[i]}
      x₂[i] = {x₂[i]}⁹ «2C»
      y₂[i] = {y₂[i]}⁹ «2C»
      g2[i] = −{u[i]}²+y₁[i]·y₂[i]·σ−u[i]·ρ−ρ² «2M»   (81)
      g2[i]·g2[i]  «6M»                                (82)
      g = g·g2[i]·g2[i]  «15M»                         (83)
      y₁[i+1] = {−y₁[i+1]}
      x₂[i+1] = {x₂[i+1]}⁹ «2C»
```

-continued

```
    y₂[i+1] ={y₂[i+1]}⁹«2C»
    end for
    c = (c−b)mod 3
    f = f·g«15M»
    f = f³«6C»
    end for
    Return output = f^finalpow
```

As described above, according to this algorithm, g1[0] and g2[0] for the same value i=0 are determined according to the formulas (75) and (77), and then, the product thereof is determined according to the formula (74). And g1[i] and g2[i] for the same values i=1, . . . , N−1 are determined according to the formulas (75) and (77), and then, the product thereof is determined according to the formula (82). According to this algorithm, however, cubic calculations in the formulas (76) and (80) are needed. This is because, although one calculation of f=f³ would otherwise be performed for each of the loops for j=0 to (m−1)/2, the algorithm based on the loop unrolling requires the cubic calculations of the formulas (76) and (80), which correspond to the one calculation of f=f³, to be performed for each value of i=0, . . . , N−1 in the loops, because each pair of loops for j is combined into one loop in the algorithm.

According to the algorithm according to this embodiment, the cubic calculations are performed as f=f³ outside the loops for j=0 to (m−1)/2, and therefore, the calculation amount can be reduced compared with the algorithm that extends the concept of the loop unrolling to the multi-pairing calculation.

[Modification of First Embodiment]

The first embodiment concerns a case where N is an even number equal to or greater than 4. A modification of the first embodiment described below concerns a case where N is an odd number equal to or greater than 5.

Figure 11:
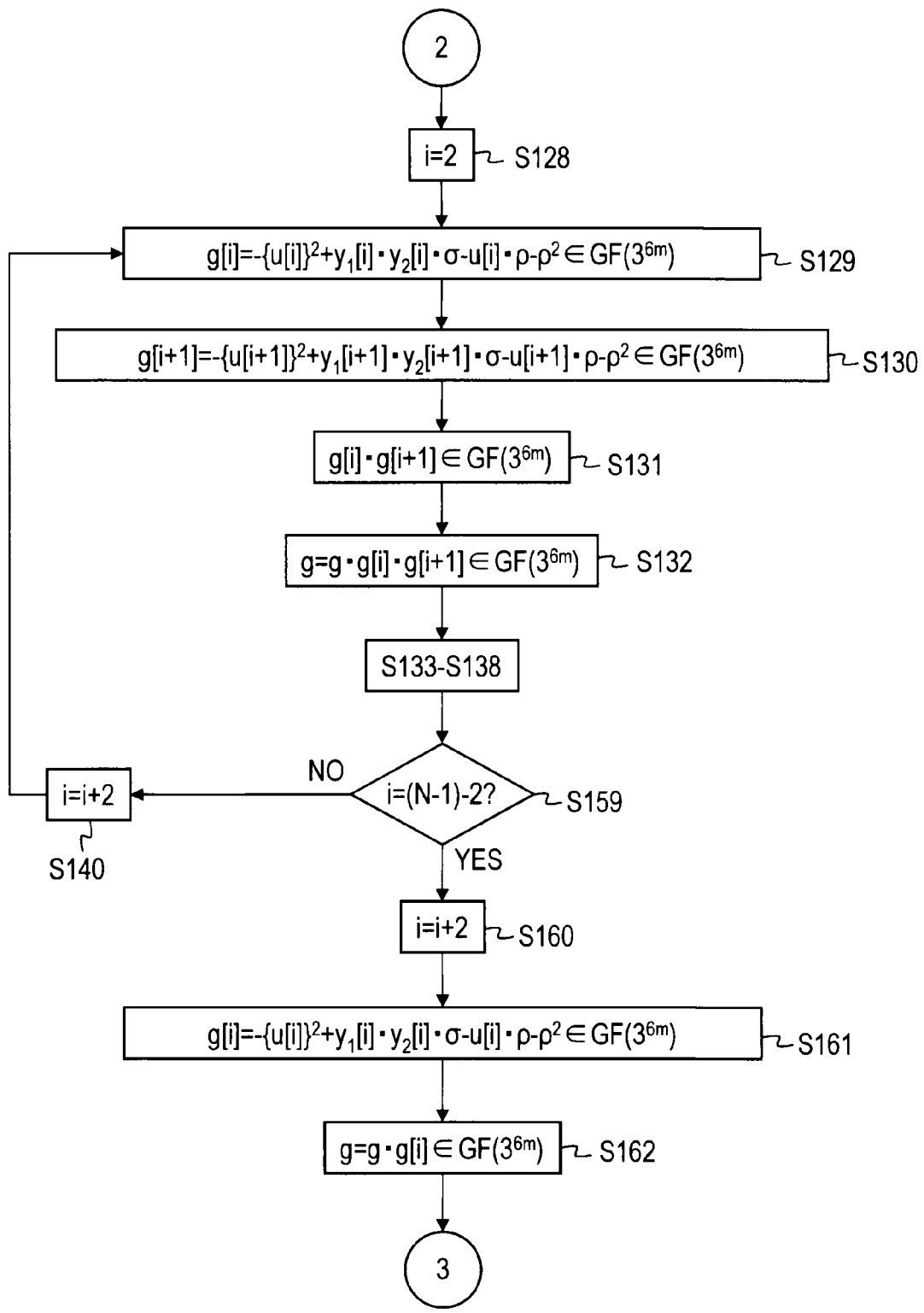
FIG. 11 is a diagram for illustrating a process in a case where N is an odd number equal to or greater than 5.

FIG. 11 is a diagram for illustrating a process in the case where N is an odd number equal to or greater than 5. In this modification, it is assumed that L=N−1. The following description will be focused only on differences from the first embodiment.

According to this modification of the first embodiment, after the processing in step S138 described in the first embodiment, the control part 123 determines whether or not i=(N−1)−2 (step S159). If it is not determined that i=(N−1)−2, the control part 123 sets i+2 as a new i and stores the setting in the memory 124, and the process returns to step S129 (step S140).

If it is determined that i=(N−1)−2, the control part 123 sets i+2 as a new i and stores the setting in the memory 124 (step S160).

Then, the $GF(3^{6m})$ calculation part 122-1 reads $y_1[i]$, $y_2[i]$ and $u[i] \in GF(3^m)$ from the memory 124, performs the following calculation $$g[i] = -\{u[i]\}^2 + y_1[i] \cdot y_2[i] \cdot \sigma - u[i] \cdot \rho - \rho^2 \in GF(3^{6m}) \quad (84)$$

and stores the calculation result $g[i] \in GF(3^{6m})$ in the memory 124 (step S161).

Then, the $GF(3^{6m})$ calculation part 122-3 reads $g \in GF(3^{6m})$ and $g[i] \in GF(3^{6m})$ from the memory 124, performs the following calculation $$g = g \cdot g[i] \in GF(3^{6m}) \quad (85)$$

and stores the calculation result in the memory 124 as a new $g \in GF(3^{6m})$ (step S162). Then, the processing stages in step S141 and the following steps described in the first embodiment are performed.

Second Embodiment

Next, a second embodiment of the present invention will be described.

The first embodiment is an example in which the present invention is applied to the part of calculation of g of the improved $\eta_T$ pairing calculation algorithm. According to the second embodiment, the present invention is applied to the parts of calculation of both f and g of the improved $\eta_T$ pairing calculation algorithm. This allows further reduction of the calculation amount.

According to this embodiment, K=4, p=3, d=6, m is an odd number equal to or greater than 1, N is an even number equal to or greater than 4, W=N, elements R(i, 0), R(i, 1), R(i, 2) and R(i, 3) of the finite field $GF(p^m)$ are affine coordinate points $X_1[i]$, $Y_1[i]$, $X_2[i]$ and $Y_2[i] \in GF(p^m)$, respectively, of two points $P(X_1[i], Y_1[i])$ and $Q(X_2[i], Y_2[i])$ on the elliptic curve E defined on the finite field $GF(p^m)$, the calculation $e(R(i, 0), \ldots, R(i, K-1))$ is a pairing calculation $e(P(X_1[i], Y_1[i]), Q(X_2[i], Y_2[i]))$, and the calculation $\Pi_{i=0}^{N-1} e(R(i, 0), \ldots, R(i, K-1))$ is a multi-pairing calculation $\Pi_{i=0}^{N-1} e(P(X_1[i], Y_1[i]), Q(X_2[i], Y_2[i]))$. Furthermore, according to this embodiment, the elliptic curve is the supersingular elliptic curve $E^b$ expressed by the formula (10) (b=−1 or 1). Furthermore, the extension field calculation according to this embodiment is a calculation that determines polynomials that express elements of the sixth-order extension field $GF(3^{6m})$ of the finite field $GF(3^m)$ $$f[i] = -y_1[i] \cdot (x_1[i] + x_2[i] + b) + y_2[i] \cdot \sigma + y_1[i] \cdot \rho \in GF(3^{6m}) \quad (86)$$

$$g[i] = -\{u[i]\}^2 + y_1[i] \cdot y_2[i] \cdot \sigma - u[i] \cdot \rho - \rho^2 \in GF(3^{6m}) \quad (87)$$

where the affine coordinate points $X_1[i]$, $Y_1[i]$, $X_2[i]$ and $Y_2[i]$ input to the input part or the images thereof are represented by $x_1[i]$, $y_1[i]$, $x_2[i]$ and $y_2[i]$, respectively, $u[i] = x_1[i] + x_2[i] + c \in GF(3^m)$, the indeterminate element σ is a root of the irreducible polynomial $\sigma^2 + 1 = 0$ whose coefficients are elements of the finite field $GF(3^m)$, and the indeterminate element ρ is a root of the irreducible polynomial $\rho^3 - \rho - b = 0$. The following description will be focused mainly on differences from the first embodiment, and descriptions of things common to those in the first embodiment will be omitted.

<Configuration>

Figure 12:
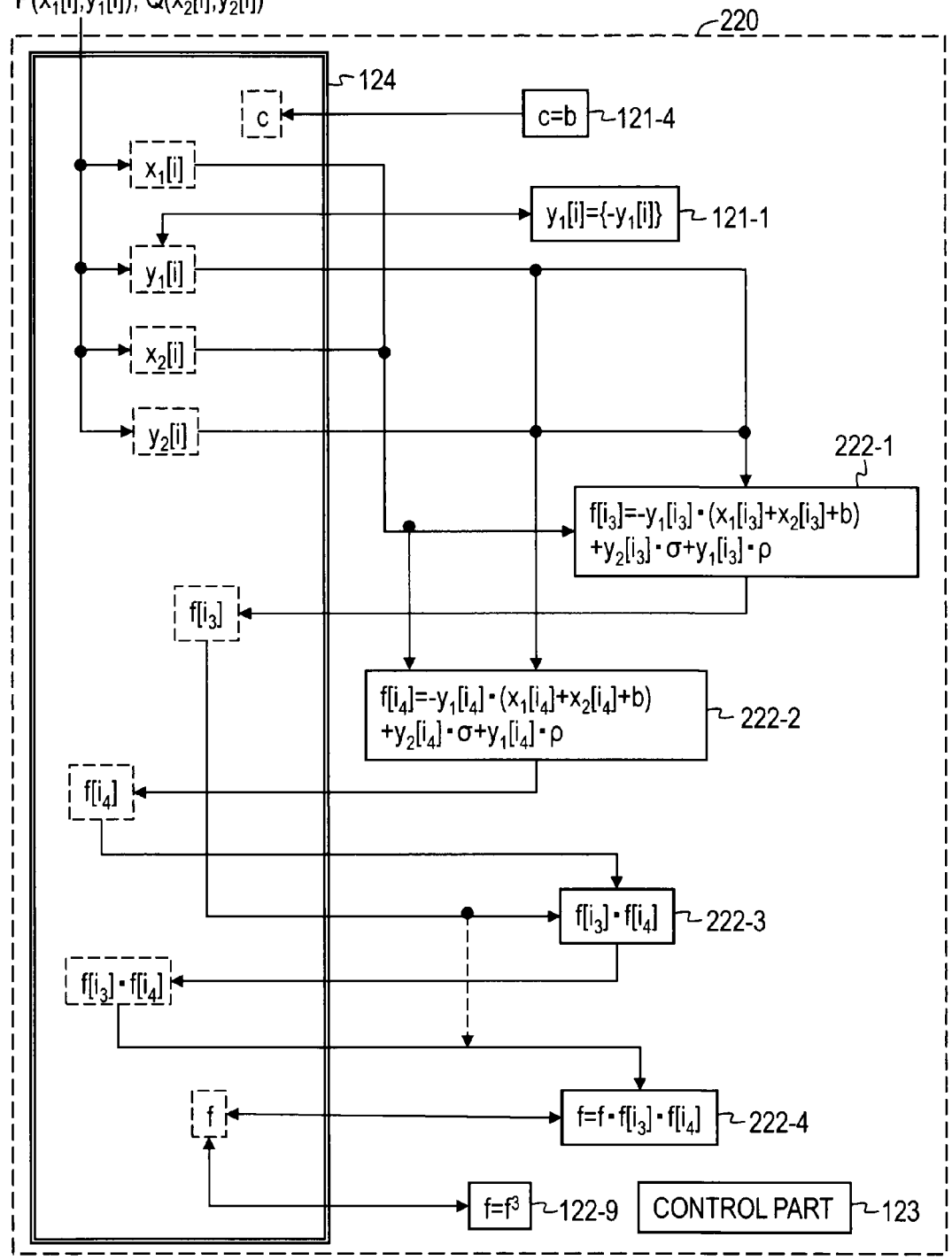
FIG. 12 is a block diagram for illustrating a basic configuration of a finite field calculation part according to a second embodiment.
Figure 13:
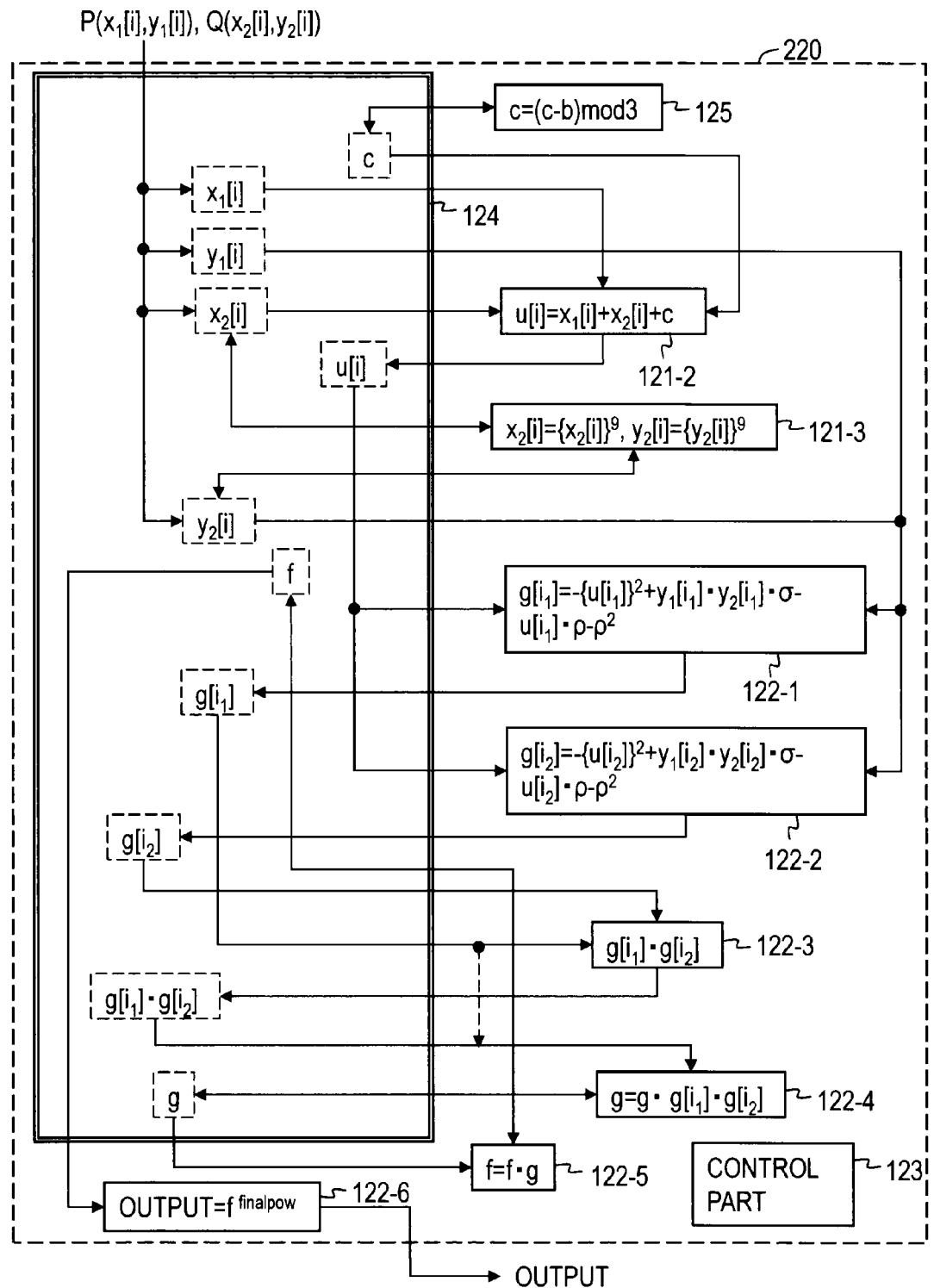
FIG. 13 is a block diagram for illustrating a basic configuration of the finite field calculation part according to the second embodiment.

FIGS. 12 and 13 are block diagrams for illustrating a basic configuration of a finite field calculation part 220 according to the second embodiment.

A finite field calculation apparatus according to the second embodiment is the finite field calculation apparatus shown in FIG. 2A with the finite field calculation part 20 replaced with the finite field calculation part 220 shown in FIGS. 12 and 13. The following description will be focused only on the configuration of the finite field calculation part 220.

As shown in FIGS. 12 and 13, the finite field calculation part 220 according to this embodiment has $GF(3^m)$ calculation parts 121-1 to 121-4 that perform a calculation over the finite field $GF(3^m)$, $GF(3^{6m})$ calculation parts 122-1 to 122-5 and 122-9 that perform a calculation over the sixth-order extension field $GF(3^{6m})$ of the finite field $GF(3^m)$, $GF(3^{6m})$ calculation parts 222-1 to 222-5, a control part 123, a memory 124 and a GF(3) calculation part 125 that performs a calculation over the finite field GF(3).

The finite field calculation part 220 is a special device that comprises a well-known or dedicated computer having a CPU, a RAM and a ROM, for example, and a special program. For example, the $GF(3^{6m})$ calculation parts 222-1 to 222-5 are functional parts that are implemented by a predetermined program read in by the CPU. At least a part of the finite field calculation part 220 may be formed by an integrated circuit.

<Process>

Figure 14:
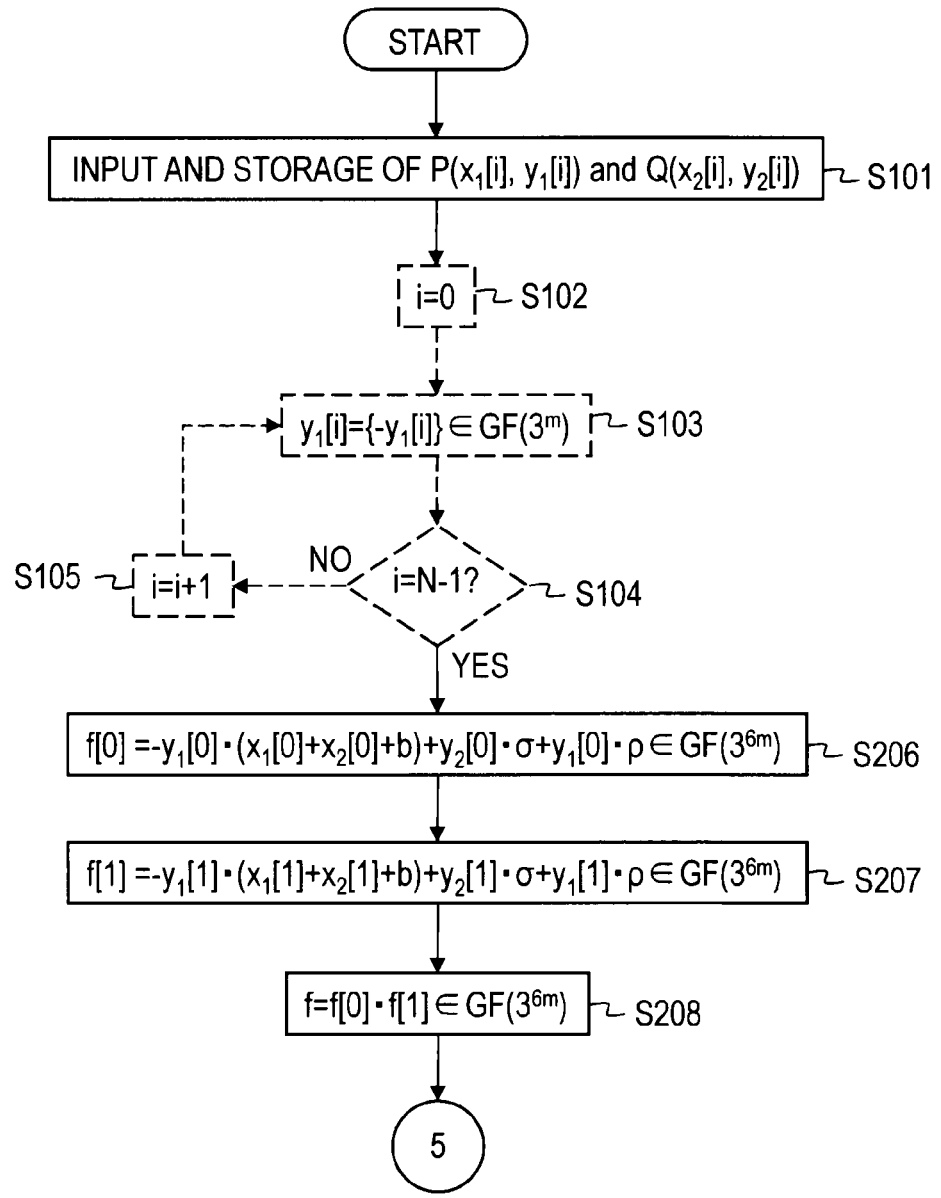
FIG. 14 is a diagram for illustrating a process according to the second embodiment.
Figure 15:
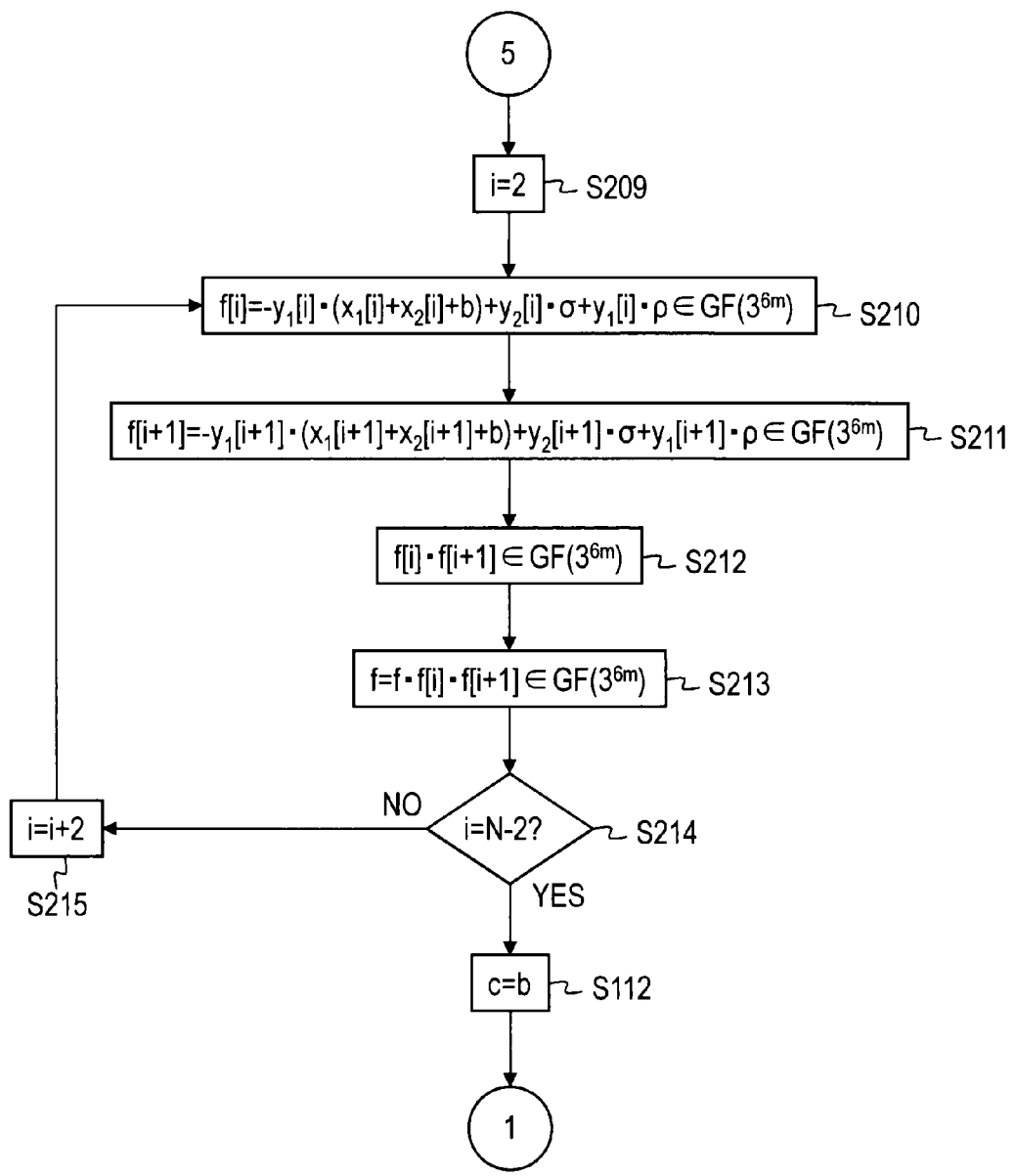
FIG. 15 is a diagram for illustrating the process according to the second embodiment.

FIGS. 14 to 15 are diagrams for illustrating a process according to the second embodiment. In the following, the process according to the second embodiment will be described with reference to these drawings.

First, the processing stages in steps S101 to S105 described in the first embodiment are performed. Note that, as in the first embodiment, the processing stages in steps S102 to S105 are unnecessary when b=−1.

Then, the $GF(3^{6m})$ calculation part 222-1 (first calculation part or sixth calculation part) reads $x_1[0]$, $y_1[0]$, $x_2[0]$ and $y_2[0] \in GF(3^m)$ ($i_3=0$) from the memory 124, performs the following calculation over the sixth-order extension field $GF(3^{6m})$ $$f[0]=-y_1[0]\cdot(x_1[0]+x_2[0]+b)+y_2[0]\cdot\sigma+y_1[0]\cdot\rho \in GF(3^{6m}) \quad (88)$$

and stores the calculation result $f[0] \in GF(3^{6m})$ in the memory 124 (step S206).

Then, the $GF(3^{6m})$ calculation part 222-1 (second calculation part or seventh calculation part) reads $x_1[1]$, $y_1[1]$, $x_2[1]$ and $y_2[1] \in GF(3^m)$ ($i_4=1$) from the memory 124, performs the following calculation over the sixth-order extension field $GF(3^{6m})$ $$f[1]=-y_1[1]\cdot(x_1[1]+x_2[1]+b)+y_2[1]\cdot\sigma+y_1[1]\cdot\rho \in GF(3^{6m}) \quad (89)$$

and stores the calculation result $f[1] \in GF(3^{6m})$ in the memory 124 (step S207).

Then, the $GF(3^{6m})$ calculation part 222-3 (third calculation part or eighth calculation part) reads the calculation results $f[0] \in GF(3^{6m})$ and $f[1] \in GF(3^{6m})$ from the memory 124, performs the following calculation $$f=f[0]\cdot f[1] \in GF(3^{6m}) \quad (90)$$

and stores the calculation result $f \in GF(3^{6m})$ in the memory 124 (step S208). Note that the $GF(3^{6m})$ calculation part 222-3 determines a product $f[0]\cdot f[1] \in GF(3^{6m})$ without performing any calculation that involves as operands the terms, being previously determined to be $0 \in GF(p^m)$, of the calculation result $f[0]$ and/or the calculation result $f[1]$.

Then, the control part 123 sets i=2 and stores the setting in the memory 124 (step S209).

Then, the $GF(3^{6m})$ calculation part 222-1 reads $y_1[i]$, $y_2[i]$, $x_2[i]$ and $y_2[i] \in GF(3^m)$ ($i_3=i$) from the memory 124, performs the following calculation $$f[i]=-y_1[i]\cdot(x_1[i]+x_2[i]+b)+y_2[i]\cdot\sigma+y_1[i]\cdot\rho \in GF(3^{6m}) \quad (91)$$

and stores the calculation result $g[i] \in GF(3^{6m})$ in the memory 124 (step S210).

In addition, the $GF(3^{6m})$ calculation part 222-2 reads $y_1[i+1]$, $y_2[i+1]$, $x_2[i+1]$ and $y_2[i+1] \in GF(3^m)$ ($i_4=i+1$) from the memory 124, performs the following calculation $$f[i+1]=-y_1[i+1]\cdot(x_1[i+1]+x_2[i+1]+b)+y_2[i+1]\cdot\sigma+y_1[i+1]\cdot\rho \in GF(3^{6m}) \quad (92)$$

and stores the calculation result $f[i+1] \in GF(3^{6m})$ in the memory 124 (step S211).

Then, the $GF(3^{6m})$ calculation part 222-3 reads the calculation results $f[i] \in GF(3^{6m})$ and $f[i+1] \in GF(3^{6m})$ from the memory 124, performs the following calculation $$f[i]\cdot f[i+1] \in GF(3^{6m}) \quad (93)$$

and stores the calculation result $f[i]\cdot f[i+1] \in GF(3^{6m})$ in the memory 124 (step S212). Note that the $GF(3^{6m})$ calculation part 222-3 determines a product $f[i]\cdot f[i+1] \in GF(3^{6m})$ without performing any calculation that involves as operands the terms, being previously determined to be $0 \in GF(p^m)$, of the calculation result $f[i]$ and/or the calculation result $f[i+1]$.

Then, the $GF(3^{6m})$ calculation part 222-4 (fourth calculation part or ninth calculation part) reads $f \in GF(3^{6m})$ and $f[i]\cdot f[i+1] \in GF(3^{6m})$ from the memory 124, performs the following calculation $$f=f\cdot f[i]\cdot f[i+1] \in GF(3^{6m}) \quad (94)$$

and stores the calculation result in the memory 124 as a new $f \in GF(3^{6m})$ (step S213).

Then, the control part 123 determines whether or not i=−2 (step S214). If it is not determined that i=N−2, the control part 214 sets i+2 as a new i and stores the setting in the memory 124, and the process returns to step S210 (step S215).

If it is determined that i=N−2, the processing stages in step S112 and the following steps in the first embodiment are performed.

<Characteristics of Second Embodiment>

As described above, according to this embodiment, in addition to the improved calculation of g[i] and g[i+1] described in the first embodiment, the following polynomials are determined.

$$f[i]=-y_1[i]\cdot(x_1[i]+x_2[i]+b)+y_2[i]\cdot\sigma+y_1[i]\cdot\rho \in GF(3^{6m}) \quad (95)$$

$$f[i+1]=-y_1[i+1]\cdot(x_1[i+1]+x_2[i+1]+b)+y_2[i+1]\cdot\sigma+y_1[i+1]\cdot\rho \in GF(3^{6m}) \quad (96)$$

Then, the product thereof is determined as follows.

$$f[i]\cdot f[i+1] \in GF(3^{6m}) \quad (97)$$

Then, the following calculation is performed using the product (steps S206 to S208, steps S210 to S213).

$$f=\Pi_{i=0}^{N-1} f[i] \in GF(3^{6m}) \quad (98)$$

Note that the coefficients of the terms of the indeterminate elements $\rho^2 \in GF(p^{6m})$, $\rho\cdot\sigma \in GF(p^{6m})$ and $\rho^2\cdot\sigma \in GF(p^{6m})$ of the polynomials (95) and (96) that express the sixth-order extension field $GF(3^{6m})$ are previously determined to be 0. Since the product of such polynomials is calculated in advance, the terms whose coefficients are previously determined to be 0 do not have to be calculated, and therefore, the number of multiplications can be reduced.

[Modification of Second Embodiment]

The second embodiment concerns a case where N is an even number equal to or greater than 4. A modification of the second embodiment described below concerns a case where N is an odd number equal to or greater than 5.

Figure 16:
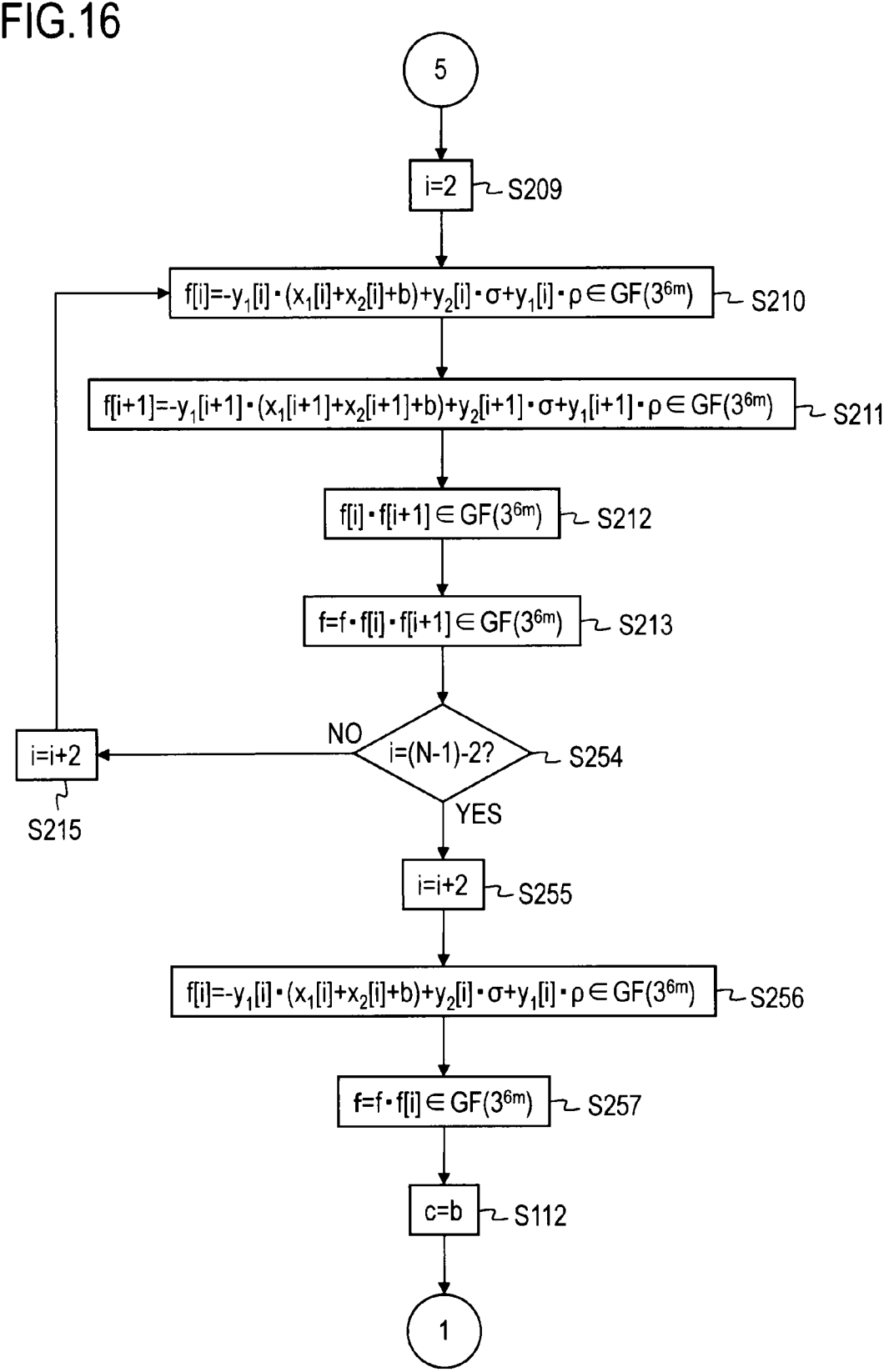
FIG. 16 is a diagram for illustrating a process in a case where N is an odd number equal to or greater than 5.

FIG. 16 is a diagram for illustrating a process in the case where N is an odd number equal to or greater than 5. In this modification, it is assumed that L=N−1. The following description will be focused only on differences from the second embodiment.

According to this modification of the second embodiment, after the processing in step S213 described in the second embodiment, the control part 123 determines whether or not i=(N−1)−2 (step S254). If it is not determined that i=(N−1)−2, the control part 123 sets i+2 as a new i and stores the setting in the memory 124, and the process returns to step S210 (step S215).

If it is determined that i=(N−1)−2, the control part 123 sets i+2 as a new i and stores the setting in the memory 124 (step S255).

Then, the $GF(3^{6m})$ calculation part 222-1 reads $y_1[i]$, $y_2[i]$, $x_2[i]$ and $y_2[i] \in GF(3^m)$ ($i_3=i$) from the memory 124, performs the following calculation $$f[i]=-y_1[i]\cdot(x_1[i]+x_2[i]+b)+y_2[i]\cdot\sigma+y_1[i]\cdot\rho \in GF(3^{6m}) \quad (86)$$

and stores the calculation result g[i]∈GF($3^{6m}$) in the memory 124 (step S256).

Then, the GF($3^{6m}$) calculation part 222-4 reads f∈GF($3^{6m}$) and f[i]∈GF($3^{6m}$) from the memory 124, performs the following calculation $$f=f \cdot f[i] \in GF(3^{6m}) \quad (100)$$

and stores the calculation result in the memory 124 as a new f∈GF($3^{6m}$) (step S257). Then, the processing stages in step S112 and the following steps described in the first embodiment are performed.

Third Embodiment

Next, a third embodiment of the present invention will be described.

The first embodiment is an example in which the present invention is applied to the part of calculation of g of the improved $\eta_T$ pairing calculation algorithm. According to the second embodiment, the present invention is applied to only the part of calculation of f of the improved $\eta_T$ pairing calculation algorithm.

According to this embodiment, K=4, p=3, d=6, m is an odd number equal to or greater than 1, N is an even number equal to or greater than 4, L=N, elements R(i, 0), R(i, 1), R(i, 2) and R(i, 3) of the finite field GF($p^m$) are affine coordinate points $X_1[i]$, $Y_1[i]$, $X_2[i]$ and $Y_2[i]$∈GF($p^m$), respectively, of two points P($X_1[i]$, $Y_1[i]$) and Q($X_2[i]$, $Y_2[i]$) on the elliptic curve E defined on the finite field GF($p^m$), the calculation e(R(i, 0), ..., R(i, K−1)) is a pairing calculation e(P($X_1[i]$, $Y_1[i]$), Q($X_2[i]$, $Y_2[i]$)), and the calculation $\Pi_{i=0}^{N-1}$e(R(i, 0), ..., R(i, K−1)) is a multi-pairing calculation $\Pi_{i=0}^{N-1}$e(P($X_1[i]$, $Y_1[i]$), Q($X_2[i]$, $Y_2[i]$)). Furthermore, according to this embodiment, the elliptic curve is the supersingular elliptic curve $E^b$ expressed by the formula (10) (b=−1 or 1). Furthermore, the extension field calculation according to this embodiment is a calculation that determines a polynomial that expresses elements of the sixth-order extension field GF($3^{6m}$) of the finite field GF($3^m$)

$$f[i]=-y_1[i] \cdot (x_1[i]+x_2[i]+b)+y_2[i] \cdot \sigma+y_1[i] \cdot \rho \in GF(3^{6m}) \quad (101)$$

where the affine coordinate points $X_1[i]$, $Y_1[i]$, $X_2[i]$ and $Y_2[i]$ input to the input part or the images thereof are represented by $x_1[i]$, $y_1[i]$, $x_2[i]$ and $y_2[i]$, respectively, u[i]=$x_1[i]$+$x_2[i]$+c∈GF($3^m$), the indeterminate element σ is a root of the irreducible polynomial $\sigma^2+1=0$ whose coefficients are elements of the finite field GF($3^m$), and the indeterminate element ρ is a root of the irreducible polynomial $\rho^3-\rho-b=0$. The following description will be focused mainly on differences from the first embodiment, and descriptions of things common to those in the first embodiment will be omitted.

<Configuration>

Figure 17:
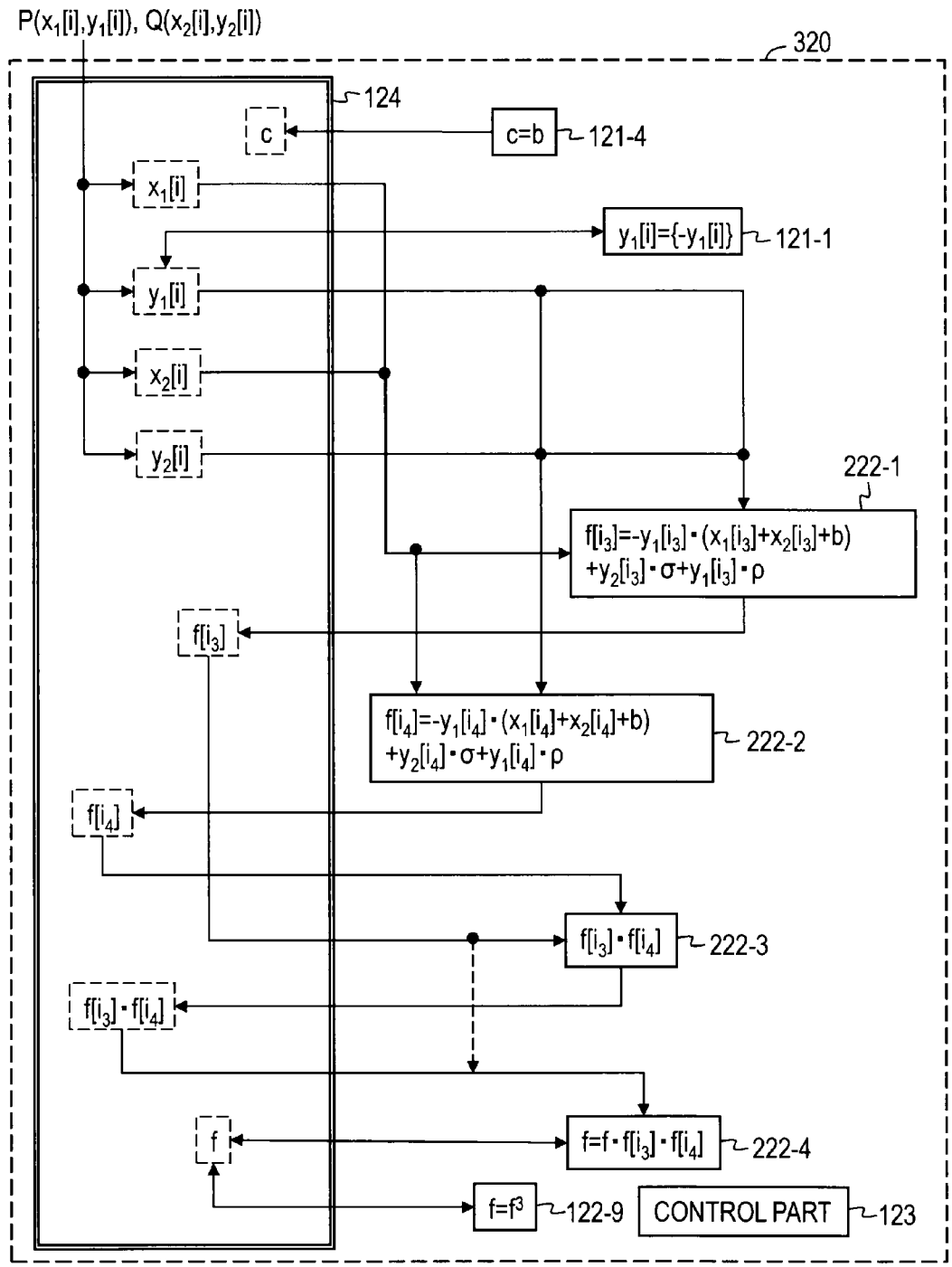
FIG. 17 is a block diagram for illustrating a basic configuration of a finite field calculation part according to a third embodiment.
Figure 18:
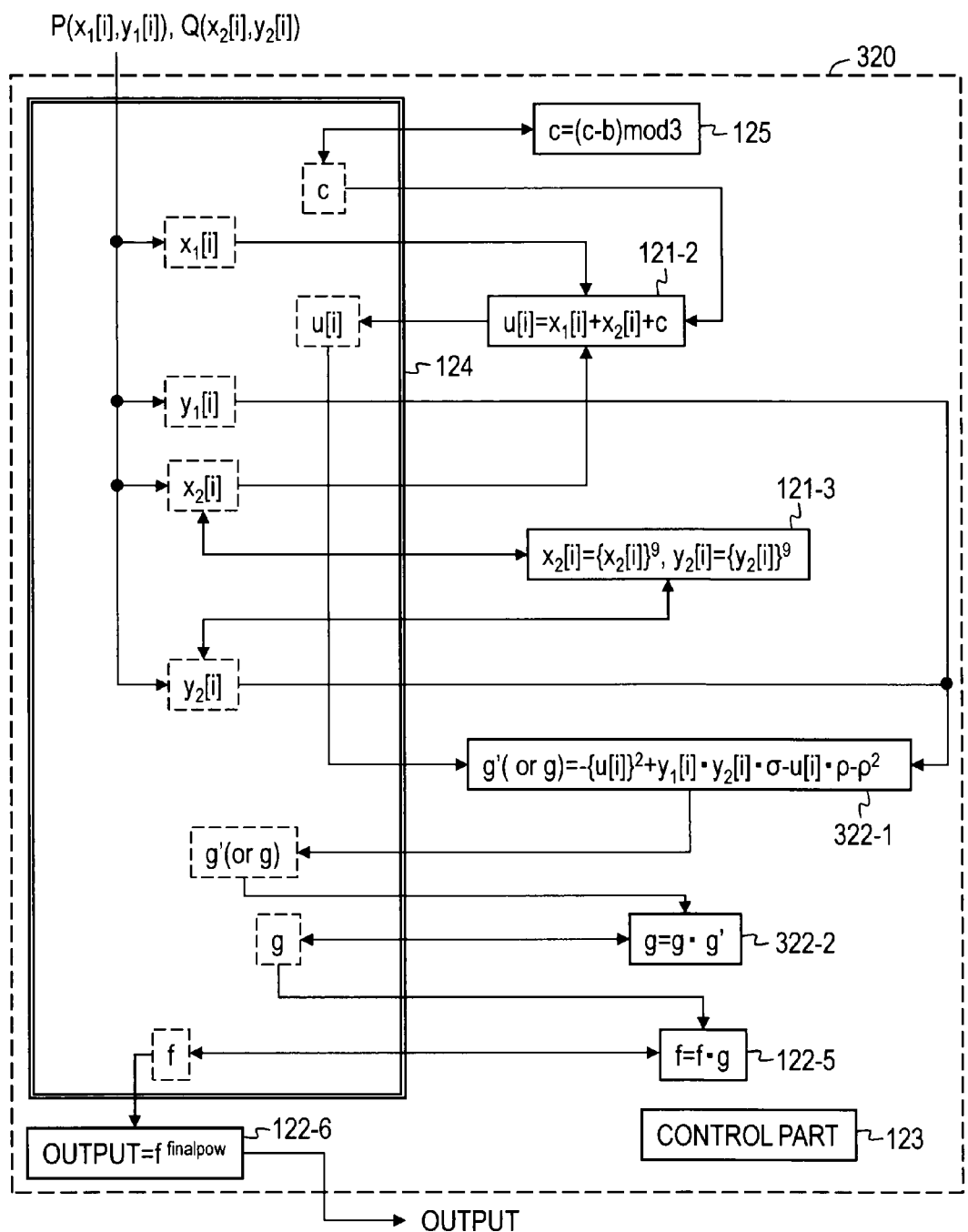
FIG. 18 is a block diagram for illustrating a basic configuration of the finite field calculation part according to the third embodiment.

FIGS. 17 and 18 are block diagrams for illustrating a basic configuration of a finite field calculation part 320 according to the third embodiment.

A finite field calculation apparatus according to the third embodiment is the finite field calculation apparatus shown in FIG. 2A with the finite field calculation part 20 replaced with the finite field calculation part 320 shown in FIGS. 17 and 18. The following description will be focused only on the configuration of the finite field calculation part 320.

As shown in FIGS. 17 and 18, the finite field calculation part 320 according to this embodiment has GF($3^m$) calculation parts 121-1 to 121-4 that perform a calculation over the finite field GF($3^m$), GF($3^{6m}$) calculation parts 122-1 to 122-5 and 122-9 that perform a calculation over the sixth-order extension field GF($3^{6m}$) of the finite field GF($3^m$), GF($3^{6m}$) calculation parts 222-1 to 222-5, GF($3^{6m}$) calculation parts 322-1 and 322-2, a control part 123, a memory 124 and a GF(3) calculation part 125 that performs a calculation over the finite field GF(3).

The finite field calculation part 320 is a special device that comprises a well-known or dedicated computer having a CPU, a RAM and a ROM, for example, and a special program. For example, the GF($3^{6m}$) calculation parts 322-1 and 322-2 are functional parts that are implemented by a predetermined program read in by the CPU. At least a part of the finite field calculation part 320 may be formed by an integrated circuit.

<Process>

Figure 19:
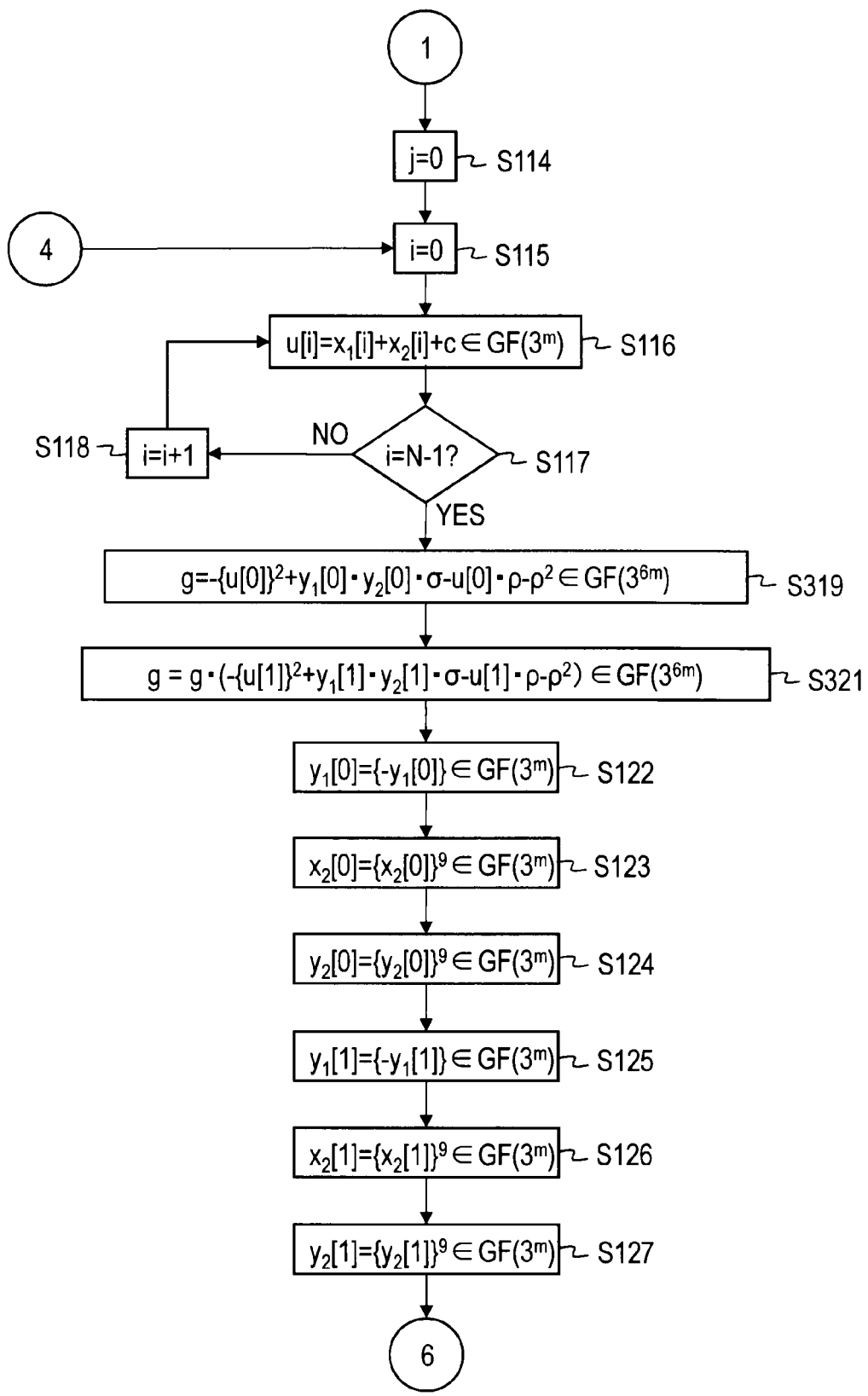
FIG. 19 is a diagram for illustrating a process according to the third embodiment.
Figure 20:
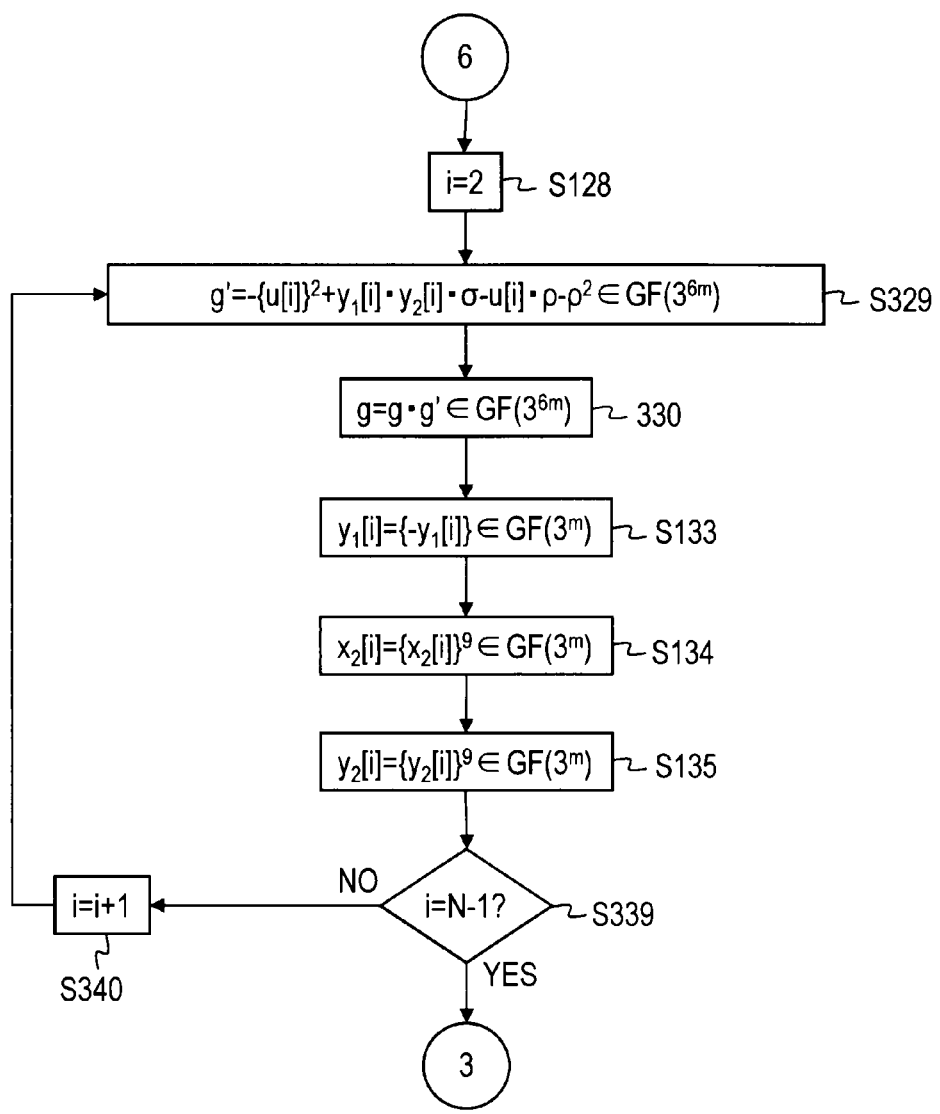
FIG. 20 is a diagram for illustrating the process according to the third embodiment.

FIGS. 19 to 20 are diagrams for illustrating a process according to the third embodiment. In the following, the process according to the third embodiment will be described with reference to these drawings.

First, the processing stages in steps S101 to S105 and S206 to S215 described in the second embodiment (FIGS. 14 and 15), and the processing stages in steps S112 to S118 described in the first embodiment are performed. Note that, as in the first embodiment, the processing stages in steps S102 to S105 are unnecessary when b=−1. If it is determined in step S117 that i=N−1, then, the GF($3^{6m}$) calculation part 322-1 reads $y_1[0]$∈GF($3^m$), $y_2[0]$∈GF($3^m$) and u[0]∈GF($3^m$) ($i_1$=0) from the memory 124, performs the following calculation $$g=-\{u[0]\}^2+y_1[0] \cdot y_2[0] \cdot \sigma-u[0] \cdot \rho-\rho^2 \in GF(3^{6m}) \quad (102)$$

and stores the calculation result g∈GF($3^{6m}$) in the memory 124 (step S319).

Then, the GF($3^{6m}$) calculation part 322-1 reads $y_1[1]$∈GF($3^m$), $y_2[1]$∈GF($3^m$) and u[1]∈GF($3^m$) ($i_1$=1) from the memory 124, performs the following calculation $$g'=-\{u[1]\}^2+y_1[1] \cdot y_2[1] \cdot \sigma-u[1] \cdot \rho-\rho^2 \in GF(3^{6m}) \quad (103)$$

and stores the calculation result g'∈GF($3^{6m}$) in the memory 124. Furthermore, the GF($3^{6m}$) calculation part 322-2 reads g∈GF($3^{6m}$) and g'∈GF($3^{6m}$) from the memory 124, performs the following calculation $$g=g \cdot g' \in GF(3^{6m}) \quad (104)$$

and stores the calculation result in the memory 124 as a new g (step S321).

Then, the control part 123 sets i=2 and stores the setting in the memory 124 (step S128).

Then, the GF($3^{6m}$) calculation part 322-1 reads $y_1[i]$∈GF($3^m$), $y_2[i]$∈GF($3^m$) and u[i]∈GF($3^m$) ($i_1$=i) from the memory 124, performs the following calculation $$g'=-\{u[i]\}^2+y_1[i] \cdot y_2[i] \cdot \sigma-u[i] \cdot \rho-\rho^2 \in GF(3^{6m}) \quad (105)$$

and stores the calculation result in the memory 124 as a new g'∈GF($3^{6m}$) (step S329).

Then, the GF($3^{6m}$) calculation part 322-2 reads the calculation results g∈GF($3^{6m}$) and g'∈GF($3^{6m}$) from the memory 124, performs the following calculation $$g=g \cdot g' \in GF(3^{6m}) \quad (106)$$

and stores the calculation result in the memory 124 as a new g (step S330).

Then, the processing stages in step S133 and the following steps in the first embodiment are performed.

[Other Modifications]

Note that the present invention is not limited to the embodiments described above. For example, in the embodiments described above, $i_1$=0 and $i_2$=1, $i_1$=i and $i_2$=i+1, $i_3$=0 and $i_4$=1, and $i_3$=i and $i_4$=i+1. However, other values of $i_1$, $i_2$, $i_3$ and $i_4$∈{0, ..., N−1} can also be used as far as $i_1$ differs from $i_2$, and $i_3$ differs from $i_4$. That is, a loop process can be performed in which the series of processing stages performed by the first calculation part, the second calculation part and the third calculation part is performed L/2 times while changing $i_1$ and $i_2$ in such a manner that each element of a subset including L (which represents an even number) different elements of the set $\{0, \ldots, N-1\}$ is used one time as $i_1$ or $i_2$, and the series of processing stages performed by the sixth calculation part, the seventh calculation part and the eighth calculation part can be performed W/2 times while changing $i_3$ and $i_4$ in such a manner that each element of a subset comprising W (which represents a positive even number) different elements of the set $\{0, \ldots, N-1\}$ is used one time as $i_3$ or $i_4$. In other words, each element of a subset including L (which represents an even number) different elements of the set $\{0, \ldots, N-1\}$ is selected one time as $i_1$ or $i_2$, and first processing stages, each of which includes processing stages performed by the first calculation part, the second calculation part and the third calculation part are performed one time for each pair of selected $i_1$ and $i_2$, thereby performing the first processing stages for the L/2 pairs $(i_1, i_2)$, respectively. And, each element of a subset comprising W (which represents a positive even number) different elements of the set $\{0, \ldots, N-1\}$ is selected one time as $i_3$ or $i_4$, and second processing stages, each of which includes processing stages performed by the sixth calculation part, the seventh calculation part and the eighth calculation part one time for each pair of selected $i_3$ and $i_4$, thereby performing the second processing stages for the W/2 pairs $(i_3, i_4)$, respectively.

Furthermore, with regard to the embodiments described above, configurations in which N is an even number equal to or greater than 4 and L=N and/or W=N and in which N is an odd number equal to or greater than 5 and L=N−1 and/or W=N−1 have been described. However, other positive even numbers smaller than N may be L and/or W. In that case, the processing for i to which the method according to the present invention is not applied can be performed by repeating the cumulative calculation in steps S161 and S162 shown in FIG. 11 or steps S256 and S257 shown in FIG. 16. In addition, L may not be equal to W. N may assume 2 or 3. In that case, the processing stages in steps S108 to S111 and S113 in FIG. 7, the processings in steps S128 to S140 in FIG. 9, the processing stages in steps S128 to S159 in FIG. 11, the processing stages in steps S209 to S215 in FIG. 15, and the processing stages in steps S209 to S215 and S254 in FIG. 16 are unnecessary.

In the embodiments described above, it is assumed that the parameters, such as b, are previously set. However, the parameters may be input to the apparatus.

In the embodiments described above, it is assumed that the product $\mathrm{poly}(R(i_1,0), \ldots, R(i_1, K-1)) \cdot \mathrm{poly}(R(i_2,0), \ldots, R(i_2, K-1))$ is determined without performing any calculation that involves as operands the terms, being previously determined to be $0 \in GF(p^m)$, of the polynomial $\mathrm{poly}(R(i_1, 0), \ldots, R(i_1, K-1))$ and/or the polynomial $\mathrm{poly}(R(i_2, 0), \ldots, R(i_2, K-1))$. However, a calculation that involves as operands some of these terms that are previously determined to be $0 \in GF(p^m)$ may be performed.

Furthermore, in the embodiments described above, the present invention is applied to the improved $\eta_T$ pairing calculation algorithm of characteristic 3. However, the present invention may be applied to other pairing calculations in characteristic 3, pairing calculations in characteristic 2, or pairing calculations in other characteristics.

The processings described above can be performed not only sequentially in the order described above but also in parallel with each other or individually as required or depending on the processing power of the apparatus that performs the processings. Furthermore, of course, other various modifications can be appropriately made to the processings without departing form the spirit of the present invention.

In the case where the configurations described above are implemented by a computer, the specific processings of the apparatuses are described in a program. The computer executes the program to implement the processings described above.

The program that describes the specific processings can be recorded in a computer-readable recording medium. The computer-readable recording medium may be any type of recording medium, such as a magnetic recording device, an optical disk, a magneto-optical recording medium and a semiconductor memory.

The program may be distributed by selling, transferring or lending a portable recording medium, such as a DVD and a CD-ROM, in which the program is recorded, for example. Alternatively, the program may be distributed by storing the program in a storage device in a server computer and transferring the program from the server computer to other computers via a network.

The computer that executes the program first temporarily stores, in a storage device thereof, the program recorded in a portable recording medium or transferred from a server computer, for example. Then, when performing the processings, the computer reads the program from the recording medium and performs the processings according to the read program. In an alternative implementation, the computer may read the program directly from the portable recording medium and perform the processings according to the program. As a further alternative, the computer may perform the processings according to the program each time the computer receives the program transferred from the server computer. As a further alternative, the processings described above may be performed on an application service provider (ASP) basis, in which the server computer does not transmit the program to the computer, and the processings are implemented only through execution instruction and result acquisition. The programs according to the embodiments of the present invention include a quasi-program, which is information processed by a computer (data or the like that is not a direct instruction to a computer but has a property that defines the processings performed by the computer).

INDUSTRIAL APPLICABILITY

Industrial applications of the present invention include cryptographic applications that use a multi-pairing calculation, such as the inner product predicate encryption.

DESCRIPTION OF REFERENCE NUMERALS 1 finite field calculation apparatus
10 input part
30 output part
20, 120, 220, 320 finite field calculation part

What is claimed is:
1. A finite field calculation apparatus, comprising:
an input part adapted to accept N*K elements $R(i, k) \in GF(p^m)$ of a finite field $GF(p^m)$ where $N \geq 2$, $K \geq 1$, $i \in \{0, \ldots, N-1\}$, $k \in \{0, \ldots, K-1\}$, p represents a prime number, and m represents an integer equal to or greater than 1;
a finite field calculation part adapted to perform a calculation $\Pi_{i=0}^{N-1} e(R(i, 0), \ldots, R(i, K-1))$ where $e(R(i, 0), \ldots, R(i, K-1))$ represents a calculation of K elements $R(i, 0), \ldots, R(i, K-1) \in GF(p^m)$ of the finite field $GF(p^m)$ over a finite field; and an output part adapted to output a result of the calculation performed by the finite field calculation part, wherein the calculation $e(R(i, 0), \ldots, R(i, K-1))$ over the finite field includes an extension field calculation over a d-th-order extension field $GF(p^{d \cdot m})$ of the finite field $GF(p^m)$ where $d \geq 2$, the extension field calculation is a calculation that maps images over the finite field $GF(p^m)$ that depend on one or more input elements $R(i, k) \in \{R(i, 0), \ldots, R(i, K-1)\}$ of the finite field $GF(p^m)$ and/or the elements $R(i, k) \in \{R(i, 0), \ldots, R(i, K-1)\}$ of the finite field $GF(p^m)$ to a polynomial $poly(R(i, 0), \ldots, R(i, K-1)) \in GF(p^{d \cdot m})$ that expresses an element of the d-th-order extension field $GF(p^{d \cdot m})$, the polynomial $poly(R(i, 0), \ldots, R(i, K-1)) \in GF(p^{d \cdot m})$ is a polynomial having d terms, coefficients of the d terms include coefficients $a_h$ of some terms $h \in \{0, \ldots, d-1\}$ and coefficients $a_r$ of predetermined some terms $r \in \{0, \ldots, d-1\}$ ($r \neq h$), the coefficients $a_h$ are the images over the finite field $GF(p^m)$ that depend on one or more input elements $R(i, k)$ of the finite field $GF(p^m)$ and/or the elements $R(i, k)$ of the finite field $GF(p^m)$, and the coefficients $a_r$ are previously determined to be $0 \in GF(p^m)$, and the finite field calculation part includes:

a first calculation part adapted to receive, for any $i_1 \in \{0, \ldots, N-1\}$, images over the finite field $GF(p^m)$ that depend on one or more elements $R(i_1, k)$ of the finite field $GF(p^m)$ and/or the elements $R(i_1, k)$ of the finite field $GF(p^m)$ and to perform the extension field calculation therefor to obtain a polynomial $poly(R(i_1, 0), \ldots, R(i_1, K-1)) \in GF(p^{d \cdot m})$;

a second calculation part adapted to receive, for any $i_2 \in \{0, \ldots, N-1\}$ ($i_2 \neq i_1$), images over the finite field $GF(p^m)$ that depend on one or more elements $R(i_2, k)$ of the finite field $GF(p^m)$ and/or the elements $R(i_2, k)$ of the finite field $GF(p^m)$ and to perform the extension field calculation therefor to obtain a polynomial $poly(R(i_2, 0), \ldots, R(i_2, K-1)) \in GF(p^{d \cdot m})$;

a third calculation part adapted to receive the polynomial $poly(R(i_1, 0), \ldots, R(i_1, K-1))$ and the polynomial $poly(R(i_2, 0), \ldots, R(i_2, K-1))$ and calculate product thereof as $poly(R(i_1, 0), \ldots, R(i_1, K-1)) \cdot poly(R(i_2, 0), \ldots, R(i_2, K-1)) \in GF(p^{d \cdot m})$;

a control part adapted to select each element of a subset including L different elements of the set $\{0, \ldots, N-1\}$ one time as $i_1$ or $i_2$, where L represents an even number, and run first processing stages, each of which includes processing stages performed by the first calculation part, the second calculation part and the third calculation part, each of the first processing stages are performed one time for each pair of selected $i_1$ and $i_2$, to perform a loop process including the first processing stages for $L/2$ pairs of selected $i_1$ and $i_2$; and a fourth calculation part adapted to calculate $\Pi_{i=0}^{N-1} poly(R(i, 0), \ldots, R(i, K-1)) \in GF(p^{d \cdot m})$ using products $poly(R(i_1, 0), \ldots, R(i_1, K-1)) \cdot poly(R(i_2, 0), \ldots, R(i_2, K-1))$ obtained by the first processing stages.

2. The finite field calculation apparatus according to claim 1, wherein the third calculation part determines the products $poly(R(i_1, 0), \ldots, R(i_1, K-1)) \cdot poly(R(i_2, 0), \ldots, R(i_2, K-1))$ without performing any calculation that involves as operands the terms, being previously determined to be $0 \in GF(p^m)$, of said polynomial $poly(R(i_1, 0), \ldots, R(i_1, K-1))$ and/or the polynomial $poly(R(i_2, 0), \ldots, R(i_2, K-1))$.

3. The finite field calculation apparatus according to claim 1 or 2, wherein N is an even number, $L=N$, and the subset is the set $\{0, \ldots, N-1\}$.

4. The finite field calculation apparatus according to claim 1 or 2, wherein the control part runs, multiple times, the loop process including the $L/2$ first processing stages.

5. The finite field calculation apparatus according to claim 3, wherein the control part runs, multiple times, the loop process including the $L/2$ first processing stages.

6. The finite field calculation apparatus according to claim 1 or 2, wherein $N \geq 4$, and the fourth calculation part determines $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

7. The finite field calculation apparatus according to claim 3, wherein $N \geq 4$, and the fourth calculation part determines $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

8. The finite field calculation apparatus according to claim 4, wherein $N \geq 4$, and the fourth calculation part determines $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

9. The finite field calculation apparatus according to claim 5, wherein $N \geq 4$, and the fourth calculation part determines $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

10. The finite field calculation apparatus according to claim 6, wherein the fourth calculation part updates the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

11. The finite field calculation apparatus according to claim 7, wherein the fourth calculation part updates the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

12. The finite field calculation apparatus according to claim 8, wherein the fourth calculation part updates the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

13. The finite field calculation apparatus according to claim 9, wherein the fourth calculation part updates the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

14. The finite field calculation apparatus according to claim 1, wherein $K=4$, elements $R(i, 0), R(i, 1), R(i, 2)$ and $R(i, 3)$ of the finite field $GF(p^m)$ are affine coordinate points $X_1[i], Y_1[i], X_2[i]$ and $Y_2[i] \in GF(p^m)$ of two points $P(X_1[i], Y_1[i])$ and $Q(X_2[i], Y_2[i])$ on an elliptic curve defined on the finite field $GF(p^m)$, the calculation $e(R(i, 0), \ldots, R(i, K-1))$ is a pairing calculation $e(P(X_1[i], Y_1[i]), Q(X_2[i], Y_2[i]))$, and the calculation $\Pi_{i=0}^{N-1} e(R(i, 0), \ldots, R(i, K-1))$ is a multi-pairing calculation $\Pi_{i=0}^{N-1} e(P(X_1[i], Y_1[i]), Q(X_2[i], Y_2[i]))$.

15. The finite field calculation apparatus according to claim 14, wherein p=3, d=6, the elliptic curve is $Y^2=X^3-X+b$ where $b \in \{-1, 1\}$, the extension field calculation is a calculation that determines a polynomial poly($x_1[i]$, $y_1[i]$, $x_2[i]$, $y_2[i]$)=$-\{u[i]\}^2+y_1[i] \cdot y_2[i] \cdot \sigma - u[i] \cdot \rho - \rho^2 \in GF(3^{6m})$ that expresses an element of a sixth-order extension field $GF(3^{6m})$ of the finite field $GF(3^m)$ where the affine coordinate points $X_1[i]$, $Y_1[i]$, $X_2[i]$ and $Y_2[i]$ input to the input part or the images thereof are represented by $x_1[i]$, $y_1[i]$, $x_2[i]$ and $y_2[i]$, $u[i]=x_1[i]+x_2[i]+c \in GF(3^m)$, an indeterminate element $\sigma$ is a root of an irreducible polynomial $\sigma^2+1=0$ a coefficient of which is an element of the finite field $GF(3^m)$, and an indeterminate element $\rho$ is a root of an irreducible polynomial $\rho^3-\rho-b=0$, the control part sets an initial value of c at b and adopts $(c-b) \bmod 3$ as a new value of c each time the loop process including the L/2 first processing stages is performed one time, the polynomial poly($R(i_1, 0), \ldots, R(i_1, K-1)$) is $g[i_1]=-\{u[i_1]\}^2+y_1[i_1] \cdot y_2[i_1] \cdot \sigma - u[i_1] \cdot \rho - \rho^2 \in GF(3^{6m})$, the polynomial poly($R(i_2, 0), \ldots, R(i_2, K-1)$) is $g[i_2]=-\{u[i_2]\}^2+y_1[i_2] \cdot y_2[i_2] \cdot \sigma - u[i_2] \cdot \rho - \rho^2 \in GF(3^{6m})$, the products poly($R(i_1, 0), \ldots, R(i_1, K-1)$)·poly($R(i_2, 0), \ldots, R(i_2, K-1)$) are $g[i_1] \cdot g[i_2] \in GF(3^{6m})$, and the fourth calculation part calculates $g=\Pi_{i=0}^{N-1}$ poly($R(i, 0), \ldots, R(i, K-1)) \in GF(3^{d \cdot m})$ using the products $g[i_1] \cdot g[i_2]$ obtained by the first processing stages.

16. The finite field calculation apparatus according to claim 15, wherein the third calculation part determines the products poly($R(i_1, 0), \ldots, R(i_1, K-1)$)·poly($R(i_2, 0), \ldots, R(i_2, K-1)$) without performing any calculation that involves as operands the terms, being previously determined to be $0 \in GF(p^m)$, of the polynomial poly($R(i_1, 0), \ldots, R(i_1, K-1)$) and/or the polynomial poly($R(i_2, 0), \ldots, R(i_2, K-1)$).

17. The finite field calculation apparatus according to claim 15, wherein the control part performs an update processing each time each of the first processing stages is performed, the update processing including adopting $-y_1[i_1]$ as a new $y_1[i_1]$, adopting $\{x_2[i_1]\}^9$ as a new $x_2[i_1]$, adopting $\{y_2[i_1]\}^9$ as a new $y_2[i_1]$, adopting $-y_1[i_2]$ as a new $y_1[i_2]$, adopting $\{x_2[i_2]\}^9$ as a new $x_2[i_2]$, and adopting $\{y_2[i_2]\}^9$ as a new $y_2[i_2]$, and the control part runs, multiple times, the loop process including the L/2 first processing stages.

18. The finite field calculation apparatus according to any one of claims 15 to 17, wherein the finite field calculation part further includes a fifth calculation part adapted to perform a calculation of $f=\Pi_{i=0}^{N-1}(-y_1[i] \cdot (x_1[i]+x_2[i]+b)+y_2[i] \cdot \sigma + y_1[i] \cdot \rho) \in GF(3^{6m})$ where $x_1[i]=X_1[i]$, $y_1[i]=Y_1[i]$, $x_2[i]=X_2[i]$ and $y_2[i]=Y_2[i]$ if b=-1 or $x_1[i]=X_1[i]$, $y_1[i]=-Y_1[i]$, $x_2[i]=X_2[i]$ and $y_2[i]=Y_2[i]$ if b=1, and a processing performed by the fifth calculation part is a processing performed before the first processing stages are performed for the first time.

19. The finite field calculation apparatus according to claim 18, wherein the finite field calculation part further includes:

a tenth calculation part adapted to calculate a product $f \cdot g \in GF(3^{6m})$ of f obtained by the fifth calculation part and g obtained by the fourth calculation part as a new f; and an eleventh calculation part adapted to calculate a cube $f^3 \in GF(3^{6m})$ of f obtained by the tenth calculation part as a new f, and processing stages performed by the tenth calculation part and the eleventh calculation part are performed each time the loop process is performed one time.

20. The finite field calculation apparatus according to claim 18, wherein $N \geq 4$, and the fifth calculation part includes:

a sixth calculation part adapted to perform, for any $i_3 \in \{0, \ldots, N-1\}$, a calculation of $f[i_3]=-y_1[i_3] \cdot (x_1[i_3]+x_2[i_3]+b)+y_2[i_3] \cdot \sigma + y_1[i_3] \cdot \rho \in GF(3^{6m})$;

a seventh calculation part adapted to perform, for any $i_4 \in \{0, \ldots, N-1\}$ ($i_4 \neq i_3$), a calculation of $f[i_4]=-y_1[i_4] \cdot (x_1[i_4]+x_2[i_4]+b)+y_2[i_4] \cdot \sigma + y_1[i_4] \cdot \rho \in GF(3^{6m})$;

an eighth calculation part adapted to receive $f[i_3]$ and $f[i_4]$, and calculate the product thereof $f[i_3] \cdot f[i_4] \in GF(3^{d \cdot m})$;

a second control part adapted to select each element of a subset including W different elements of the set $\{0, \ldots, N-1\}$ one time as $i_3$ or $i_4$, where W represents a positive even number, and runs W/2 second processing stages, each of which includes processing stages performed by the sixth calculation part, the seventh calculation part and the eighth calculation part for each pair of selected $i_3$ and $i_4$; and a ninth calculation part adapted to calculate $f=\Pi_{i=0}^{N-1}(-y_1[i] \cdot (x_1[i]+x_2[i]+b)+y_2[i] \cdot \sigma + y_1[i] \cdot \rho) \in GF(3^{6m})$ using a multiplication value of the products $f[i_3] \cdot f[i_4]$ obtained by the second processing stages.

21. The finite field calculation apparatus according to claim 20, wherein the finite field calculation part further includes:

a tenth calculation part adapted to calculate a product $f \cdot g \in GF(3^{6m})$ of f obtained by the fifth calculation part and g obtained by the fourth calculation part as a new f; and an eleventh calculation part adapted to calculate a cube $f^3 \in GF(3^{6m})$ of f obtained by the tenth calculation part as a new f, and processing stages performed by the tenth calculation part and the eleventh calculation part are performed each time the loop process is performed one time.

22. The finite field calculation apparatus according to claim 14, wherein p=3, d=6, the elliptic curve is $Y^2=X^3-X+b$ where $b \in \{-1, 1\}$, the extension field calculation is a calculation that determines a polynomial poly($x_1[i]$, $y_1[i]$, $x_2[i]$, $y_2[i]$)=$-y_1[i] \cdot (x_1[i]+x_2[i]+b)+y_2[i] \cdot \sigma + y_1[i] \cdot \rho \in GF(3^{6m})$ that expresses an element of a sixth-order extension field $GF(3^{6m})$ of the finite field $GF(3^m)$ where the affine coordinate points $X_1[i]$, $Y_1[i]$, $X_2[i]$ and $Y_2[i]$ input to the input part or the images thereof are represented by $x_1[i]$, $y_1[i]$, $x_2[i]$ and $y_2[i]$, an indeterminate element $\sigma$ is a root of an irreducible polynomial $\sigma^2+1=0$ a coefficient of which is an element of the finite field $GF(3^m)$, and an indeterminate element $\rho$ is a root of an irreducible polynomial $\rho^3-\rho-b=0$.

23. A non-transitory computer-readable recording medium that stores a program that makes a computer perform function of a finite field calculation apparatus according to claim 1.

24. A finite field calculation method for a finite field calculation apparatus that comprises an input part, a finite field calculation part and an output part, comprising:

(A) a step of accepting N*K elements $R(i, k) \in GF(p^m)$ of a finite field $GF(p^m)$ by the input part where $N \geq 2$, $K \geq 1$, $i \in \{0, \ldots, N-1\}$, $k \in \{0, \ldots, K-1\}$, p represents a prime number, and m represents an integer equal to or greater than 1;

(B) a step of performing a calculation $\Pi_{i=0}^{N-1} e(R(i, 0), \ldots, R(i, K-1))$ by the finite field calculation part, where $e(R(i, 0), \ldots, R(i, K-1))$ represents a calculation of K elements $R(i, 0), \ldots, R(i, K-1) \in GF(p^m)$ of the finite field $GF(p^m)$ over a finite field; and (C) a step of outputting, from the output part, a result of the calculation in the step (B), wherein the calculation $e(R(i, 0), \ldots, R(i, K-1))$ over the finite field includes an extension field calculation over a d-th-order extension field $GF(p^{d \cdot m})$ of the finite field $GF(p^m)$ where $d \geq 2$, the extension field calculation is a calculation that maps images over the finite field $GF(p^m)$ that depend on one or more input elements $R(i, k) \in \{R(i, 0), \ldots, R(i, K-1)\}$ of the finite field $GF(p^m)$ and/or the elements $R(i, k) \in \{R(i, 0), \ldots, R(i, K-1)\}$ of the finite field $GF(p^m)$ to a polynomial $poly(R(i, 0), \ldots, R(i, K-1)) \in GF(p^{d \cdot m})$ that expresses an element of the d-th-order extension field $GF(p^{d \cdot m})$, the polynomial $poly(R(i, 0), \ldots, R(i, K-1)) \in GF(p^{d \cdot m})$ is a polynomial having d terms, coefficients of the d terms include coefficients $a_h$ of some terms $h \in \{0, \ldots, d-1\}$ and coefficients $a_r$ of predetermined some terms $r \in \{0, \ldots, d-1\}$ ($r \neq h$), the coefficients $a_h$ are the images over the finite field $GF(p^m)$ that depend on one or more input elements $R(i, k)$ of the finite field $GF(p^m)$ and/or the elements $R(i, k)$ of the finite field $GF(p^m)$, and the coefficients $a_r$ are previously determined to be $0 \in GF(p^m)$, the step (B) includes:

(B-1) a step of inputting, for any $i_1 \in \{0, \ldots, N-1\}$, images over the finite field $GF(p^m)$ that depend on one or more elements $R(i_1, k)$ of the finite field $GF(p^m)$ and/or the elements $R(i_1, k)$ of the finite field $GF(p^m)$ into a first calculation part of the finite field calculation part, and performing, by the first calculation part, the extension field calculation therefor to obtain a polynomial $poly(R(i_1, 0), \ldots, R(i_1, K-1)) \in GF(p^{d \cdot m})$;

(B-2) a step of inputting, for any $i_2 \in \{0, \ldots, N-1\}$ ($i_2 \neq i_1$), images over the finite field $GF(p^m)$ that depend on one or more elements $R(i_2, k)$ of the finite field $GF(p^m)$ and/or the elements $R(i_2, k)$ of the finite field $GF(p^m)$ into a second calculation part of the finite field calculation part, and performing, by the second calculation part, the extension field calculation therefor to obtain a polynomial $poly(R(i_2, 0), \ldots, R(i_2, K-1)) \in GF(p^{d \cdot m})$;

(B-3) a step of inputting the polynomial $poly(R(i_1, 0), \ldots, R(i_1, K-1))$ and the polynomial $poly(R(i_2, 0), \ldots, R(i_2, K-1))$ into a third calculation part of the finite field calculation part, and calculating product thereof as $poly(R(i_1, 0), \ldots, R(i_1, K-1)) \cdot poly(R(i_2, 0), \ldots, R(i_2, K-1)) \in GF(p^{d \cdot m})$ by the third calculation part;

(B-4) a step of calculating, by a fourth calculation part of the finite field calculation part, $\Pi_{i=0}^{N-1} poly(R(i, 0), \ldots, R(i, K-1)) \in GF(p^{d \cdot m})$ using products $poly(R(i_1, 0), \ldots, R(i_1, K-1)) \cdot poly(R(i_2, 0), \ldots, R(i_2, K-1))$ obtained by first processing stages each of which includes the steps (B-1), (B-2) and (B-3), wherein each element of a subset including L different elements of the set $\{0, \ldots, N-1\}$ is selected one time as $i_1$ or $i_2$, where L represents an even number, and each of the first processing stages is performed one time for each pair of selected $i_1$ and $i_2$ to perform a loop process including the first processing stages for the L/2 pairs of selected $i_1$ and $i_2$, and the step (B-4) includes a step of calculating $\Pi_{i=0}^{N-1} poly(R(i, 0), \ldots, R(i, K-1)) \in GF(p^{d \cdot m})$ using products $poly(R(i_1, 0), \ldots, R(i_1, K-1)) \cdot poly(R(i_2, 0), \ldots, R(i_2, K-1))$ for the L/2 pairs.

25. The finite field calculation method according to claim 24, wherein the step (B-3) includes a step of determining the products $poly(R(i_1, 0), \ldots, R(i_1, K-1)) \cdot poly(R(i_2, 0), \ldots, R(i_2, K-1))$ without performing any calculation that involves as operands the terms, being previously determined to be $0 \in GF(p^m)$, of the polynomial $poly(R(i_1, 0), \ldots, R(i_1, K-1))$ and/or the polynomial $poly(R(i_2, 0), \ldots, R(i_2, K-1))$.

26. The finite field calculation method according to claim 24 or 25, wherein N is an even number, L=N, and the subset is the set $\{0, \ldots, N-1\}$.

27. The finite field calculation method according to claim 24 or 25, wherein the loop process including the L/2 first processing stages is performed multiple times.

28. The finite field calculation method according to claim 26, wherein the loop process including the L/2 first processing stages is performed multiple times.

29. The finite field calculation method according to claim 24 or 25, wherein $N \geq 4$, and the step (B-4) includes a step of determining $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

30. The finite field calculation method according to claim 26, wherein $N \geq 4$, and the step (B-4) includes a step of determining $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

31. The finite field calculation method according to claim 27, wherein $N \geq 4$, and the step (B-4) includes a step of determining $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

32. The finite field calculation method according to claim 28, wherein $N \geq 4$, and the step (B-4) includes a step of determining $\Pi_{i=0}^{N-1} poly(R(i, 0), \ldots, R(i, K-1)) \in GF(p^{d \cdot m})$ using a multiplication value of the products $poly(R(i_1, 0), \ldots, R(i_1, K-1)) \cdot poly(R(i_2, 0), \ldots, R(i_2, K-1))$ obtained by the first processing stages.

33. The finite field calculation method according to claim 29, wherein the step (B-4) includes a step of updating the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

34. The finite field calculation method according to claim 30, wherein the step (B-4) includes a step of updating the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

35. The finite field calculation method according to claim 31, wherein the step (B-4) includes a step of updating the multiplication value of the products $poly(R(i_1, 0), \ldots, R(i_1, K-1)) \cdot poly(R(i_2, 0), \ldots, R(i_2, K-1))$ that have been obtained at that point each time each of the first processing stages is performed.

36. The finite field calculation method according to claim 32, wherein the step (B-4) includes a step of updating the multiplication value of the products $poly(R(i_1, 0), \ldots, R(i_1,$ K−1))·poly(R(i$_2$, 0), . . . , R(i$_2$, K−1)) that have been obtained at that point each time each of the first processing stage is performed.

37. The finite field calculation method according to claim 24, wherein K=4,
elements R(i, 0), R(i, 1), R(i, 2) and R(i, 3) of the finite field GF(p$^m$) are affine coordinate points X$_1$[i], Y$_1$[i], X$_2$[i] and Y$_2$[i]∈GF(p$^m$) of two points P(X$_1$[i], Y$_1$[i]) and Q(X$_2$[i], Y$_2$[i]) on an elliptic curve defined on the finite field GF(p$^m$),
the calculation e(R(i, 0), . . . , R(i, K−1)) is a pairing calculation e(P(X$_1$[i], Y$_1$[i]), Q(X$_2$[i], Y$_2$[i])), and
the calculation $\Pi_{i=0}^{N-1}$e(R(i, 0), . . . , R(i, K−1)) is a multi-pairing calculation $\Pi_{i=0}^{N-1}$e(P(X$_1$[i], Y$_1$[i]), Q(X$_2$[i], Y$_2$[i])).

38. The finite field calculation method according to claim 37, wherein p=3, d=6,
the elliptic curve is Y$^2$=X$^3$−X+b where b∈{−1, 1},
the extension field calculation is a calculation that determines a polynomial poly(x$_1$[i], y$_1$[i], x$_2$[i], y$_2$[i])=−{u[i]}$^2$+y$_1$[i]·y$_2$[i]·σ−u[i]·ρ−ρ$^2$∈GF(3$^{6m}$) that expresses an element of a sixth-order extension field GF(3$^{6m}$) of the finite field GF(3$^m$) where the affine coordinate points X$_1$[i], Y$_1$[i], X$_2$[i] and Y$_2$[i] input to the input part or the images thereof are represented by x$_1$[i], y$_1$[i], x$_2$[i] and y$_2$[i], u[i]=x$_1$[i]+x$_2$[i]+c∈GF(3$^m$), an indeterminate element σ is a root of an irreducible polynomial σ$^2$+1=0 a coefficient of which is an element of the finite field GF(3$^m$), and an indeterminate element ρ is a root of an irreducible polynomial ρ$^3$−ρ−b=0,
an initial value of c is set at b, (c−b)mod 3 is adopted as a new value of c each time the loop process including the L/2 first processing stages is performed one time,
the polynomial poly(R(i$_1$, 0), . . . , R(i$_1$, K−1)) is g[i$_1$]=−{u[i$_1$]}$^2$+y$_1$[i$_1$]·y$_2$[i$_1$]·σ−u[i$_1$]·ρ−ρ$^2$∈GF(3$^{6m}$),
the polynomial poly(R(i$_2$, 0), . . . , R(i$_2$, K−1)) is g[i$_2$]=−{u[i$_2$]}$^2$+y$_1$[i$_2$]·y$_2$[i$_2$]·σ−u[i$_2$]·ρ−ρ$^2$∈GF(3$^{6m}$),
the products poly(R(i$_1$, 0), . . . , R(i$_1$, K−1))·poly(R(i$_2$, 0), . . . , R(i$_2$, K−1)) are g[i$_1$]·g[i$_2$]∈GF(3$^{6m}$), and
the step (B-4) includes a step of calculating g=$\Pi_{i=0}^{N-1}$poly(R(i, 0), . . . , R(i, K−1))∈GF(3$^{d·m}$) using the products g[i$_1$]·g[i$_2$] obtained by the first processing stages.

39. The finite field calculation method according to claim 38, wherein the step (B-3) includes a step of determining the products poly(R(i$_1$, 0), . . . , R(i$_1$, K−1))·poly(R(i$_2$, 0), . . . , R(i$_2$, K−1)) without performing any calculation that involves as operands the terms, being previously determined to be 0∈GF(p$^m$), of the polynomial poly(R(i$_1$, 0), . . . , R(i$_1$, K−1)) and/or the polynomial poly(R(i$_2$, 0), . . . , R(i$_2$, K−1)).

40. The finite field calculation method according to claim 38, wherein an update processing is performed each time each of the first processing stages is performed, the update processing including adopting −y$_1$[i$_1$] as a new y$_1$[i$_1$], adopting {x$_2$[i$_1$]}$^9$ as a new x$_2$[i$_1$], adopting {y$_2$[i$_1$]}$^9$ as a new y$_2$[i$_1$], adopting −y$_1$[i$_2$] as a new y$_1$[i$_2$], adopting {x$_2$[i$_2$]}$^9$ as a new x$_2$[i$_2$], and adopting {y$_2$[i$_2$]}$^9$ as a new y$_2$[i$_2$], and
the loop process including the L/2 first processing stages is performed multiple times.

41. The finite field calculation method according to any one of claims 38 to 40, wherein the step (B) further includes:
(B-5) a step of performing, by a fifth calculation part of the finite field calculation part, a calculation of f=$\Pi_{i=0}^{N-1}$(−y$_1$[i]·(x$_1$[i]+x$_2$[i]+b)+y$_2$[i]·σ+y$_1$[i]·ρ)∈GF(3$^{6m}$) where x$_1$[i]=X$_1$[i], y$_1$[i]=Y$_1$[i], x$_2$[i]=X$_2$[i] and y$_2$[i]=Y$_2$[i] if b=−1 or x$_1$[i]=X$_1$[i], y$_1$[i]=−Y$_1$[i], x$_2$[i]=X$_2$[i] and y$_2$[i]=Y$_2$[i] if b=1, and the step (B-5) is performed before the first processing stages are performed for the first time.

42. The finite field calculation method according to claim 41, wherein the step (B) further includes:
(B-10) a step of calculating, by a tenth calculation part of the finite field calculation part, a product f·g∈GF(3$^{6m}$) of f obtained in the step (B-5) and g obtained in the step (B-4) as a new f; and
(B-11) a step of calculating, by an eleventh calculation part of the finite field calculation part, a cube f$^3$∈GF(3$^{6m}$) off obtained in the step (B-6) as a new f, and
processing stages performed in the steps (B-10) and (B-11) are performed each time the loop process is performed one time.

43. The finite field calculation method according to claim 41, wherein N≧4, and
the step (B-5) includes:
(B-6) a step of performing, by a sixth calculation part of the finite field calculation part, for any i$_3$∈{0, . . . , N−1}, a calculation of f[i$_3$]=−y$_1$[i$_3$]·(x$_1$[i$_3$]+x$_2$[i$_3$]+b)+y$_2$[i$_3$]·σ+y$_1$[i$_3$]·ρ∈GF(3$^{6m}$);
(B-7) a step of performing, by a seventh calculation part of the finite field calculation part, for any i$_4$∈{0, . . . , N−1} (i$_4$≠i$_3$), a calculation of f[i$_4$]=−y$_1$[i$_4$]·(x$_1$[i$_4$]+x$_2$[i$_4$]+b)+y$_2$[i$_4$]·σ+y$_1$[i$_4$]·ρ∈GF(3$^{6m}$);
(B-8) a step of receiving f[i$_3$] and f[i$_4$] and calculating the product thereof f[i$_3$]·f[i$_4$]∈GF(3$^{d·m}$) by an eighth calculation part of the finite field calculation part; and
(B-9) a step of calculating, by a ninth calculation part of the finite field calculation part, f=$\Pi_{i=0}^{N-1}$(−y$_1$[i]·(x$_1$[i]+x$_2$[i]+b)+y$_2$[i]·σ+y$_1$[i]·ρ)∈GF(3$^{6m}$) using a multiplication value of the products f[i$_3$]·f[i$_4$] obtained by second processing stages each of which includes the steps (B-6), (B-7) and (B-8), and
each element of a subset including W different elements of the set {0, . . . , N−1} is selected one time as i$_3$ or i$_4$, where W represents a positive even number, and each of the second processing stages is performed one time for each pair of selected i$_3$ and i$_4$, to perform the second processing stages for W/2 pairs (i$_3$, i$_4$).

44. The finite field calculation method according to claim 43, wherein the step (B) further includes:
(B-10) a step of calculating, by a tenth calculation part of the finite field calculation part, a product f·g∈GF(3$^{6m}$) of f obtained in the step (B-5) and g obtained in the step (B-4) as a new f; and
(B-11) a step of calculating, by an eleventh calculation part of the finite field calculation part, a cube f$^3$∈GF(3$^{6m}$) off obtained in the step (B-6) as a new f, and
processings in the steps (B-10) and (B-11) are performed each time the loop process is performed one time.

45. The finite field calculation method according to claim 37, wherein p=3, d=6,
the elliptic curve is Y$^2$=X$^3$−X+b where b∈{−1, 1},
the extension field calculation is a calculation that determines a polynomial poly(x$_1$[i], y$_1$[i], x$_2$[i], y$_2$[i])=−y$_1$[i]·(x$_1$[i]+x$_2$[i]+b)+y$_2$[i]·σ+y$_1$[i]·ρ∈GF(3$^{6m}$) that expresses an element of a sixth-order extension field GF(3$^{6m}$) of the finite field GF(3$^m$) where the affine coordinate points X$_1$[i], Y$_1$[i], X$_2$[i] and Y$_2$[i] input to the input part or the images thereof are represented by x$_1$[i], y$_1$[i], x$_2$[i] and y$_2$[i], an indeterminate element σ is a root of an irreducible polynomial σ$^2$+1=0 a coefficient of which is an element of the finite field GF(3$^m$), and an indeterminate element ρ is a root of an irreducible polynomial ρ$^3$−ρ−b=0.

* * * * *